United States Patent
Norimatsu et al.

(10) Patent No.: US 10,086,649 B2
(45) Date of Patent: Oct. 2, 2018

(54) BEARING DEVICE FOR WHEEL

(71) Applicants: Takayuki Norimatsu, Shizuoka (JP);
Tsutomu Nagata, Shizuoka (JP)

(72) Inventors: Takayuki Norimatsu, Shizuoka (JP);
Tsutomu Nagata, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/771,555

(22) PCT Filed: Feb. 14, 2014

(86) PCT No.: PCT/JP2014/053404
§ 371 (c)(1),
(2) Date: Aug. 31, 2015

(87) PCT Pub. No.: WO2014/141808
PCT Pub. Date: Sep. 18, 2014

(65) Prior Publication Data
US 2016/0016431 A1    Jan. 21, 2016

(30) Foreign Application Priority Data

Mar. 12, 2013  (JP) ................................. 2013-049196
Mar. 21, 2013  (JP) ................................. 2013-058233
(Continued)

(51) Int. Cl.
*B60B 27/00*  (2006.01)
*F16C 35/06*  (2006.01)
(Continued)

(52) U.S. Cl.
CPC ...... *B60B 27/0042* (2013.01); *B60B 27/0005* (2013.01); *B60B 27/0026* (2013.01);
(Continued)

(58) Field of Classification Search
CPC .......................... F16C 2326/02; F16C 19/186;
F16C 35/0635; F16C 2226/60; F16B 39/08;
(Continued)

(56) References Cited

U.S. PATENT DOCUMENTS 3,875,985 A * 4/1975 Okuda .................... F16B 39/10
411/120
4,906,150 A * 3/1990 Bennett .................. F16B 39/10
411/119
(Continued)

FOREIGN PATENT DOCUMENTS

DE      2903706 A1 *  8/1980  ............ F16B 39/101
EP      2 517 897       10/2012
(Continued)

OTHER PUBLICATIONS

Machine Translation of DE 2903706 dated Aug. 1980.*
(Continued)

*Primary Examiner* — Alan B Waits
(74) *Attorney, Agent, or Firm* — Wenderoth, Lind & Ponack, L.L.P.

(57) ABSTRACT

A bearing device for a wheel has a wheel bearing including inner and outer rings, a hub wheel, and balls between outer raceway surfaces of the outer ring and inner raceway surfaces of the hub wheel and the inner ring. A stem section is fitted into an inner diameter of the hub wheel to couple a constant velocity universal joint to the wheel bearing through a screw fastening structure so that a shoulder portion of an outer joint member abuts against a crimped portion of the hub wheel. Projecting portions formed on the stem section are press-fitted into the hub wheel having depressed portions formed to interfere with the projecting portions, and a shape of the projecting portions is transferred to the hub wheel providing a projection and depression fitting structure in which the projecting and depressed por-
(Continued)

tions are in close contact at an entire fitting contact portion therebetween.

13 Claims, 54 Drawing Sheets

(30) Foreign Application Priority Data

May 30, 2013 (JP) .................................. 2013-114139
Jul. 16, 2013 (JP) .................................. 2013-147637

(51) Int. Cl.

| | |
|---|---|
| *F16C 19/18* | (2006.01) |
| *F16D 1/076* | (2006.01) |
| *F16C 35/063* | (2006.01) |
| *F16D 1/072* | (2006.01) |
| *F16B 39/10* | (2006.01) |
| *F16D 1/10* | (2006.01) |
| *F16D 3/223* | (2011.01) |

(52) U.S. Cl.
CPC .......... *B60B 27/0036* (2013.01); *F16D 1/076* (2013.01); *F16B 39/105* (2013.01); *F16C 19/186* (2013.01); *F16C 35/0635* (2013.01); *F16C 2226/60* (2013.01); *F16D 1/072* (2013.01); *F16D 2001/103* (2013.01); *F16D 2003/22326* (2013.01)

(58) Field of Classification Search
CPC ..... F16B 39/10; B60B 35/14; B60B 27/0005; B60B 27/0026; B60B 27/0036; B60B 27/0042; F16D 1/072; F16D 1/076; F16D 2001/103; F16D 2003/22326
See application file for complete search history.

(56) References Cited

U.S. PATENT DOCUMENTS

| | | | | |
|---|---|---|---|---|
| 5,297,693 A * | 3/1994 | Perkey | ................... | F16B 39/10 220/288 |
| 6,241,441 B1 * | 6/2001 | Erb | ..................... | F16B 39/10 411/120 |
| 6,758,646 B1 * | 7/2004 | Ishida | .................. | F16B 39/028 411/119 |
| 6,926,448 B2 * | 8/2005 | Ouchi | ................... | B60B 27/00 384/537 |
| 7,104,893 B2 * | 9/2006 | Ouchi | ..................... | B21J 5/12 464/178 |
| 7,708,510 B2 * | 5/2010 | Reimler | ................ | F16B 37/14 24/455 |
| 7,731,463 B2 * | 6/2010 | Davis | ..................... | F16B 39/10 411/119 |
| 8,556,737 B2 * | 10/2013 | Yamauchi | ............... | B60B 27/00 464/178 |
| 2002/0122711 A1 * | 9/2002 | Porter | .................... | F16B 39/10 411/170 |
| 2003/0146591 A1 | 8/2003 | Ouchi et al. | | |
| 2004/0037482 A1 | 2/2004 | Ouchi | | |
| 2005/0094912 A1 | 5/2005 | Ouchi | | |
| 2005/0159227 A1 | 7/2005 | Ouchi et al. | | |
| 2008/0289470 A1 * | 11/2008 | Aston | ....................... | B27B 5/32 83/698.41 |
| 2010/0054894 A1 * | 3/2010 | Caballero Asensio | ..................... | F16B 39/10 411/524 |
| 2012/0281941 A1 | 11/2012 | Umekida et al. | | |
| 2013/0004259 A1 * | 1/2013 | Stewart | .................. | F16B 39/10 411/337 |

FOREIGN PATENT DOCUMENTS

| | | | |
|---|---|---|---|
| JP | 4-31312 | | 3/1992 |
| JP | 2002-178706 | | 6/2002 |
| JP | 2002-187403 | | 7/2002 |
| JP | 2002-200902 | | 7/2002 |
| JP | 2003-97588 | | 4/2003 |
| JP | 2003-136908 | | 5/2003 |
| JP | 2003-232320 | | 8/2003 |
| JP | 2005-315652 | | 11/2005 |
| JP | 2010-47059 | | 3/2010 |
| JP | 2010144902 A | * | 7/2010 |
| JP | 2012-96749 | | 5/2012 |

OTHER PUBLICATIONS

Machine Translation of JP 2012-96749 dated May 2012.*
Machine Translation of JP2003-232320 dated Aug. 2003.*
Machine Translation of JP2010-047059 dated Mar. 2010.*
Machine Translation of JP 2002-187403 dated Jul. 2002.*
International Preliminary Report on Patentability and Written Opinion of the International Searching Authority dated Sep. 15, 2015 in International (PCT) Application No. PCT/JP2014/053040.
International Search Report dated Apr. 15, 2014 in International (PCT) Application No. PCT/JP2014/053404.
Extended European Search Report dated Oct. 10, 2016 in corresponding European Application No. 14764201.1.

* cited by examiner

| No. | AXIAL FORCE [kN] | | | STICK-SLIP NOISE |
|---|---|---|---|---|
| | ① AXIAL FORCE BY BOLT FASTENING | ② PRESS-FITTING FORCE | ③ CONTACT SURFACES (③=①−②) | |
| 1 | 27 | 3 | 24 | NO |
| 2 | 28 | 3 | 25 | |
| 3 | 31 | 3 | 27 | |
| 4 | 31 | 2 | 29 | |
| 5 | 33 | 3 | 30 | |
| 6 | 37 | 5 | 32 | |
| 7 | 36 | 3 | 32 | |
| 8 | 37 | 3 | 34 | YES |
| 9 | 39 | 3 | 36 | |
| 10 | 41 | 3 | 37 | |
| 11 | 42 | 3 | 38 | |
| 12 | 52 | 2 | 50 | |
| 13 | 56 | 5 | 51 | |

BEARING DEVICE FOR WHEEL

TECHNICAL FIELD

The present invention relates to a bearing device for a wheel configured to rotatably support a driving wheel (front wheel of a front-engine front-drive (FF) vehicle, rear wheel of a front-engine rear-drive (FR) vehicle, and all wheels of a four-wheel drive (4WD) vehicle) with respect to a suspension device for an automobile, for example.

BACKGROUND ART

As illustrated in FIG. 66, for example, the related-art bearing device for a wheel includes, as main components thereof, a constant velocity universal joint 107, and a wheel bearing 106 including a hub wheel 101, an inner ring 102, double-row balls 103 and 104, and an outer ring 105.

The hub wheel 101 has an inner raceway surface 108 on an outboard side formed on an outer peripheral surface thereof, and includes a wheel mounting flange 109 for allowing a wheel (not shown) to be mounted thereto. Hub bolts 110 for fixing a wheel disc are equiangularly embedded in the wheel mounting flange 109. The inner ring 102 is fitted to a small-diameter step portion 111 formed on an outer peripheral surface of the hub wheel 101 on an inboard side, and an inner raceway surface 112 on the inboard side is formed on an outer peripheral surface of the inner ring 102. On an inner peripheral surface of a shaft hole of the hub wheel 101, a female spline 113 for coupling the constant velocity universal joint 107 to allow torque transmission therebetween is formed.

The inner ring 102 is press-fitted with adequate interference for the purpose of preventing creep. The inner raceway surface 108 on the outboard side that is formed on the outer peripheral surface of the hub wheel 101 and the inner raceway surface 112 on the inboard side that is formed on the outer peripheral surface of the inner ring 102 constitute double-row inner raceway surfaces. The inner ring 102 is press-fitted into the small-diameter step portion 111 of the hub wheel 101, and an end portion of the small-diameter step portion 111 is crimped outward. As a result, the inner ring 102 is retained by a crimped portion 114 thus formed and integrated with the hub wheel 101, to thereby apply preload to the wheel bearing 106.

The outer ring 105 has double-row outer raceway surfaces 115 and 116 formed on an inner peripheral surface thereof and opposed to the inner raceway surfaces 108 and 112 of the hub wheel 101 and the inner ring 102. The outer ring 105 has a vehicle body mounting flange 117 for mounting the wheel bearing 106 to a vehicle body (not shown) on an outer peripheral surface thereof. The vehicle body mounting flange 117 is fixed to a knuckle extending from a suspension device (not shown) of the vehicle body with a bolt or the like by using a mounting hole 118.

The wheel bearing 106 has a double-row angular ball bearing structure. That is, the balls 103 and 104 are interposed between the inner raceway surfaces 108 and 112 formed on the outer peripheral surfaces of the hub wheel 101 and the inner ring 102 and the outer raceway surfaces 115 and 116 formed on the inner peripheral surface of the outer ring 105. Then, the balls 103 and 104 in respective rows are equiangularly supported by cages 119 and 120.

At opening portions on both ends of the wheel bearing 106, a pair of seals 121 and 122 for sealing annular spaces between the outer ring 105 and the hub wheel 101 and between the outer ring 105 and the inner ring 102 are fitted to the inner diameter at both end portions of the outer ring 105. With this, leakage of lubricant such as grease filled inside and entrance of water and foreign matter from the outside are prevented.

The bearing device for a wheel is configured by coupling an outer joint member 123 of the constant velocity universal joint 107 to the hub wheel 101. The outer joint member 123 includes a cup-shaped mouth section 124 that accommodates internal components (not shown) such as an inner joint member, balls, and a cage, and a stem section 125 that integrally extends from the mouth section 124 in an axial direction. On an outer peripheral surface of the stem section 125, a male spline 126 for coupling the stem section 125 to the hub wheel 101 to allow torque transmission therebetween is formed.

The stem section 125 of the outer joint member 123 is press-fitted into the shaft hole of the hub wheel 101 so that a nut 127 is threadedly engaged with a male thread portion 129 formed at an end portion of the stem section 125. Then, by fastening the nut 127 in a state of being locked to an end surface of the hub wheel 101, the constant velocity universal joint 107 is fixed to the hub wheel 101. A shoulder portion 128 of the outer joint member 123 is brought into abutment against the crimped portion 114 of the hub wheel 101 by a fastening force (axial force) of the nut 127. In this manner, the male spline 126 of the stem section 125 and the female spline 113 of the hub wheel 101 are fitted to each other. As a result, the torque transmission from the constant velocity universal joint 107 to the wheel bearing 106 is enabled.

In the bearing device for a wheel described above, the crimped portion 114 of the hub wheel 101 and the shoulder portion 128 of the outer joint member 123, which is opposed to the crimped portion 114, are in a state of abutment against each other by the fastening force (axial force) of the nut 127. Thus, when a rotational torque is applied from the constant velocity universal joint 107 to the wheel bearing 106 that is in a stationary state at the start of the vehicle, the rotational torque is to be transmitted from the outer joint member 123 to the hub wheel 101 through an intermediation of the female spline 113 and the male spline 126. At this time, however, sudden slippage occurs between the crimped portion 114 of the hub wheel 101 and the shoulder portion 128 of the outer joint member 123 due to torsion of the outer joint member 123. Stick-slip noise generally referred to as squeaking noise is sometimes generated due to the sudden slippage.

As means for preventing the stick-slip noise, means for increasing a frictional resistance on contact surfaces of the crimped portion 114 of the hub wheel 101 and the shoulder portion 128 of the outer joint member 123 has been taken so as not to cause the sudden slippage (see Patent Literature 1, for example). In Patent Literature 1, there are disclosed, as the means for increasing the frictional resistance, a structure in which radial, oval, or cross-hatched projecting and depressed portions are formed on the contact surface of the shoulder portion 128 of the outer joint member 123 and a structure in which a spacer made of rubber or resin is provided on the contact surface of the shoulder portion 128 of the outer joint member 123.

Further, as another means for preventing the stick-slip noise, means for reducing the frictional resistance on the contact surfaces of the crimped portion 114 of the hub wheel 101 and the shoulder portion 128 of the outer joint member 123 has been taken so as not to cause the sudden slippage (see Patent Literature 2, for example). In Patent Literature 2, there is disclosed a structure in which a depressed groove is formed on the contact surface of the crimped portion 114 of the hub wheel 101 and the depressed groove is filled with grease.

CITATION LIST

Patent Literature 1: JP 2003-97588 A
Patent Literature 2: JP 2003-136908 A

SUMMARY OF INVENTION

Technical Problem

Incidentally, in the related-art bearing devices for a wheel as disclosed in Patent Literatures 1 and 2, the frictional resistance on the contact surfaces of the crimped portion 114 of the hub wheel 101 and the shoulder portion 128 of the outer joint member 123 is increased or, conversely, the frictional resistance on the contact surfaces of the crimped portion 114 of the hub wheel 101 and the shoulder portion 128 of the outer joint member 123 is reduced to prevent the occurrence of sudden relative slippage, to thereby prevent the stick-slip noise.

However, as the means for increasing the frictional resistance, the projecting and depressed portions need to be formed on the contact surface of the shoulder portion 128 of the outer joint member 123 or the spacer needs to be provided. Further, as the means for reducing the frictional resistance, the depressed groove needs to be formed on the contact surface of the crimped portion 114 of the hub wheel 101. As described above, the formation of the projecting and depressed portions or the formation of the depressed groove is required, or the spacer as an independent member is required as a process of changing the frictional resistance on the contact surface. Therefore, there is a problem in that cost rises of the bearing device for a wheel are caused.

Therefore, the present invention has been proposed in view of the problem described above, and has an object to provide a bearing device for a wheel, capable of preventing stick-slip noise by simple means without requiring a process of changing a frictional resistance on a contact surface.

Solution to Problem

As a technical measure to achieve the above-mentioned object, according to one embodiment of the present invention, there is provided a bearing device for a wheel, comprising a wheel bearing, the wheel bearing comprising: an outer member having double-row outer raceway surfaces formed on an inner periphery thereof; an inner member comprising a hub wheel and an inner ring and having double-row inner raceway surfaces formed on an outer periphery thereof, which are opposed to the double-row outer raceway surfaces; and double-row balls interposed between the double-row outer raceway surfaces of the outer member and the double-row inner raceway surfaces of the inner member, the wheel bearing having a constant velocity universal joint coupled thereto through a screw fastening structure by fitting a stem section of an outer joint member of the constant velocity universal joint into an inner diameter of the hub wheel so that a shoulder portion of the outer joint member is brought into abutment against an end portion of the inner member, wherein: a plurality of projecting portions formed on one of the hub wheel and the stem section of the outer joint member to extend in an axial direction are press-fitted into another of the hub wheel and the stem section of the outer joint member, which comprises a plurality of depressed portions formed to have an interference with respect to the plurality of projecting portions, and a shape of the plurality of projecting portions is transferred to the another of the hub wheel and the stem section of the outer joint member, to thereby provide a projection and depression fitting structure in which the plurality of projecting portions and the plurality of depressed portions are brought into close contact with each other at an entire fitting contact portion therebetween; and a difference between an axial force generated by screw fastening and an axial force generated by a press-fitting force is set to 32 kN or smaller.

In the present invention, the plurality of projecting portions extending in the axial direction are formed on one of the hub wheel and the stem section of the outer joint member, and the depressed portions having the interference with respect to the projecting portions are formed in advance on another of the hub wheel and the stem section of the outer joint member. One of the hub wheel and the stem section of the outer joint member is press-fitted into the other, to thereby provide the projection and depression fitting structure in which the projecting portions and the depressed portions are brought into close contact with each other at the entire fitting contact portion therebetween.

In this case, a depressed-portion forming surface is extremely slightly cut by the projecting portions, and the shape of the projecting portions is transferred to the depressed-portion forming surface on a mating side while concomitantly involving extremely small plastic deformation or elastic deformation of the depressed-portion forming surface by the projecting portions. At this time, the projecting portions dig into the depressed-portion forming surface on the mating side so that the inner diameter of the hub wheel is slightly increased. Thus, relative movement of the projecting portions in the axial direction is allowed in this state. When the relative movement of the projecting portions in the axial direction is stopped, the inner diameter of the hub wheel is reduced to recover the original diameter. Thus, the projecting portions and the depressed portions are brought into close contact with each other at the entire fitting contact portion therebetween, with the result that the outer joint member and the hub wheel can firmly be coupled to and integrated with each other.

In this case, the depressed portions having the interference with respect to the projecting portions are formed in advance. Therefore, the outer joint member can be press-fitted into the hub wheel with a force equal to or smaller than the axial force generated by screw fastening. As a result, there is no need to separately prepare a dedicated jig when press-fitting the stem section of the outer joint member into the hub wheel. The constant velocity universal joint can easily be coupled to the wheel bearing by the screw fastening using a component of the bearing device for a wheel.

In the present invention, the difference between the axial force generated by the screw fastening and the axial force generated by the press-fitting force is set to 32 kN or smaller. By setting the difference between the axial force generated by the screw fastening and the axial force generated by the press-fitting force to 32 kN or smaller as described above, the difference between the axial force generated by the screw fastening and the axial force generated by the press-fitting force, that is, the axial force generated on contact surfaces of the end portion of the inner member and the shoulder portion of the outer joint member is set to 32 kN or smaller. As a result, a surface pressure on the contact surfaces of the end portion of the inner member and the shoulder portion of the outer joint member can be reduced. Thus, when a rotational torque is applied from the constant velocity universal joint to the wheel bearing at the start of the vehicle, the occurrence of sudden slippage on the contact surfaces can be avoided, and hence the generation of stick-slip noise can be prevented.

The screw fastening structure of the present invention may be a structure comprising: a female thread portion formed at an axial end of the stem section of the outer joint member; and a male thread portion to be locked at the hub wheel in a state of being threadedly engaged with the female thread portion. In this structure, the male thread portion is threadedly engaged with the female thread portion of the stem section, and is therefore fastened in a state of being locked at the hub wheel, to thereby fix the constant velocity universal joint to the hub wheel.

In the present invention, it is desired that the plurality of projecting portions be provided on the stem section of the outer joint member, and the plurality of depressed portions be provided on the hub wheel. Through the adoption of such a structure, the projection and depression fitting structure in which the projecting portions and the depressed portions are brought into close contact with each other at the entire fitting contact portion therebetween can easily be provided through press fitting of the stem section of the outer joint member into the hub wheel.

In the present invention, in the structure in which the plurality of projecting portions are provided on the stem section of the outer joint member and the plurality of depressed portions are provided on the hub wheel, it is desired that a value obtained by dividing an axial length from the shoulder portion of the outer joint member, against which the end portion of the inner member abuts, to the plurality of projecting portions by a maximum outer diameter of the stem section be set to 0.3 or smaller, and that a value obtained by dividing an axial length of the stem section by the maximum outer diameter of the stem section be set to 1.3 or smaller. By setting the axial length with respect to the maximum outer diameter of the stem section as described above, when the rotational torque is applied from the constant velocity universal joint to the wheel bearing at the start of the vehicle, a torsion amount of the outer joint member can be reduced while ensuring an effective fitting length in the projection and depression fitting structure. As a result, the occurrence of the sudden slippage on the contact surfaces of the end portion of the inner member and the shoulder portion of the outer joint member can be reliably avoided, and hence the generation of the stick-slip noise can be prevented.

Further, when the bearing device for a wheel has a configuration in which the hub wheel and the outer joint member of the constant velocity universal joint are fastened through an intermediation of a bolt, it is desired that rotation of the bolt in a loosening direction be regulated between a head portion of the bolt and the hub wheel. In this manner, a fastened state of the hub wheel and the constant velocity universal joint can be maintained over a long period of time. Thus, inconvenience such as generation of abnormal noise and acceleration of wear due to loosening of the fastened bolt can be suppressed.

In order to regulate the rotation of the bolt in the loosening direction, the hub wheel may comprise an engagement portion, and the head portion of the bolt may comprise a loosening prevention member engageable with the engagement portion mounted thereon.

Further, the engagement portion may comprise a protruding portion or a recessed portion, and the loosening prevention member may be configured to be engageable with the engagement portion by being crimped at a position of the engagement portion or in a vicinity thereof.

Alternatively, the engagement portion may comprise a protruding portion or a recessed portion, and the loosening prevention member may comprise a projecting portion or a depressed portion engageable with the engagement portion.

Further, the loosening prevention member may comprise a cap member mountable onto the head portion of the bolt through press fitting.

Further, the loosening prevention member may comprise a clip member having an opening portion in a part in a peripheral direction. The clip member is mountable onto the head portion of the bolt through elastic deformation of the opening portion in an enlarged manner.

Further, in order to regulate the rotation of the bolt in the loosening direction, the hub wheel may comprise an engagement portion, and the head portion of the bolt may comprise a flange portion engageable with the engagement portion.

Further, the engagement portion may comprise a protruding portion or a recessed portion, and the flange portion may be configured to be engageable with the engagement portion by being crimped at a position of the engagement portion or in a vicinity thereof.

Further, in order to regulate the rotation of the bolt in the loosening direction, the head portion of the bolt may be fixed to the hub wheel by welding.

Advantageous Effects of Invention

According to the present invention, the plurality of projecting portions formed on one of the hub wheel and the stem section of the outer joint member to extend in the axial direction are press-fitted into the other having the plurality of depressed portions formed to have the interference with respect to the projecting portions. The shape of the projecting portions is transferred to the other to provide the projection and depression fitting structure in which the projecting portion and the depressed portions are brought into close contact with each other at the entire fitting contact portion therebetween. As a result, the depressed portions having the interference with respect to the projecting portions are formed in advance. Therefore, the outer joint member can be press-fitted into the hub wheel with the force equal to or smaller than the axial force generated by the screw fastening. As a result, by setting the difference between the axial force generated by the screw fastening and the axial force generated by the press-fitting force to 32 kN or smaller, the surface pressure on the contact surfaces of the end portion of the inner member and the shoulder portion of the outer joint member can be reduced. Thus, when the rotational torque is applied from the constant velocity universal joint to the wheel bearing at the start of the vehicle, the occurrence of sudden slippage on the contact surfaces can be avoided. Thus, the generation of stick-slip noise can be prevented.

DESCRIPTION OF EMBODIMENTS

Figure 1:
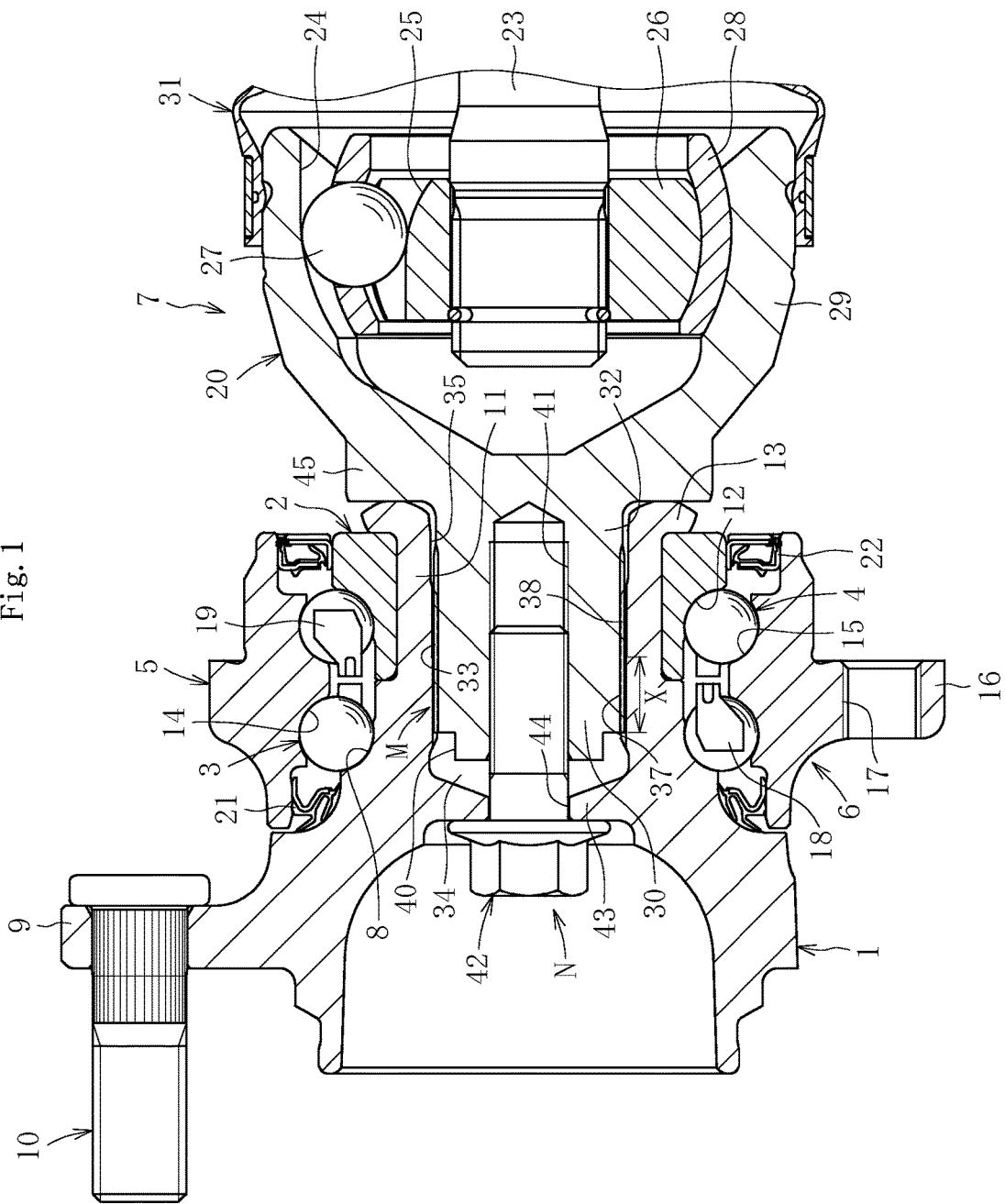
FIG. 1 is a sectional view for illustrating an overall configuration of a bearing device for a wheel according to an embodiment of the present invention.

Now, a bearing device for a wheel according to embodiments of the present invention is described in detail. A bearing device for a wheel illustrated in FIG. 1 comprises, as main components thereof, a constant velocity universal joint 7, and a wheel bearing 6 comprising a hub wheel 1 and an inner ring 2 that serve as an inner member, double-row balls 3 and 4, and an outer ring 5 that serves as an outer member. Note that, in the following description, an outer side of a vehicle body in a state in which the bearing device for a wheel is mounted to the vehicle body is referred to as an outboard side (left side in the figures), and a middle side of the vehicle body is referred to as an inboard side (right side in the figures).

The hub wheel 1 has an inner raceway surface 8 on the outboard side formed on an outer peripheral surface thereof, and comprises a wheel mounting flange 9 for allowing a wheel (not shown) to be mounted thereto. Hub bolts 10 for fixing a wheel disc are equiangularly embedded in the wheel mounting flange 9. The inner ring 2 is fitted to a small-diameter step portion 11 formed on an outer peripheral surface of the hub wheel 1 on the inboard side, and an inner raceway surface 12 on the inboard side is formed on an outer peripheral surface of the inner ring 2.

The inner ring 2 is press-fitted with adequate interference for the purpose of preventing creep. The inner raceway surface 8 on the outboard side that is formed on the outer peripheral surface of the hub wheel 1 and the inner raceway surface 12 on the inboard side that is formed on the outer peripheral surface of the inner ring 2 constitute double-row raceway surfaces. The inner ring 2 is press-fitted into the small-diameter step portion 11 of the hub wheel 1, and the end portion of the small-diameter step portion 11 is crimped outward by orbital forming. As a result, the inner ring 2 is retained by a crimped portion 13 thus formed and integrated with the hub wheel 1, to thereby apply preload to the wheel bearing 6.

The outer ring 5 has double-row outer raceway surfaces 14 and 15 formed on an inner peripheral surface thereof, which are respectively opposed to the inner raceway surface 8 formed on the hub wheel 1 and the inner raceway surface 12 formed on the inner ring 2. The outer ring 5 has a vehicle body mounting flange 16 for mounting the wheel bearing 6 to a vehicle body (not shown) on an outer peripheral surface thereof. The vehicle body mounting flange 16 is fixed to a knuckle extending from a suspension device (not shown) of the vehicle body with a bolt or the like by using a mounting hole 17.

The wheel bearing 6 has a double-row angular ball bearing structure. That is, the balls 3 and 4 are interposed between the inner raceway surfaces 8 and 12 formed on the outer peripheral surfaces of the hub wheel 1 and the inner ring 2 and the outer raceway surfaces 14 and 15 formed on the inner peripheral surface of the outer ring 5. Thus, the balls 3 and 4 in respective rows are equiangularly supported by cages 18 and 19. Note that, the wheel bearing 6 has a structure integrated with the hub wheel 1 by retaining the inner ring 2 by the crimped portion 13 and therefore, is separable from an outer joint member 20 of the constant velocity universal joint 7.

At opening portions on both ends of the wheel bearing 6, a pair of seals 21 and 22 for sealing annular spaces between the outer ring 5 and the hub wheel 1 and between the outer ring 5 and the inner ring 2 are provided. The seals 21 and 22 are fitted to the inner diameter at both end portions of the outer ring 5 so as to prevent leakage of a lubricant such as grease filled inside and entrance of water and foreign matter from the outside. The seal 21 comprises a cored bar and an elastic member. A distal end of a lip of the elastic member is held in sliding-contact with the outer peripheral surface of the hub wheel 1. The type of the seal 22 is called "pack seal". Specifically, the seal 22 comprises two L-shaped cored bars and an elastic member. The elastic member is mounted to one of the cored bars, whereas the distal end of the lip of the elastic member is held in sliding-contact with an outer peripheral surface of another of the cored bars, which is mounted to an outer periphery of the inner ring.

The constant velocity universal joint 7 is a fixed type constant velocity universal joint that is provided to one end of a shaft 23 constituting a drive shaft and allows only an angular displacement between two shafts on a driving side and a driven side. The constant velocity universal joint 7 comprises the outer joint member 20 having track grooves 24 formed in an inner peripheral surface thereof, an inner joint member 26 having track grooves 25 formed in an outer peripheral surface thereof so as to be opposed to the track grooves 24 of the outer joint member 20, balls 27 built into spaces between the track grooves 24 of the outer joint member 20 and the track grooves 25 of the inner joint member 26, and a cage 28 interposed between the inner peripheral surface of the outer joint member 20 and the outer peripheral surface of the inner joint member 26 to retain the balls 27.

The outer joint member 20 comprises a cup-shaped mouth section 29 that accommodates internal components such as the inner joint member 26, the balls 27, and the cage 28, and a stem section 30 that integrally extends from the mouth section 29 in an axial direction. An axial end of the shaft 23 is press-fitted into the inner joint member 26, and is coupled to the shaft 23 by spline fitting to allow torque transmission therebetween.

A bellows-like boot 31 made of a resin is mounted between the outer joint member 20 of the constant velocity universal joint 7 and the shaft 23 to prevent leakage of a lubricant such as grease filled inside the joint, and to prevent entrance of foreign matter from outside the joint, thereby attaining a structure of closing an opening portion of the outer joint member 20 with the boot 31. The boot 31 comprises a large-diameter end portion fastened and fixed with a boot band on an outer peripheral surface of the outer joint member 20, a small-diameter end portion fastened and fixed with a boot band on an outer peripheral surface of the shaft 23, and a flexible bellows portion connecting the large-diameter end portion and the small-diameter end portion, and reduced in diameter as approaching from the large-diameter end portion toward the small-diameter end portion.

Figure 2:
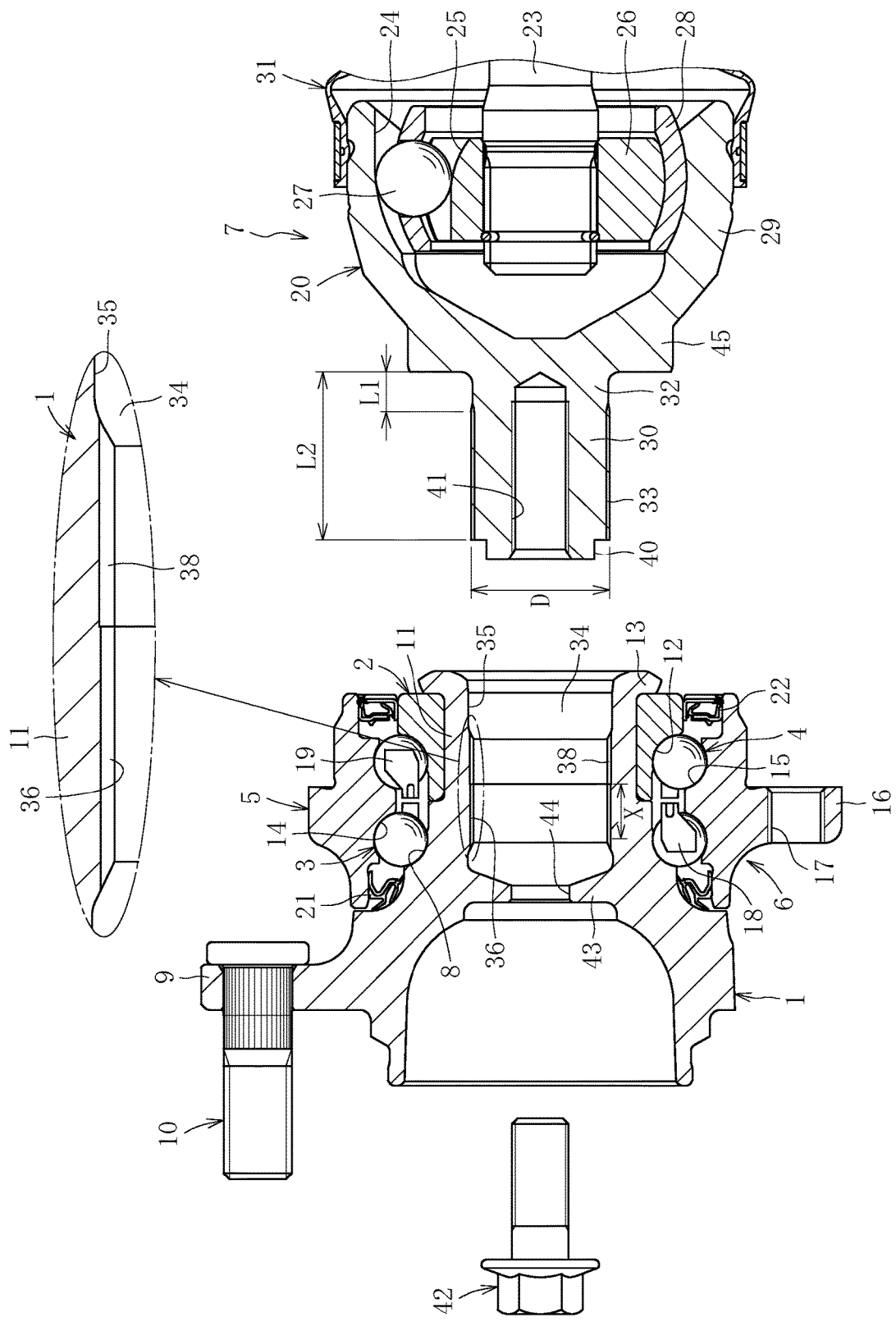
FIG. 2 is a sectional view for illustrating a state before a constant velocity universal joint is mounted to a wheel bearing illustrated in FIG. 1.

In the bearing device for a wheel, as illustrated in FIG. 2, a base portion 32 of the stem section 30 of the outer joint member 20 is formed to have a columnar shape, and a male spline comprising a plurality of projecting portions 33 extending in the axial direction is formed on an outer peripheral surface on the outboard side with respect to the base portion 32. On the other hand, a distal end portion 35 of a shaft hole 34 of the hub wheel 1 is formed to have a cylindrical shape, and a plurality of depressed portions 36 having an interference n with respect only to a peripheral side wall portion 71 (see FIG. 5B) of each of the projecting portions 33 described above are formed on an inner peripheral surface on the outboard side with respect to the distal end portion 35. The depressed portions 36 are set to be smaller than the projecting portions 33 so as to have the interference n with respect only to the peripheral side wall portions 71 of the projecting portions 33. In order to set the depressed portions 36 smaller than the projecting portions 33 as described above, a peripheral dimension of each of the depressed portions 36 only needs to be set smaller than that of each of the projecting portions 33. Further, the remaining portion of each of the projecting portions 33 except for the peripheral side wall portion 71, specifically, a radial distal end portion 72 of each of the projecting portions 33 does not have any interference with respect to the depressed portion 36. Therefore, by setting a radial dimension of each of the depressed portions 36 larger than that of each of the projecting portions 33, each of the depressed portions 36 has a gap p with respect to the radial distal end portion 72 of each of the projecting portions 33.

Figure 3:
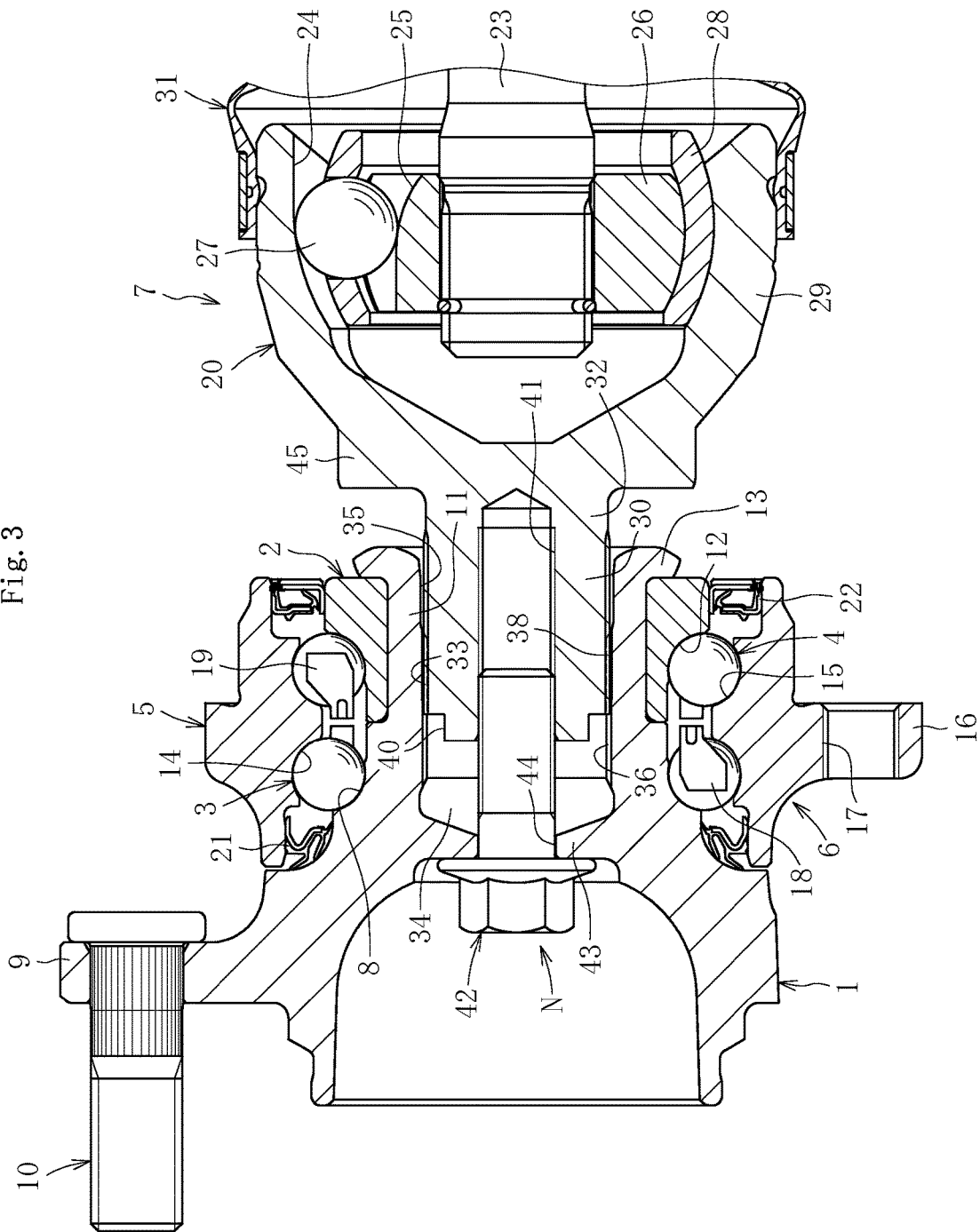
FIG. 3 is a sectional view for illustrating a state in which the constant velocity universal joint is being mounted to the wheel bearing illustrated in FIG. 1.
Figure 5A:
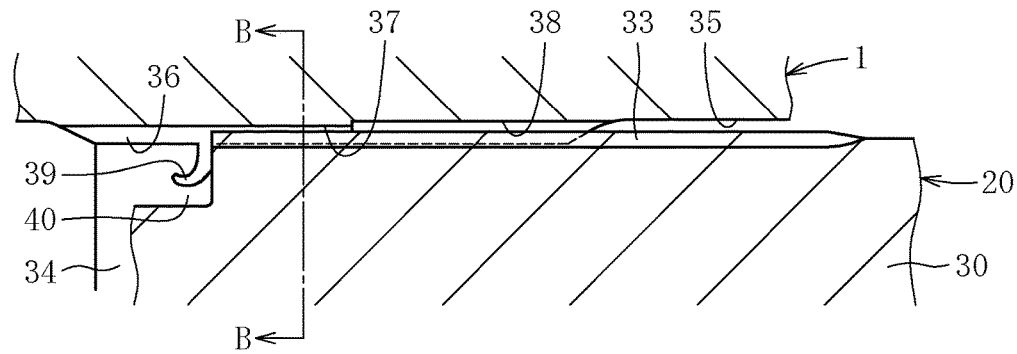
FIG. 5A is an enlarged principal part sectional view for illustrating a state in which the stem section of the outer joint member is being press-fitted into the hub wheel of the wheel bearing in the embodiment where the depressed portions having the interference with respect only to the peripheral side wall portions of the projecting portions are formed.
Figure 5B:
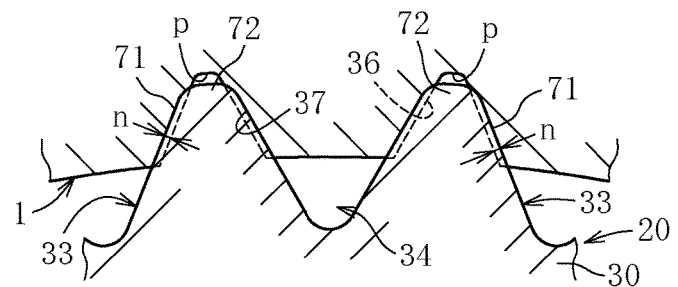
FIG. 5B is a sectional view taken along the line B-B in FIG. 5A.
Figure 6A:
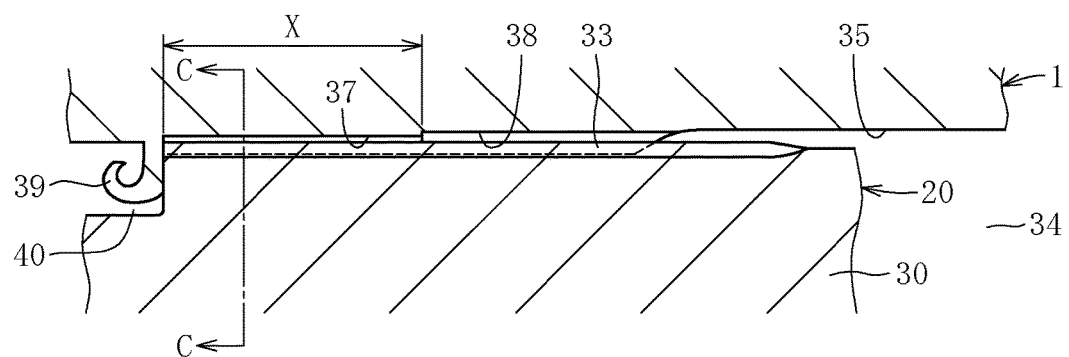
FIG. 6A is an enlarged principal part sectional view for illustrating a state after the stem section of the outer joint member is press-fitted into the hub wheel of the wheel bearing in the embodiment where the depressed portions having the interference with respect only to the peripheral side wall portions of the projecting portions are formed.
Figure 6B:
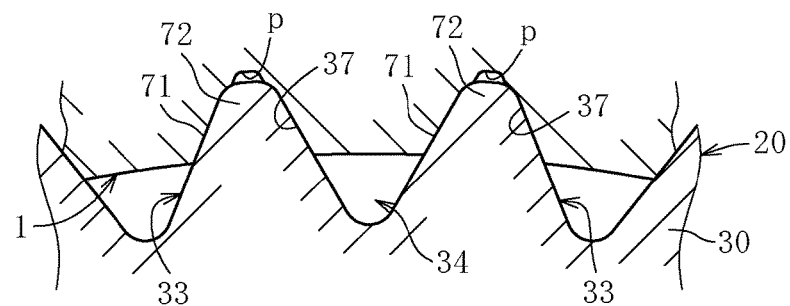
FIG. 6B is a sectional view taken along the line C-C in FIG. 6A.

In the bearing device for a wheel, as illustrated in FIG. 3, FIG. 5A, and FIG. 5B, the stem section 30 of the outer joint member 20 is press-fitted into the shaft hole 34 of the hub wheel 1 so that a shape of the peripheral side wall portions 71 of the projecting portions 33 is transferred to the shaft hole 34 of the hub wheel 1, which is a depressed-portion forming surface on a mating side to form depressed portions 37 (see FIG. 6A and FIG. 6B). The radial distal end portion 72 of each of the projecting portions 33 does not have the interference with respect to the depressed portions 36. Therefore, the shape of the radial distal end portion 72 of each of the projecting portions 33 is not transferred to the depressed portion 36. For press-fitting of the stem section 30 into the shaft hole 34, the depressed-portion forming surface is extremely slightly cut by the peripheral side wall portions 71 of the projecting portions 33. While concomitantly involving extremely small plastic deformation or elastic deformation of the depressed-portion forming surface by the peripheral side wall portions 71 of the projecting portions 33, the shape of the peripheral side wall portions 71 of the projecting portions 33 is transferred to the depressed-portion forming surface. At this time, the projecting portions 33 dig into the depressed-portion forming surface to slightly enlarge the inner diameter of the hub wheel 1. As a result, relative movement of the projecting portions 33 in the axial direction is allowed. When the relative movement of the projecting portions 33 in the axial direction is stopped, the inner diameter of the hub wheel 1 is reduced to recover the original diameter.

In this manner, a projection and depression fitting structure M, in which the projecting portions 33 and the depressed portions 37 are brought into close contact with each other at an entire fitting contact portion X therebetween, is formed. As a result, the outer joint member 20 and the hub wheel 1 can firmly be coupled to and integrated with each other. Through the coupling thus carried out at low cost with high reliability, any gap that may cause a backlash is not formed in the radial direction and a peripheral direction in the fitting portion between the stem section 30 and the hub wheel 1 in the projection and depression fitting structure M, and hence the entire fitting contact portion X contributes to torque transmission so that stable torque transmission can be carried out. As a result, annoying gear rattling noise can be prevented over a long period of time. The close contact is realized at the entire fitting contact portion X, and hence the strength of the torque transmitting portion is enhanced. As a result, the bearing device for a wheel is light-weighted and downsized.

Here, a surface hardness of the projecting portions 33 is set larger than a surface hardness of the depressed portions 36. In this case, the difference between the surface hardness of the projecting portions 33 and the surface hardness of the depressed portions 36 is set equal to or larger than 20 in HRC. Thus, when the stem section 30 of the outer joint member 20 is press-fitted into the shaft hole 34 of the hub wheel 1, the depressed-portion forming surface is extremely slightly cut by the peripheral side wall portions 71 of the projecting portions 33. While concomitantly involving the extremely small plastic deformation or elastic deformation of the depressed-portion forming surface by the peripheral side wall portions 71 of the projecting portions 33, the shape of the peripheral side wall portions 71 of the projecting portions 33 can be easily transferred to the depressed-portion forming surface on the mating side.

Figure 4A:
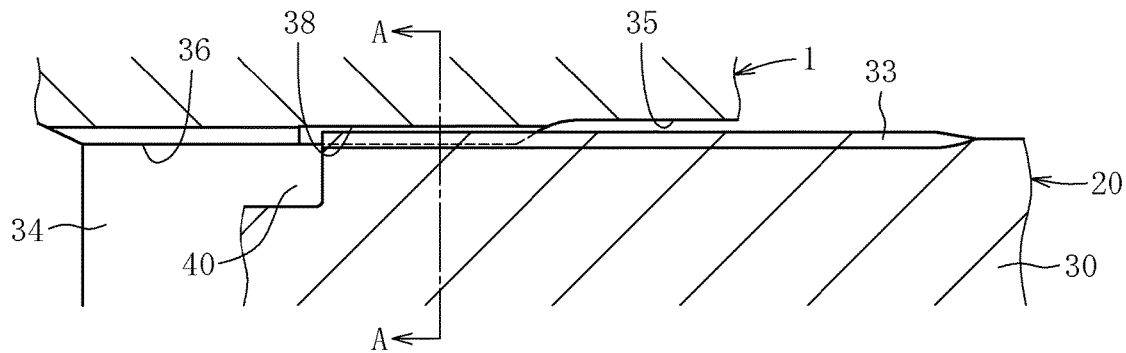
FIG. 4A is an enlarged principal part sectional view for illustrating a state before a stem section of an outer joint member is press-fitted into a hub wheel of the wheel bearing in an embodiment where depressed portions having an interference with respect only to peripheral side wall portions of projecting portions are formed.
Figure 4B:
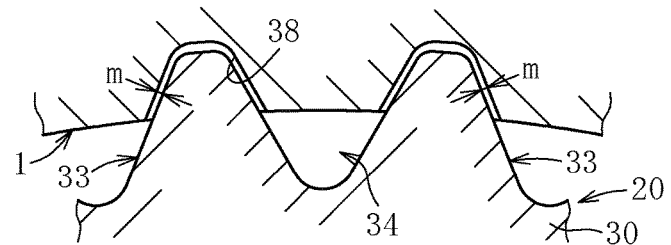
FIG. 4B is a sectional view taken along the line A-A in FIG. 4A.

Further, as illustrated in FIG. 4A and FIG. 4B, a guide portion for guiding the start of the press fitting is provided on the inboard side of the depressed portion 36 that is formed in the shaft hole 34 of the hub wheel 1 in advance. The guide portion comprises depressed portions 38 formed relatively larger than the projecting portions 33 of the stem section 30 (see the enlarge portion of FIG. 2). That is, gaps m are formed between the projecting portions 33 and the depressed portions 38. When press-fitting the stem section 30 of the outer joint member 20 into the hub wheel 1, the guide portion can guide the projecting portions 33 of the stem section 30 so that the projecting portions 33 are reliably press-fitted into the depressed portions 36 of the hub wheel 1. Thus, stable press fitting can be carried out to prevent axial misalignment, axial inclination, and the like at the time of press fitting.

Further, an accommodating portion 40 for accommodating a flash portion 39 generated due to the transfer of the shape of the projecting portions through the press fitting (cutting work and plastic deformation or elastic deformation occurring therewith) is secured between the shaft hole 34 of the hub wheel 1 and the stem section 30 of the outer joint member 20 (see FIG. 5A and FIG. 6A). The accommodating portion 40 is formed between the stem section 30 of the outer joint member 20 and the inner peripheral surface of the shaft hole 34 of the hub wheel 1 by reducing a diameter of an axial end of the stem section 30 of the outer joint member 20. Thus, the flash portion 39 generated due to the transfer of the shape of the projecting portions through the press fitting can be kept in the accommodating portion 40, thereby being capable of inhibiting the flash portion 39 from entering, for example, the inside of the vehicle that is positioned outside the device. The flash portion 39 is kept in the accommodating portion 40, and hence a process of removing the flash portion 39 becomes unnecessary so that the number of working steps can be reduced. As a result, workability can be enhanced and costs can be reduced.

The bearing device for a wheel comprises the following screw fastening structure N, as illustrated in FIG. 1 to FIG. 3. The screw fastening structure N is used for press-fitting work for the stem section 30 of the outer joint member 20 into the shaft hole 34 of the hub wheel 1. The screw fastening structure N comprises a female thread portion 41 formed at an axial end of the stem section 30 of the outer joint member 20, and a bolt 42 serving as a male thread portion to be locked at the hub wheel 1 in a state of being threadedly engaged with the female thread portion 41. In this structure, the bolt 42 is inserted into a through hole 44 of a protruding wall portion 43 formed on the shaft hole 34 of the hub wheel 1 to be threadedly engaged with the female thread portion 41 of the stem section 30. Then, by fastening the bolt 42 in a state of being locked to the protruding wall portion 43 of the hub wheel 1, the outer joint member 20 of the constant velocity universal joint 7 is pulled in to press-fit the stem section 30 of the outer joint member 20 into the shaft hole 34 of the hub wheel 1, thereby fixing the constant velocity universal joint 7 to the hub wheel 1. By the fastening of the bolt 42, a shoulder portion 45 of the outer joint member 20 is brought into abutment against the crimped portion 13 of the hub wheel 1.

When the shape of the peripheral side wall portions 71 of the projecting portions 33 is transferred to the shaft hole 34 of the hub wheel 1 to form the depressed portions 37 at the time of press fitting the stem section 30 into the hub wheel 1, the depressed portions 36 having the interference n with respect only to the peripheral side wall portions 71 of the projecting portions 33, that is, the depressed portions 36 set smaller in the peripheral dimension than the projecting portions 33 are formed in advance (see FIG. 5B), and hence the outer joint member 20 can be press-fitted into the hub wheel 1 with a force that is equal to or smaller than an axial force generated by fastening the bolt 42. That is, the outer joint member 20 is press-fitted into the hub wheel 1 of the wheel bearing 6 with the pull-in force of the bolt 42 so that the constant velocity universal joint 7 is easily coupled to the wheel bearing 6. Thus, the workability can be enhanced when mounting the bearing device for a wheel to the vehicle body, and the damage to the components can be prevented at the time of mounting the bearing device for a wheel.

As described above, there is no need to separately prepare a dedicated jig when press-fitting the outer joint member 20 into the hub wheel 1 of the wheel bearing 6. The constant velocity universal joint 7 can easily be coupled to the wheel bearing 6 with the bolt 42 that is a component of the bearing device for a wheel. Further, the outer joint member 20 can be press-fitted by applying the relatively small pull-in force, which is equal to or smaller than the axial force generated by fastening the bolt 42, and hence the workability can be enhanced when pulling in the outer joint member 20 with the bolt 42. Still further, there is no need to apply a significant press-fitting load, and hence the damage to (collapse of) the projections and depressions can be prevented in the projection and depression fitting structure M, with the result that a high-quality and long-life projection and depression fitting structure M can be realized.

The screw fastening structure N, in which the shoulder portion 45 of the outer joint member 20 is brought into abutment against the crimped portion 13 of the hub wheel 1 by fastening the bolt 42 as described above, is formed. In the bearing device for a wheel, the outer joint member 20 can be press-fitted into the hub wheel 1 with a force that is equal to or smaller than the axial force generated by fastening the bolt 42. Therefore, a difference between the axial force generated by fastening the bolt 42 and an axial force generated by a press-fitting force on the outer joint member 20 into the hub wheel 1 is set to 32 kN or smaller, preferably, 28 kN or smaller. This means that the difference between the axial force generated by fastening the bolt 42 and the axial force generated by the press-fitting force on the stem section 30 into the hub wheel 1, that is, an axial force generated on contact surfaces of the crimped portion 13 of the hub wheel 1 and the shoulder portion 45 of the outer joint member 20 is set to 32 kN or smaller.

Figure 66:
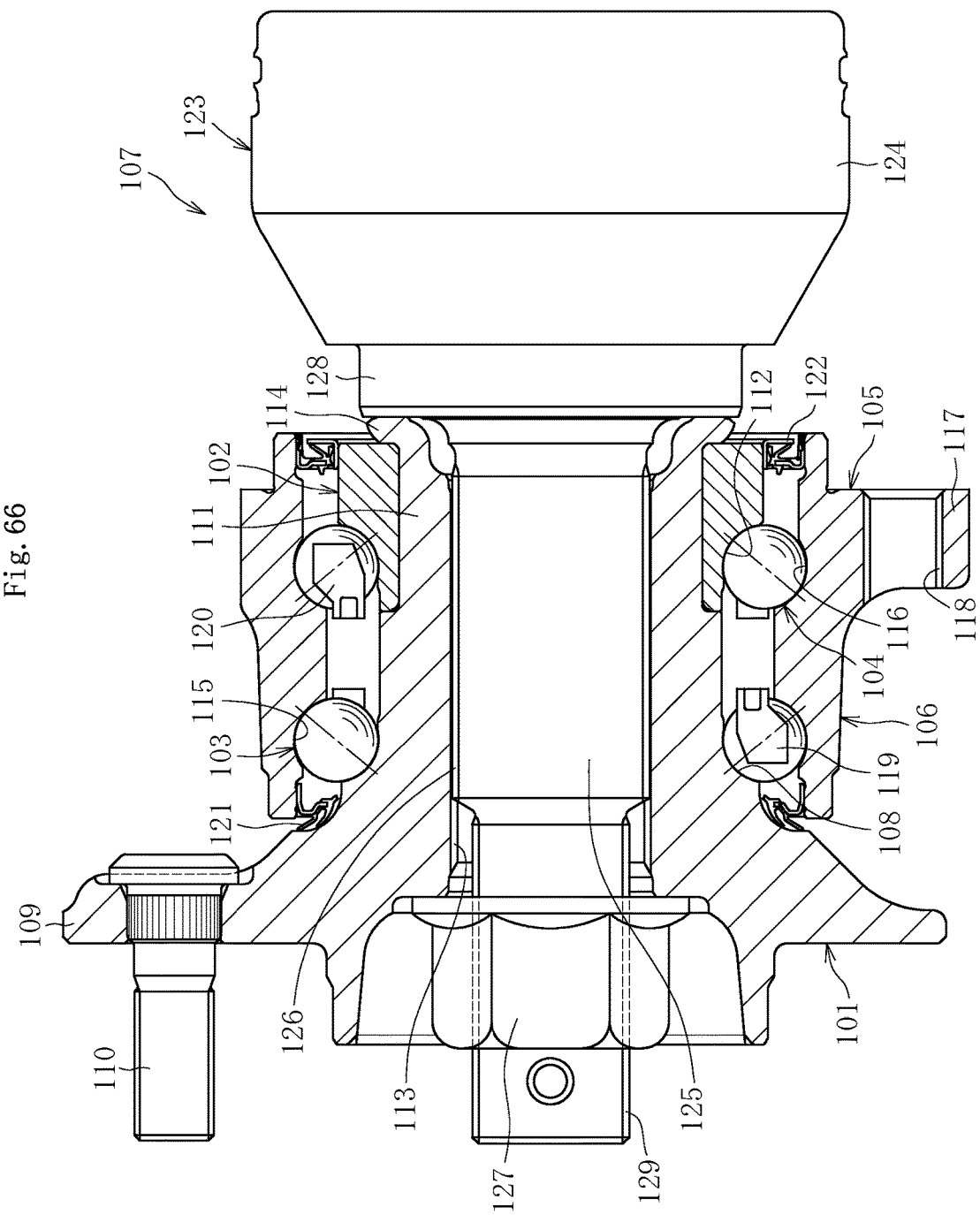
FIG. 66 is a sectional view for illustrating an overall configuration of a related-art bearing device for a wheel.

Here, the related-art bearing device for a wheel (see FIG. 66) adopts a fitting structure between the female spline 113 on the shaft hole of the hub wheel 101 and the male spline 126 on the stem section 125 of the outer joint member 123. Through the adoption of the fitting structure, the axial force generated by fastening the nut 127 becomes an axial force generated on the contact surfaces of the crimped portion 114 of the hub wheel 101 and the shoulder portion 128 of the outer joint member 123. Specifically, the axial force generated by fastening the nut 127 and the axial force generated on the contact surfaces of the crimped portion 114 of the hub wheel 101 and the shoulder portion 128 of the outer joint member 123 are equal to each other.

On the other hand, the bearing device for a wheel of this embodiment adopts the structure in which the depressed-portion forming surface is extremely slightly cut by the peripheral side wall portions 71 of the projecting portions 33 in a state in which the depressed portions 36 having the interference n with respect to the peripheral side wall portions 71 of the projecting portions 33 formed on the stem section 30 of the outer joint member 20 are formed on the shaft hole 34 of the hub wheel 1 in advance at the time of fastening the bolt 42, and the stem section 30 of the outer joint member 20 is press-fitted into the shaft hole 34 of the hub wheel 1, while concomitantly involving the extremely small plastic deformation or elastic deformation of the depressed-portion forming surface, which is caused by the peripheral side wall portions 71 of the projecting portions 33, so that the depressed portions 37 are formed by transferring the shape of the peripheral side wall portions 71 of the projecting portions 33 onto the depressed-portion forming surface (see FIG. 5A and FIG. 5B). Through the adoption of the structure, the difference between the axial force generated by fastening the bolt 42 and the axial force generated by the press-fitting force on the outer joint member 20 into the hub wheel 1 becomes the axial force generated on the contact surfaces of the crimped portion 13 of the hub wheel 1 and the shoulder portion 45 of the outer joint member 20.

Specifically, the axial force generated on the contact surfaces of the crimped portion 13 of the hub wheel 1 and the shoulder portion 45 of the outer joint member 20 can be made smaller than the axial force generated by fastening the bolt 42 by the amount of axial force generated by the press-fitting force on the outer joint member 20 into the hub wheel 1. In this manner, a surface pressure on the contact surfaces of the crimped portion 13 of the hub wheel 1 and the shoulder portion 45 of the outer joint member 20 can be made smaller than in the case of the related-art bearing device for a wheel. Thus, when the rotational torque is applied from the constant velocity universal joint 7 to the wheel bearing 6 at the start of the vehicle, the occurrence of sudden slippage on the contact surface can be avoided. Therefore, the generation of the stick-slip noise can be prevented.

Figures 7, 8:
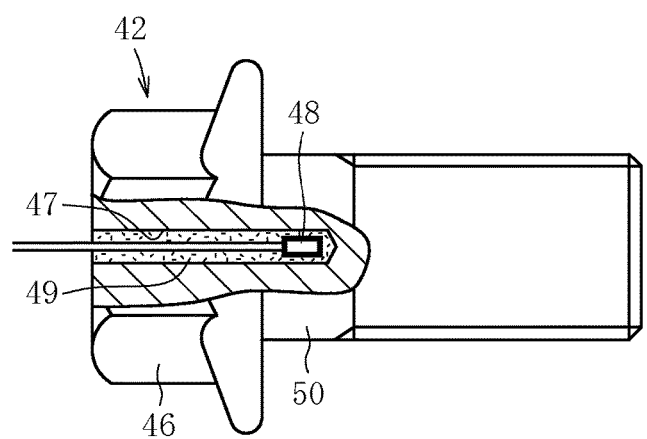
FIG. 7 is a table for showing experimental results based on axial-force measurements conducted by the applicant of the present invention.
FIG. 8 is a front view partially in section, for illustrating a bolt including a strain gauge embedded therein.
Figure 9A:
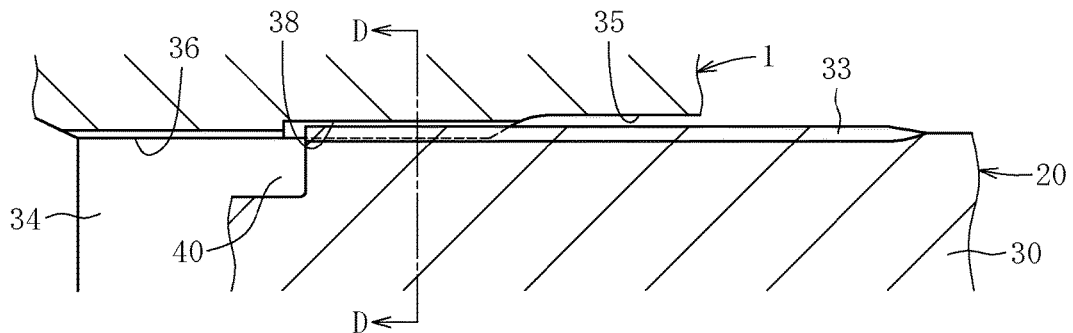
FIG. 9A is an enlarged principal part sectional view for illustrating a state before the stem section of the outer joint member is press-fitted into the hub wheel of the wheel bearing in an embodiment where the depressed portions having the interference with respect to the peripheral side wall portions and radial distal end portions of the projecting portions are formed.
Figure 9B:
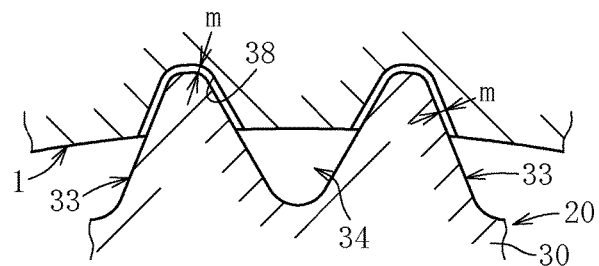
FIG. 9B is a sectional view taken along the line D-D in FIG. 9A.

In FIG. 7, there are shown the results of experiments carried out by the applicant of the present invention based on axial-force measurements to measure the axial force generated by fastening the bolt 42 and the axial force generated by the press-fitting force on the outer joint member 20 into the hub wheel 1 so as to confirm whether or not the stick-slip noise is generated, for items according to the present invention (No. 1 to No. 7) and comparative items (No. 8 to No. 13).

Note that, as illustrated in FIG. 8, the measurement of the axial force generated by fastening the bolt 42 is carried out by using a strain gauge 48 embedded into a hole 47 formed in a head portion 46 of the bolt 42 with an adhesive 49 after the formation of the hole 47. The strain gauge 48 is provided inside a shank-portion base part 50 of the bolt 42 in an embedded state. In order to convert a strain value measured by the strain gauge 48 into the axial force, a tension test for the bolt 42 comprising the strain gauge 48 embedded therein is carried out in advance so as to calibrate a relationship between the strain value and the axial force. Further, for the measurement of the axial force generated by the press-fitting force on the outer joint member 20 into the hub wheel 1, independently of the pull-in by the bolt 42, the press-fitting force is measured with the connection to a tension and compression tester when the stem section 30 of the outer joint member 20 is press-fitted into the shaft hole 34 of the hub wheel 1.

In the experiments based on the axial-force measurements, as shown in FIG. 7, in the items according to the present invention (No. 1 to No. 7) in which the difference between the axial force generated by fastening the bolt 42 and the axial force generated by the press-fitting force on the outer joint member 20 into the hub wheel 1, that is, the axial force generated on the contact surfaces of the crimped portion 13 of the hub wheel 1 and the shoulder portion 45 of the outer joint member 20 becomes 32 kN or smaller, the stick-slip noise was not generated. On the other hand, in the comparative items (No. 8 to No. 13) in which the axial force generated on the contact surfaces of the crimped portion 13 of the hub wheel 1 and the shoulder portion 45 of the outer joint member 20 becomes larger than 32 kN, the results that the generation of the stick-slip noise was generated were obtained. Note that, it is preferred to set the axial force generated on the contact surfaces of the crimped portion 13 of the hub wheel 1 and the shoulder portion 45 of the outer joint member 20 to 28 kN or smaller. The value 28 kN is an average value of the axial forces of the items according to the present invention (No. 1 to No. 7).

Further, in the bearing device for a wheel according to this embodiment, as illustrated in FIG. 2, a value obtained by dividing an axial length L1 from the shoulder portion 45 of the outer joint member 20, against which the crimped portion 13 of the hub wheel 1 abuts, to the projecting portion 33 (raised portion of the male spline) by a maximum outer diameter D of the stem section 30 is set to 0.3 or smaller, whereas a value obtained by dividing an axial length L2 of the stem section 30 (axial length from the shoulder portion 45 of the outer joint member 20 to an outboard-side end portion of the projecting portion 33) by the maximum outer diameter D of the stem section 30 is set to 1.3 or smaller. Here, the maximum outer diameter D of the stem section 30 means an outer diameter of tip portions of the projecting portions 33 (male spline).

As described above, by setting the axial lengths L1 and L2 with respect to the maximum outer diameter D of the stem section 30, when the rotational torque is applied from the constant velocity universal joint 7 to the wheel bearing 6 at the start of the vehicle, the torsion amount of the outer joint member 20 can be reduced after the effective fitting length in the projection and depression fitting structure M is ensured. As a result, the occurrence of the sudden slippage on the contact surfaces of the crimped portion 13 of the hub wheel 1 and the shoulder portion 45 of the outer joint member 20 can be reliably avoided. Therefore, the generation of the stick-slip noise can be further reliably prevented.

Note that, if the value obtained by dividing the axial length L1 from the shoulder portion 45 of the outer joint member 20 to the projecting portions 33 by the maximum outer diameter D of the stem section 30 is larger than 0.3 or the value obtained by dividing the axial length L2 of the stem section 30 by the maximum outer diameter D of the stem section 30 is larger than 1.3, it becomes difficult to ensure the effective fitting length in the projection and depression fitting structure M or reduce the torsion amount of the outer joint member 20 at the time of application of the torque. As a result, the sudden slippage is likely to occur on the contact surfaces of the crimped portion 13 of the hub wheel 1 and the shoulder portion 45 of the outer joint member 20, and hence it becomes difficult to prevent the generation of the stick-slip noise.

In the embodiment described above, the case where the interference n is set to be provided with respect only to the peripheral side wall portions 71 (see FIG. 5B) of the projecting portions 33 has been described. However, the setting of the interference is not limited thereto. As in an embodiment illustrated in FIG. 9A and FIG. 9B to FIG. 11A and FIG. 11B, the interference n may be set not only for the peripheral side wall portions 71 of the projecting portions 33, but also for a portion including the radial distal end portions 72, specifically, a region from a middle of an angle shape of each of the projecting portions 33 to a top of the angle shape. As described above, the depressed portions 36 are set smaller than the projecting portions 33 so that the entire region of each of the depressed portions 36 has the interference n with respect to the peripheral side wall portions 71 and the radial distal end portion 72 of each of the projecting portions 33. In order to set the depressed portions 36 smaller than the projecting portions 33 as described above, a peripheral dimension and a radial dimension of each of the depressed portions 36 only need to be set smaller than those of each of the projecting portions 33.

Figure 10A:
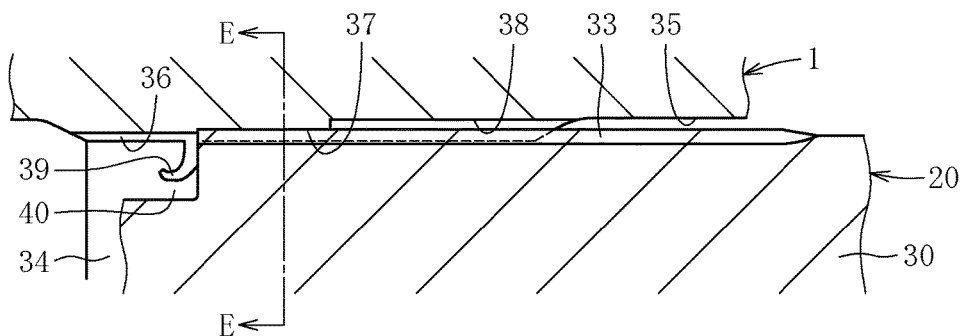
FIG. 10A is an enlarged principal part sectional view for illustrating a state in which the stem section of the outer joint member is being press-fitted into the hub wheel of the wheel bearing in the embodiment where the depressed portions having the interference with respect to the peripheral side wall portions and the radial distal end portions of the projecting portions are formed.
Figure 10B:
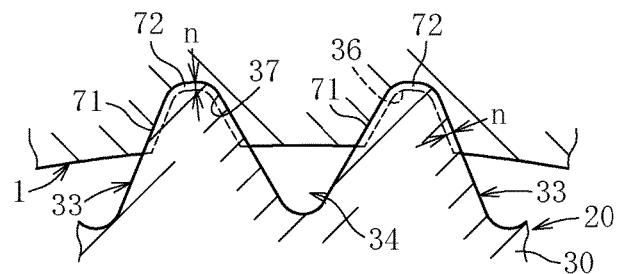
FIG. 10B is a sectional view taken along the line E-E in FIG. 10A.
Figure 11A:
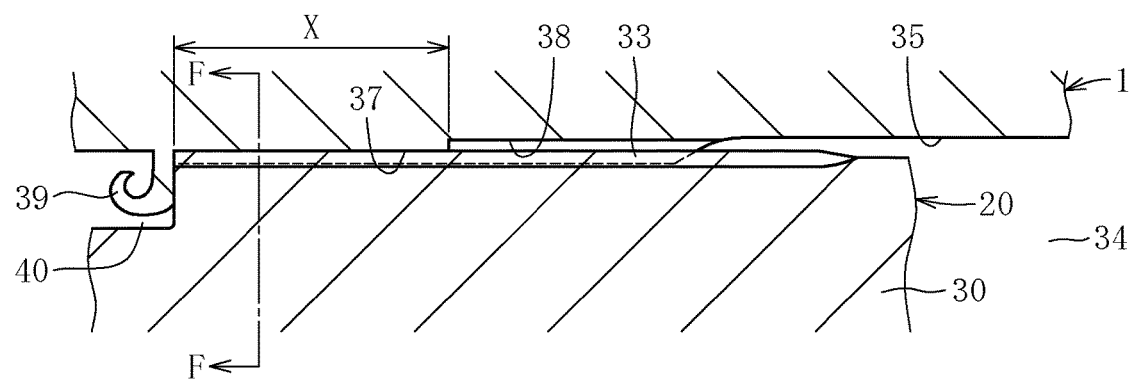
FIG. 11A is an enlarged principal part sectional view for illustrating a state after the stem section of the outer joint member is press-fitted into the hub wheel of the wheel bearing in the embodiment where the depressed portions having the interference with respect to the peripheral side wall portions and the radial distal end portions of the projecting portions are formed.
Figure 11B:
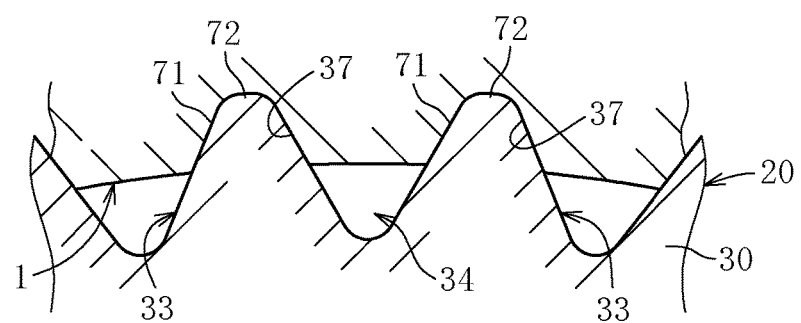
FIG. 11B is a sectional view taken along the line F-F in FIG. 11A.
Figure 12:
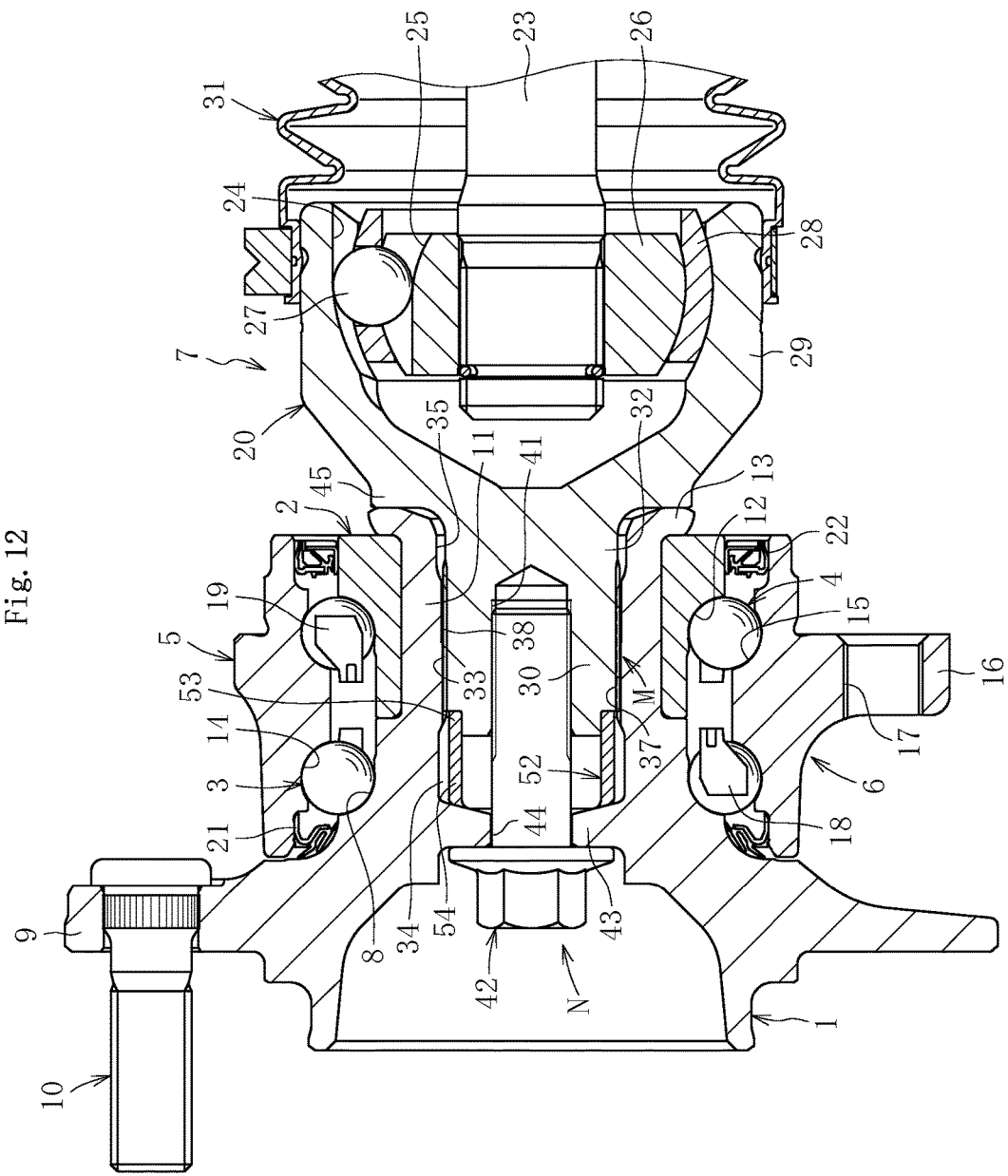
FIG. 12 is a sectional view for illustrating a mode in which a cylindrical seal is mounted to the stem section of the outer joint member according to another embodiment of the present invention.
Figure 13:
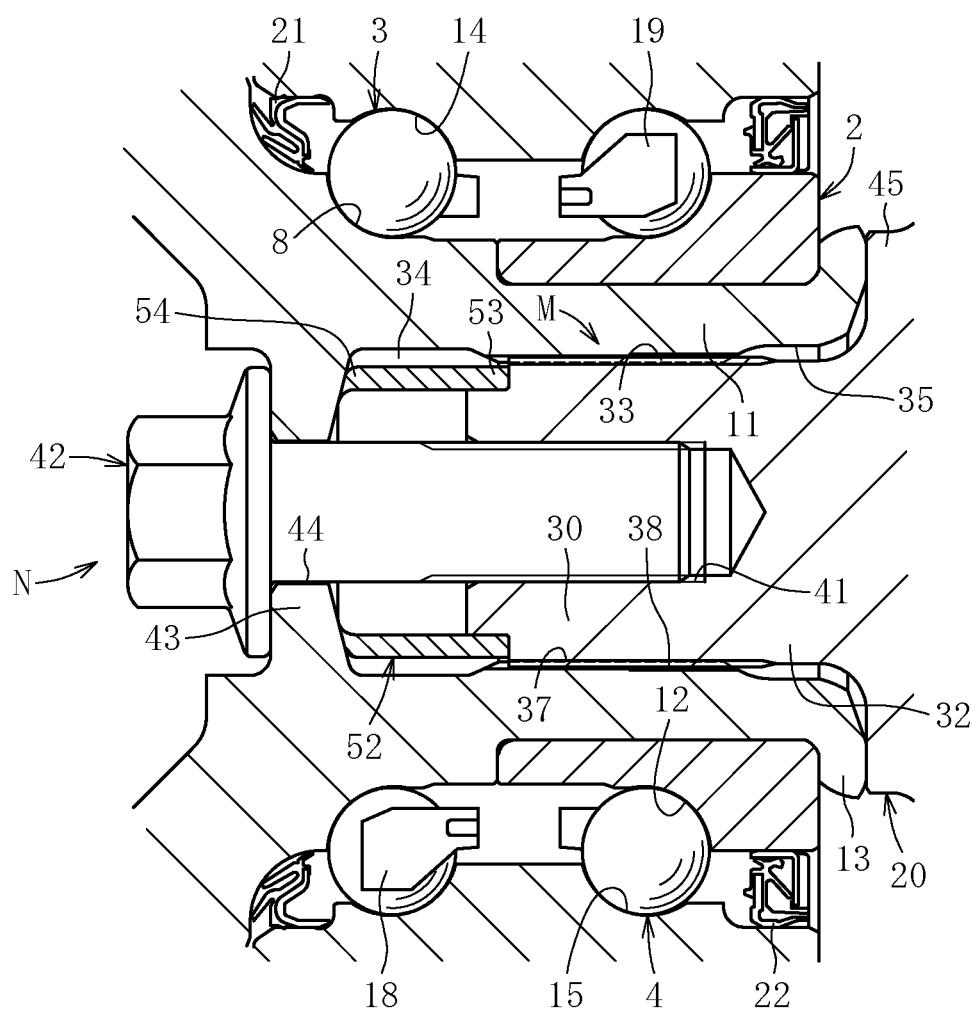
FIG. 13 is an enlarged principal part sectional view of FIG. 12.
Figure 14:
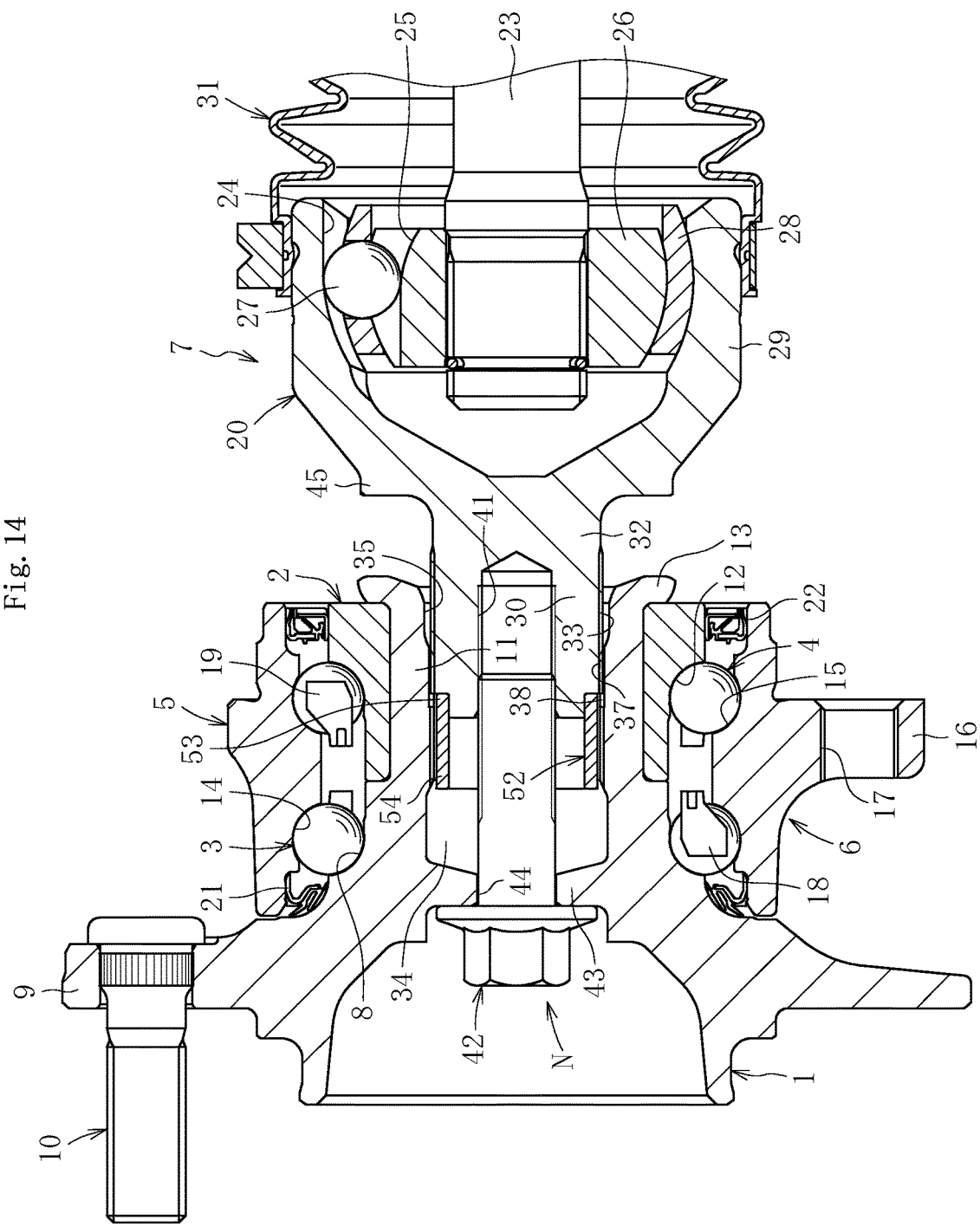
FIG. 14 is a sectional view for illustrating a state in which the constant velocity universal joint is being mounted to the wheel bearing illustrated in FIG. 12.
Figure 15:
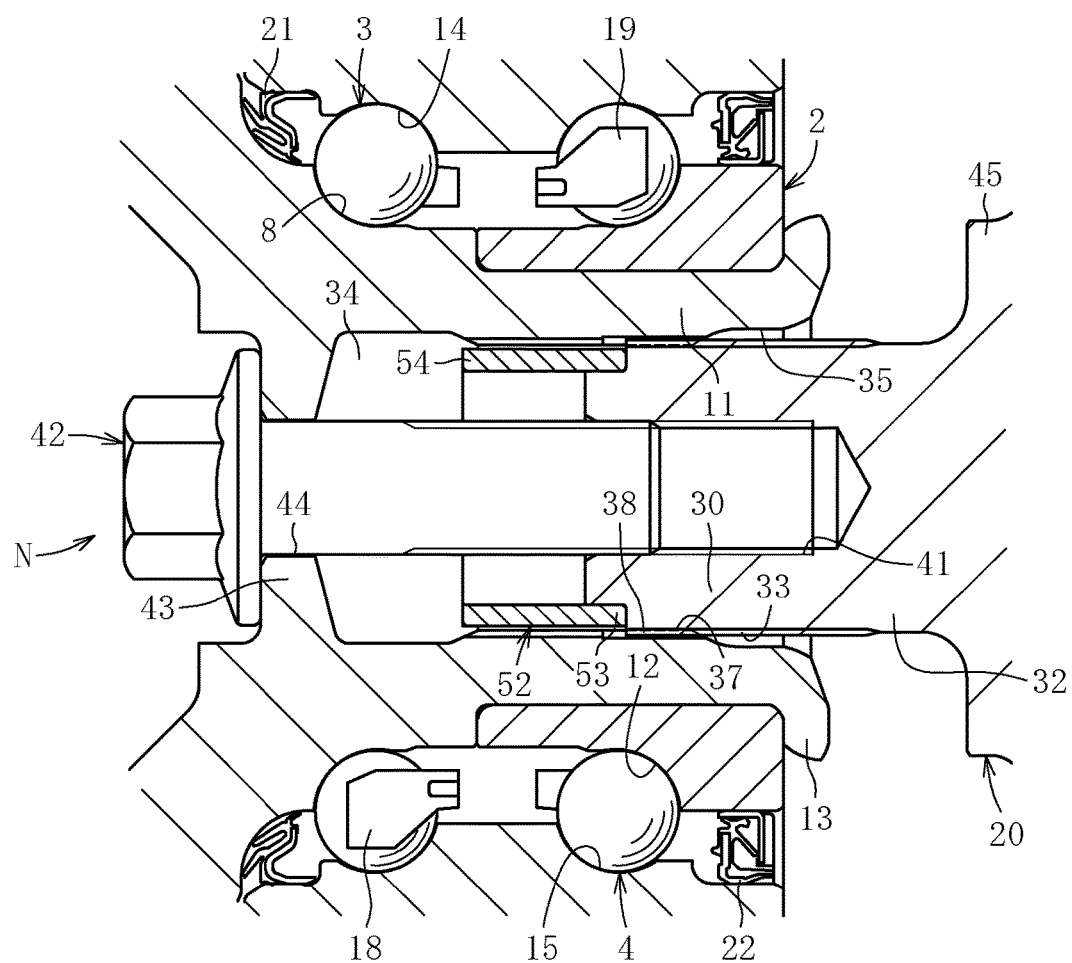
FIG. 15 is an enlarged principal part sectional view of FIG. 14.

Also in the embodiment described above, as illustrated in FIG. 9A and FIG. 9B, when the stem section 30 of the outer joint member 20 is press-fitted into the hub wheel 1, the projecting portions 33 of the stem section 30 are guided so as to be reliably press-fitted into the depressed portions 36 of the hub wheel 1 by guiding portions (depressed portions 38). Then, as illustrated in FIG. 10A and FIG. 10B, the depressed-portion forming surface is extremely slightly cut by the peripheral side wall portions 71 and the radial distal end portions 72 of the projecting portions 33. While concomitantly involving the extremely small plastic deformation or elastic deformation of the depressed-portion forming surface, which is caused by the peripheral side wall portions 71 and the radial distal end portions 72 of the projecting portions 33, the shapes of the peripheral side wall portions 71 and the radial distal end portions of the projecting portions 33 are transferred onto the depressed-portion forming surface. At this time, the inner diameter of the hub wheel 1 is slightly enlarged by the projecting portions 33 digging into the depressed-portion forming surface. As a result, the relative movement of the projecting portions 33 in the axial direction is allowed. When the relative movement of the projecting portions 33 in the axial direction is stopped as illustrated in FIG. 11A and FIG. 11B, the shaft hole 34 of the hub wheel 1 is reduced in diameter so as to recover its original diameter, resulting in formation of the depressed portions 37 on the shaft hole 34 of the hub wheel 1.

Note that, in the embodiment illustrated in FIG. 4A and FIG. 4B to FIG. 6A and FIG. 6B described above, the interference n is set so as to be provided with respect only to the peripheral side wall portions 71 (see FIG. 5B) of the projecting portions 33. On the other hand, in the embodiment illustrated in FIG. 9A and FIG. 9B to FIG. 11A and FIG. 11B, the interference n is set so as to be provided with respect to the peripheral side wall portions 71 and the radial distal end portions 72 (see FIG. 10B) of the projecting portions 33. In the case of the embodiment where the interference n is set so as to be provided with respect only to the peripheral side wall portions 71 of the projecting portions 33, a press-fitting load can be reduced as compared to the embodiment where the interference n is set with respect to the peripheral side wall portions 71 and the radial distal end portions 72 of the projecting portions 33.

Each of bearing devices for a wheel according to embodiments illustrated in FIG. 12 to FIG. 27 comprises a seal structure for preventing muddy water or the like from entering the projection and depression fitting structure M for the purpose of rust prevention for the projection and depression fitting structure M. The configuration other than the seal structure in the embodiments is the same as that of the above-mentioned embodiments illustrated in FIG. 1 to FIG. 11. Therefore, the same reference symbols as those in FIG. 1 to FIG. 11 are provided so as to omit the overlapping description thereof.

In the embodiment illustrated in FIG. 12 to FIG. 15, there is provided a structure comprising a seal 52 having a cylindrical shape interposed between the stem section 30 of the outer joint member 20 and the protruding wall portion 43 of the hub wheel 1. The seal 52 is preferably an elastic member made of rubber or a resin. An inboard-side end portion 53 of the seal 52 is fitted into an axial end small-diameter portion that is the accommodating portion 40 formed in the stem section 30 so as to be fixed thereto (see FIG. 14 and FIG. 15). By pulling the stem section 30 of the outer joint member 20 when the bolt 42 is fastened, an outboard-side end portion 54 of the seal 52 is pressed against the protruding wall portion 43 of the hub wheel 1 so as to be brought into close contact therewith with a predetermined interference (see FIG. 12 and FIG. 13). In this manner, even when muddy water or the like enters through the through hole 44 of the protruding wall portion 43 of the hub wheel 1, into which the bolt 42 is inserted, the muddy water or the like is inhibited from reaching the projection and depression fitting structure M by the seal 52 interposed between the stem section 30 of the outer joint member 20 and the protruding wall portion 43 of the hub wheel 1.

Figure 16:
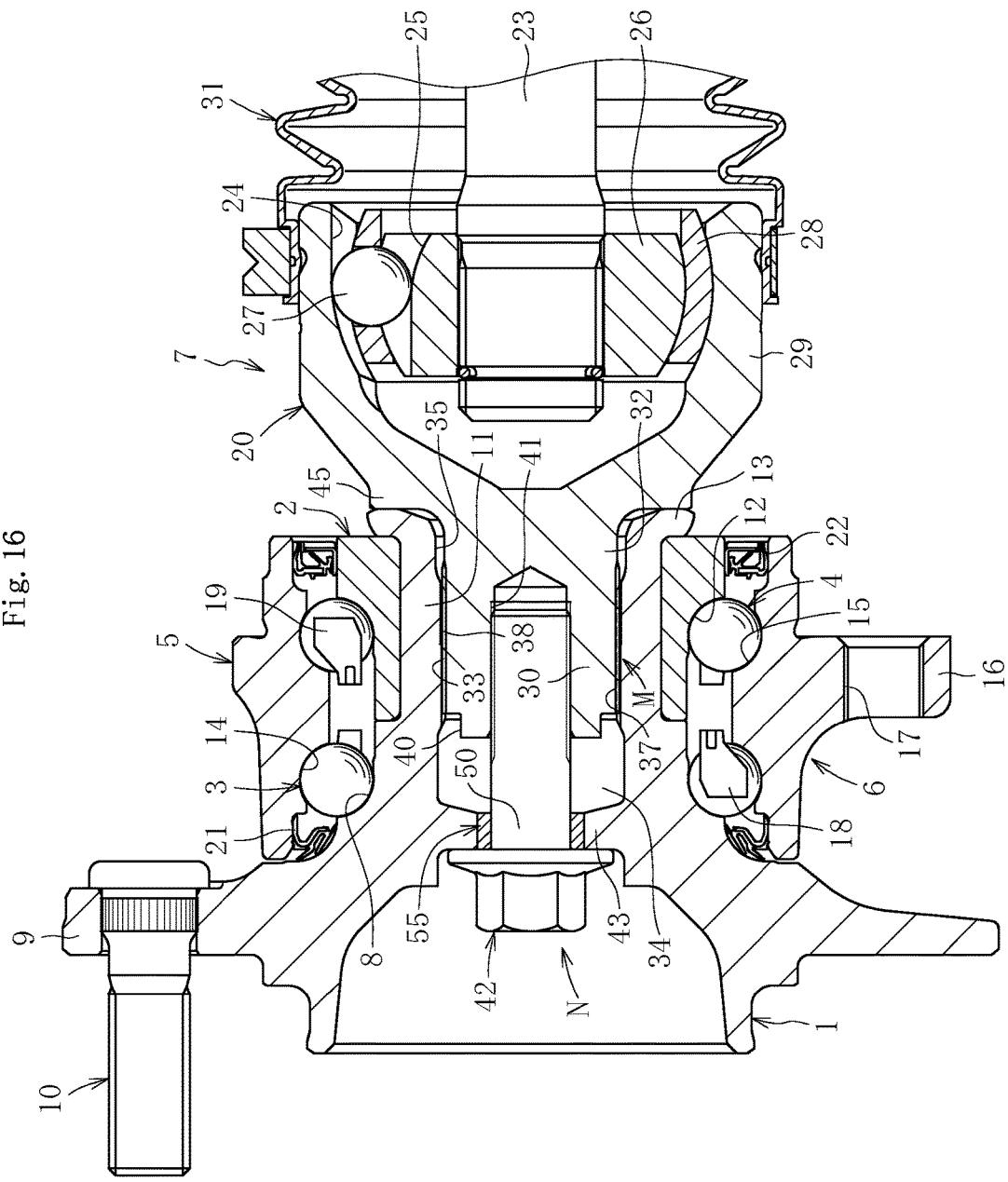
FIG. 16 is a sectional view for illustrating a mode in which the cylindrical seal is interposed between the hub wheel and the bolt according to a further embodiment of the present invention.
Figure 17:
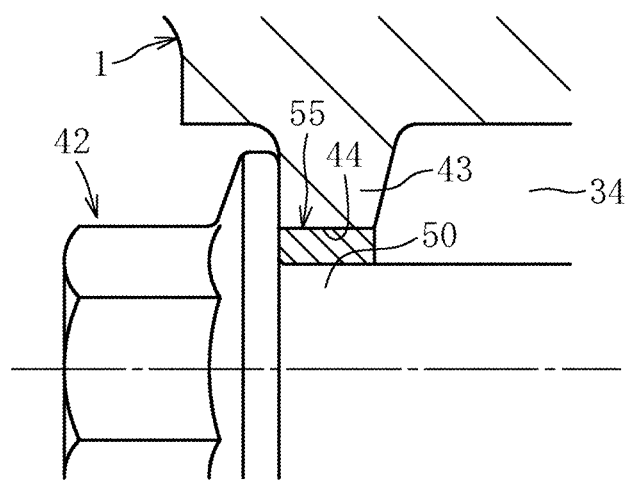
FIG. 17 is an enlarged principal part sectional view of FIG. 16.

In the embodiment illustrated in FIG. 16 and FIG. 17, there is provided a structure comprising a seal 55 having a cylindrical shape interposed between the protruding wall portion 43 of the hub wheel 1 and the bolt 42. The seal 55 is preferably an elastic member made of rubber or a resin. An inner peripheral surface of the seal 55 is brought into close contact with the shank-portion base part 50 of the bolt 42 with a predetermined interference by fixing an outer peripheral surface of the seal 55 to an inner diameter of the through hole of the protruding wall portion 43 of the hub wheel 1 with an adhesive or the like, or the outer peripheral surface is brought into close contact with the inner diameter of the through hole of the protruding wall portion 43 of the hub wheel 1 with a predetermined interference by fixing the inner peripheral surface to the shank-portion base part 50 of the bolt 42 with the adhesive or the like. In this manner, the muddy water or the like is inhibited from entering the projection and depression fitting structure M through the through hole 44 of the protruding wall portion 43 of the hub wheel 1, into which the bolt 42 is inserted, by the seal 55 interposed between the protruding wall portion 43 of the hub wheel 1 and the bolt 42.

Figure 18:
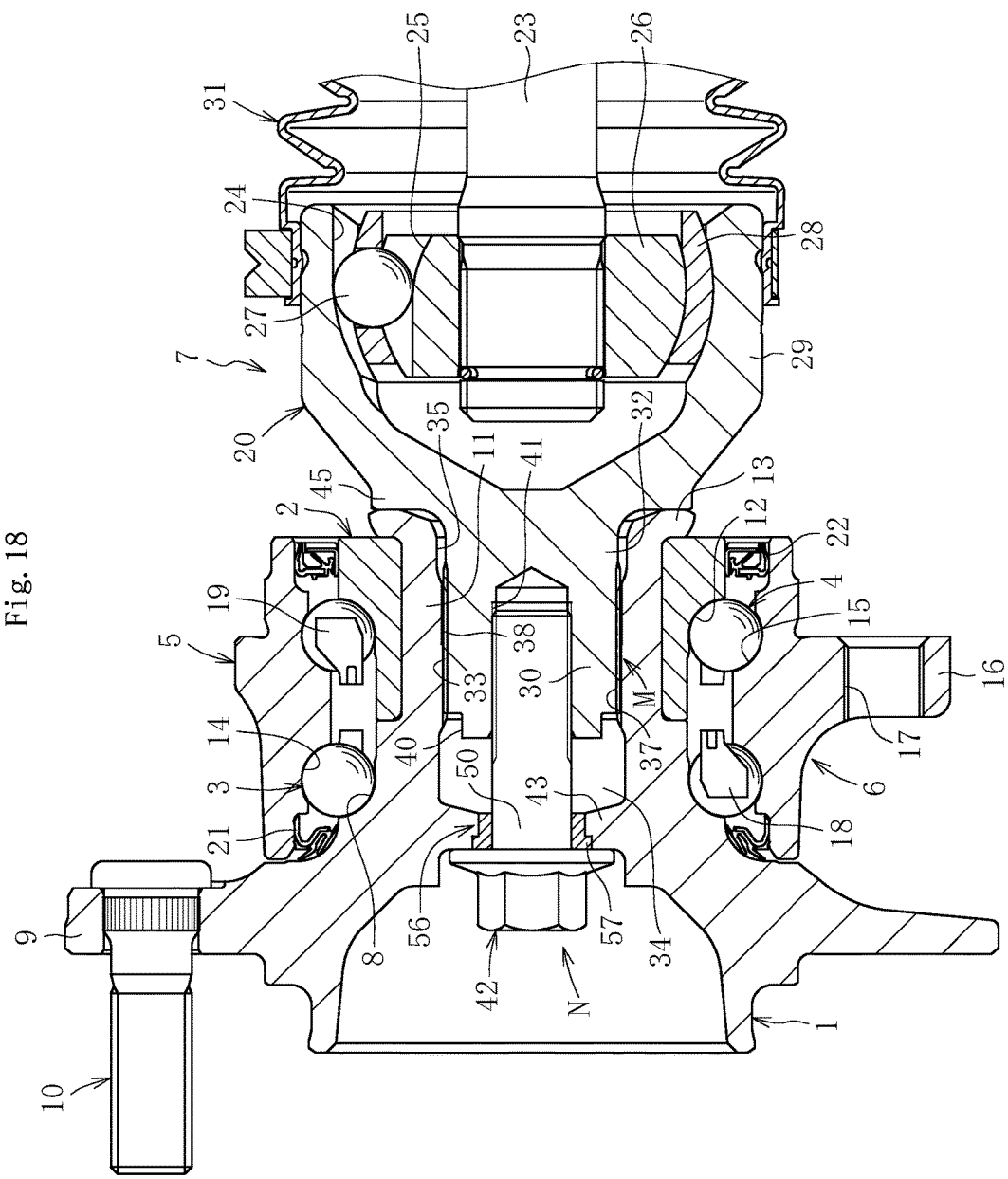
FIG. 18 is a sectional view for illustrating a mode in which a cylindrical seal with a flange is interposed between the hub wheel and the bolt according to a further embodiment of the present invention.
Figure 19:
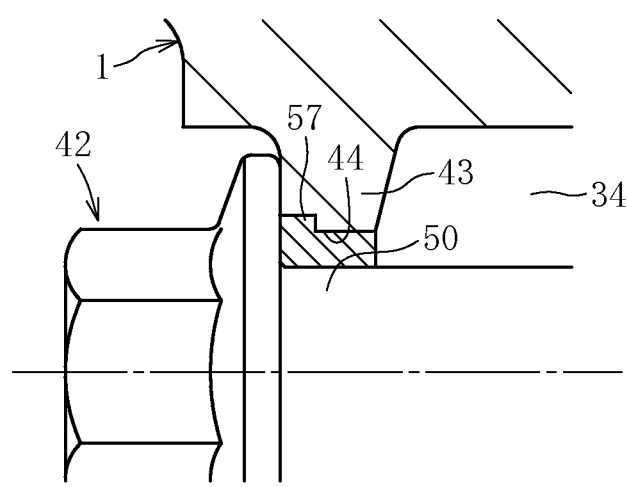
FIG. 19 is an enlarged principal part sectional view of FIG. 18.

In the embodiment illustrated in FIG. 18 and FIG. 19, there is provided a structure comprising a seal 56 having a cylindrical shape and provided with a flange portion 57 formed on the outboard-side end portion thereof to project radially outward, which is interposed between the protruding wall portion 43 of the hub wheel 1 and the bolt 42. The seal 56 is preferably an elastic member made of rubber or a resin. A structure of mounting the seal 56 and sealing functions are the same as those of the seal 55 described above in the embodiment illustrated in FIG. 16 and FIG. 17, and hence the overlapping description thereof is herein omitted. In the case of the seal 56, the flange portion 57 is provided to the outboard-side end portion. Therefore, positional regulation in the axial direction with respect to the projecting wall portion 43 of the hub wheel 1 is enabled. As a result, when an outer peripheral surface of the seal 56 is fixed to the protruding wall portion 43 of the hub wheel 1, mounting thereof is facilitated. Further, when the outer joint member 20 is pulled in by the bolt 42, the movement (positional misalignment) of the seal 56 to the inboard side can be prevented by the flange portion 57. Further, when an inner peripheral surface of the seal 56 is fixed to the shank-portion base part 50 of the bolt 42, a creepage distance on the outer peripheral surface that is brought into close contact with the inner diameter of the through hole of the protruding wall portion 43 of the hub wheel 1 can be increased. As a result, sealability is further improved.

Figure 20:
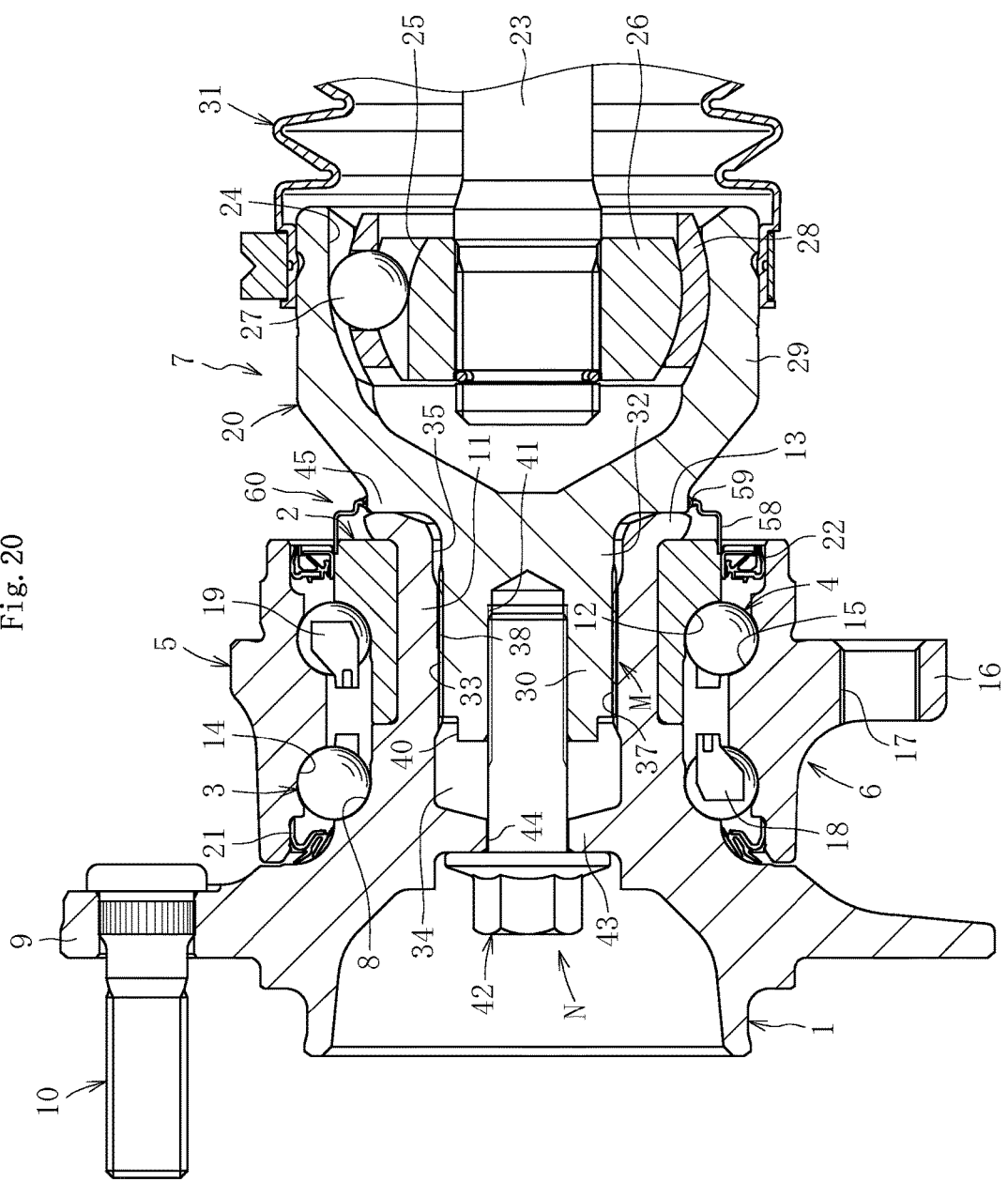
FIG. 20 is a sectional view for illustrating a mode in which a seal with a lip is mounted to an inner ring of the wheel bearing according to a further embodiment of the present invention.
Figure 21:
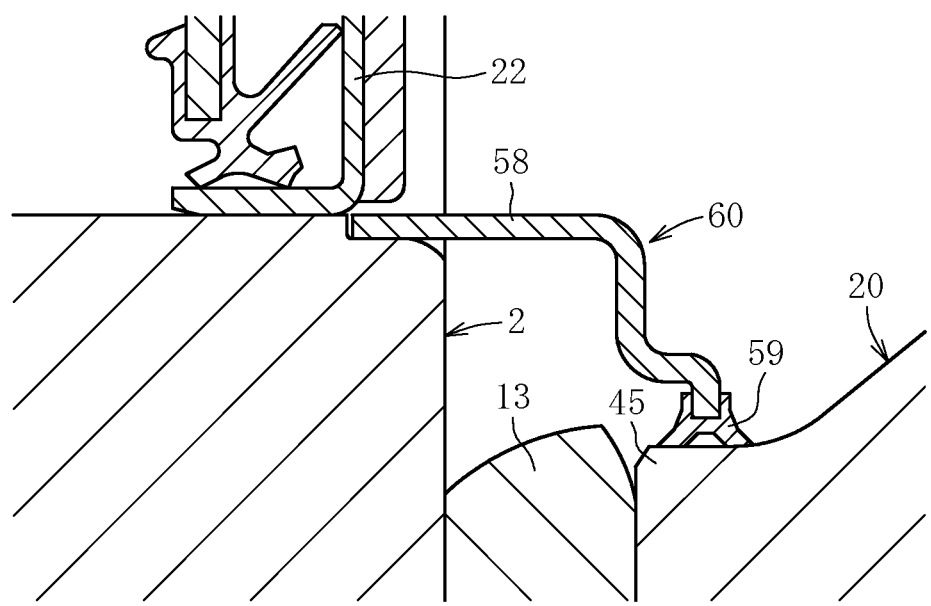
FIG. 21 is an enlarged principal part sectional view of FIG. 20.

In the embodiment illustrated in FIG. 20 and FIG. 21, there is provided a structure comprising a seal 60 with a lip, which comprises a lip member 59 mounted to an inner diameter of a distal end portion of a seal member 58 made of a metal, and is interposed between the outer joint member 20 and the inner ring 2. The lip member 59 is preferably an elastic member made of rubber or a resin. The seal 60 is fixed by fitting abase end portion of the seal member 58 into an end portion of the inner ring 2. Then, the lip member 59 mounted to the inner diameter of the distal end portion of the seal member 58 is brought into close contact with the outer peripheral surface of the shoulder portion 45 of the outer joint member 20 by elastic-pressure contact. In this manner, the muddy water or the like is inhibited from entering the projection and depression fitting structure M from a portion between the crimped portion 13 of the hub wheel 1 and the shoulder portion 45 of the outer joint member 20 by the seal 60 interposed between the shoulder portion 45 of the outer joint member 20 and the inner ring 2.

Figure 22:
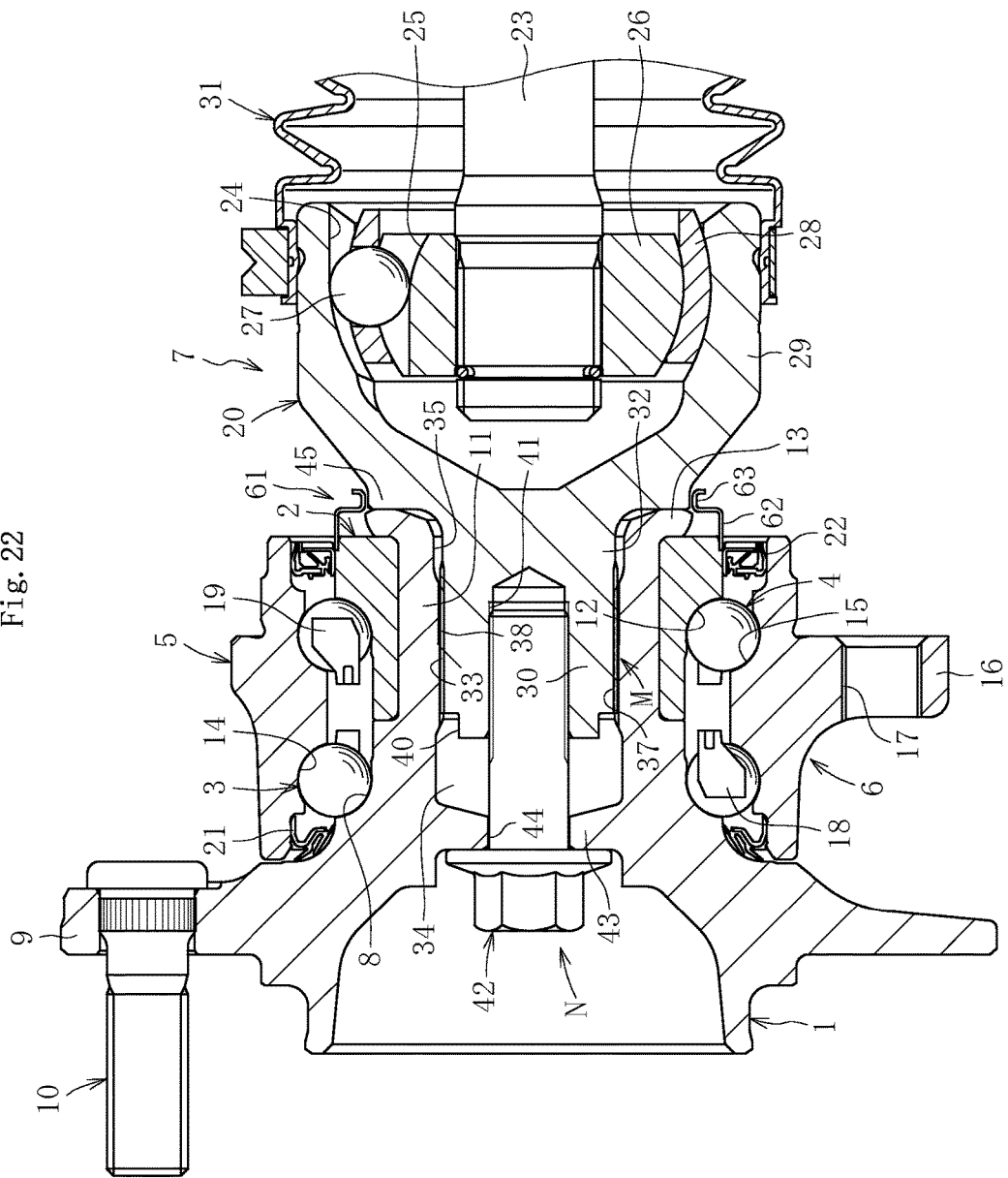
FIG. 22 is a sectional view for illustrating a mode in which a labyrinth seal is mounted to the inner ring of the wheel bearing according to a further embodiment of the present invention.
Figure 23:
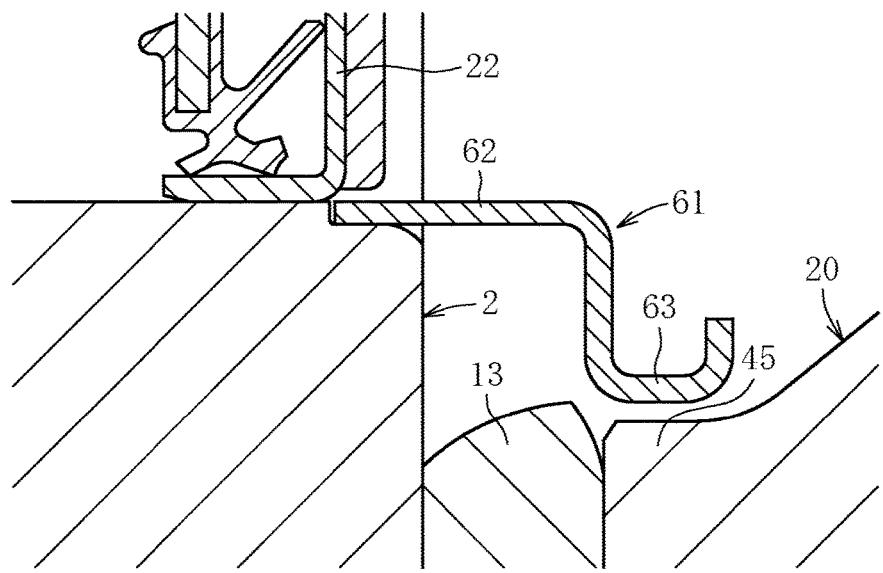
FIG. 23 is an enlarged principal part sectional view of FIG. 22.

In the embodiment illustrated in FIG. 22 and FIG. 23, there is provided a structure comprising a labyrinth seal 61 made of a metal interposed between the outer joint member 20 and the inner ring 2. The seal 61 is fixed by fitting a cylindrical base end portion 62 thereof into the end portion of the inner ring 2 so that a curved distal end portion 63 thereof is located close to the outer peripheral surface of the shoulder portion 45 of the outer joint member 20. In this manner, the muddy water or the like is inhibited from entering the projection and depression fitting structure M from the portion between the crimped portion 13 of the hub wheel 1 and the shoulder portion 45 of the outer joint member 20 by the labyrinth structure at the curved distal end portion 63 of the seal 61 interposed between the shoulder portion 45 of the outer joint member 20 and the inner ring 2.

Figure 24:
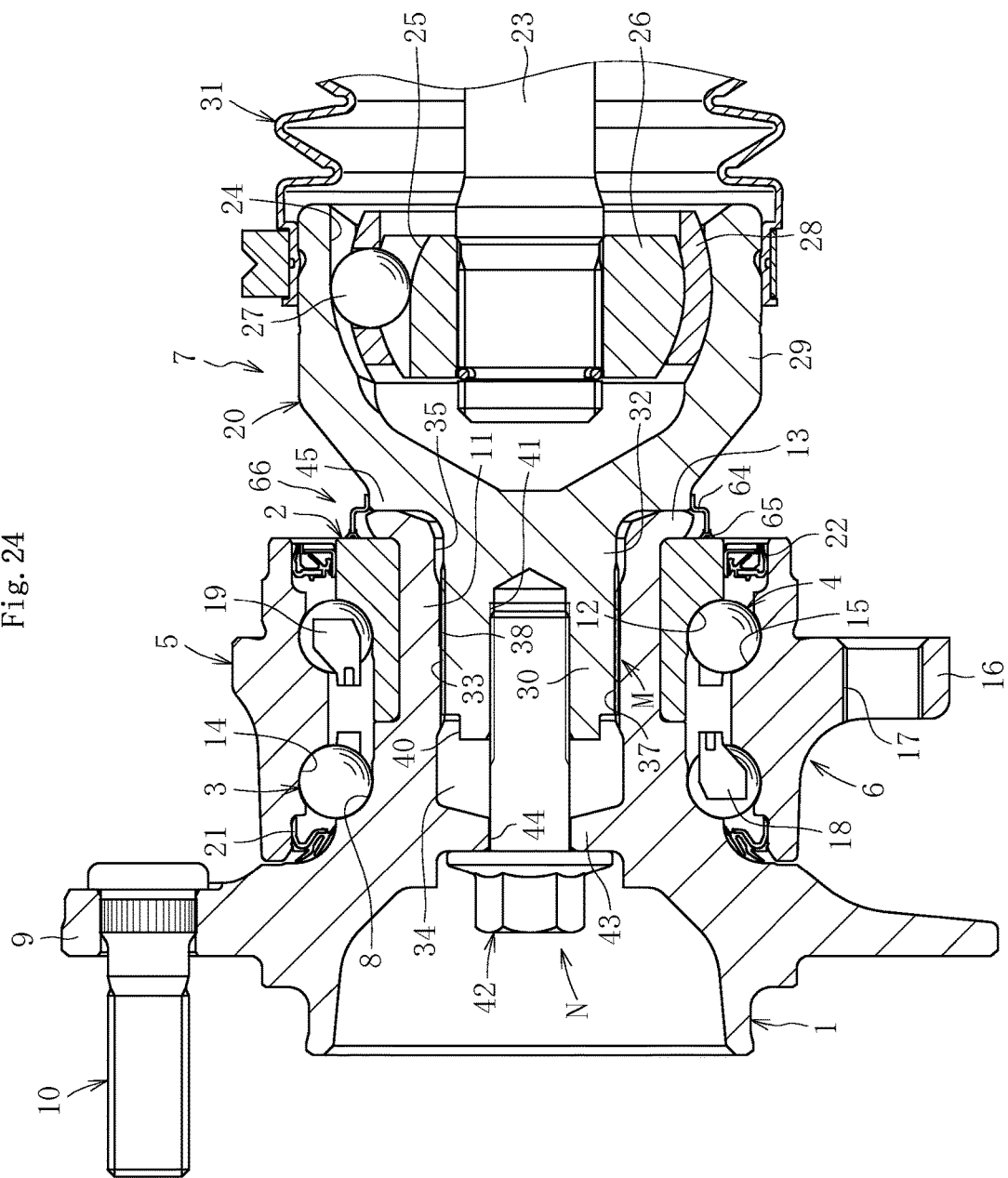
FIG. 24 is a sectional view for illustrating a mode in which the seal with the lip is mounted onto a shoulder portion of the outer joint member according to a further embodiment of the present invention.
Figure 25:
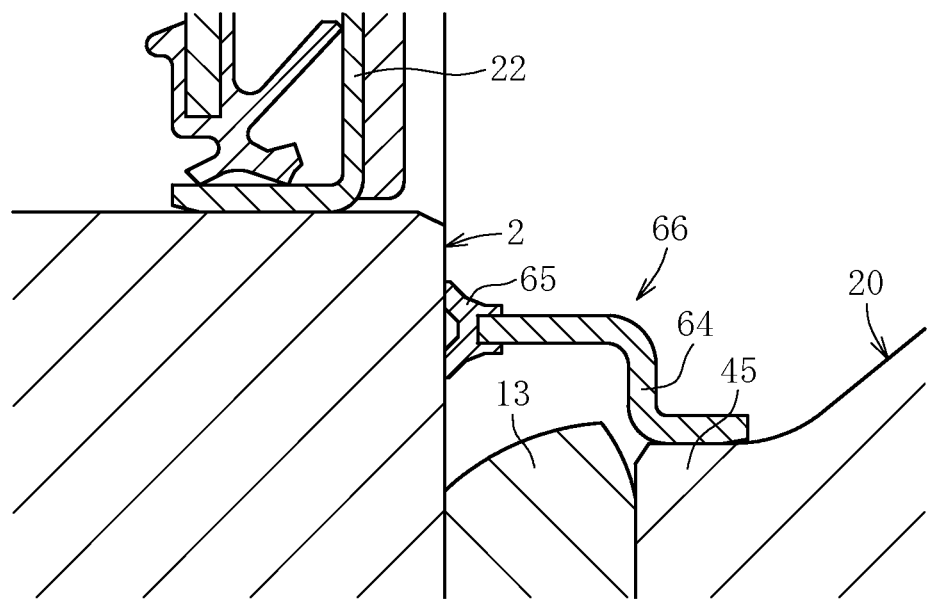
FIG. 25 is an enlarged principal part sectional view of FIG. 24.

In the embodiment illustrated in FIG. 24 and FIG. 25, there is provided a structure comprising a seal 66 with a lip, which comprises a lip member 65 made of rubber or a resin mounted to a distal end portion of a seal member 64 made of a metal, and is interposed between the outer joint member 20 and the inner ring 2. The lip member 65 is preferably an elastic member made of rubber or a resin. The seal 66 is fixed by fitting a base end portion of the seal member 64 over the shoulder portion 45 of the outer joint member 20 so that the lip member 65 mounted to the distal end portion of the seal member 64 is brought into close contact with the end surface of the inner ring 2 by elastic-pressure contact. In this manner, the muddy water or the like is inhibited from entering the projection and depression fitting structure M from the portion between the crimped portion 13 of the hub wheel 1 and the shoulder portion 45 of the outer joint member 20 by the seal 66 interposed between the shoulder portion 45 of the outer joint member 20 and the inner ring 2.

Figure 26:
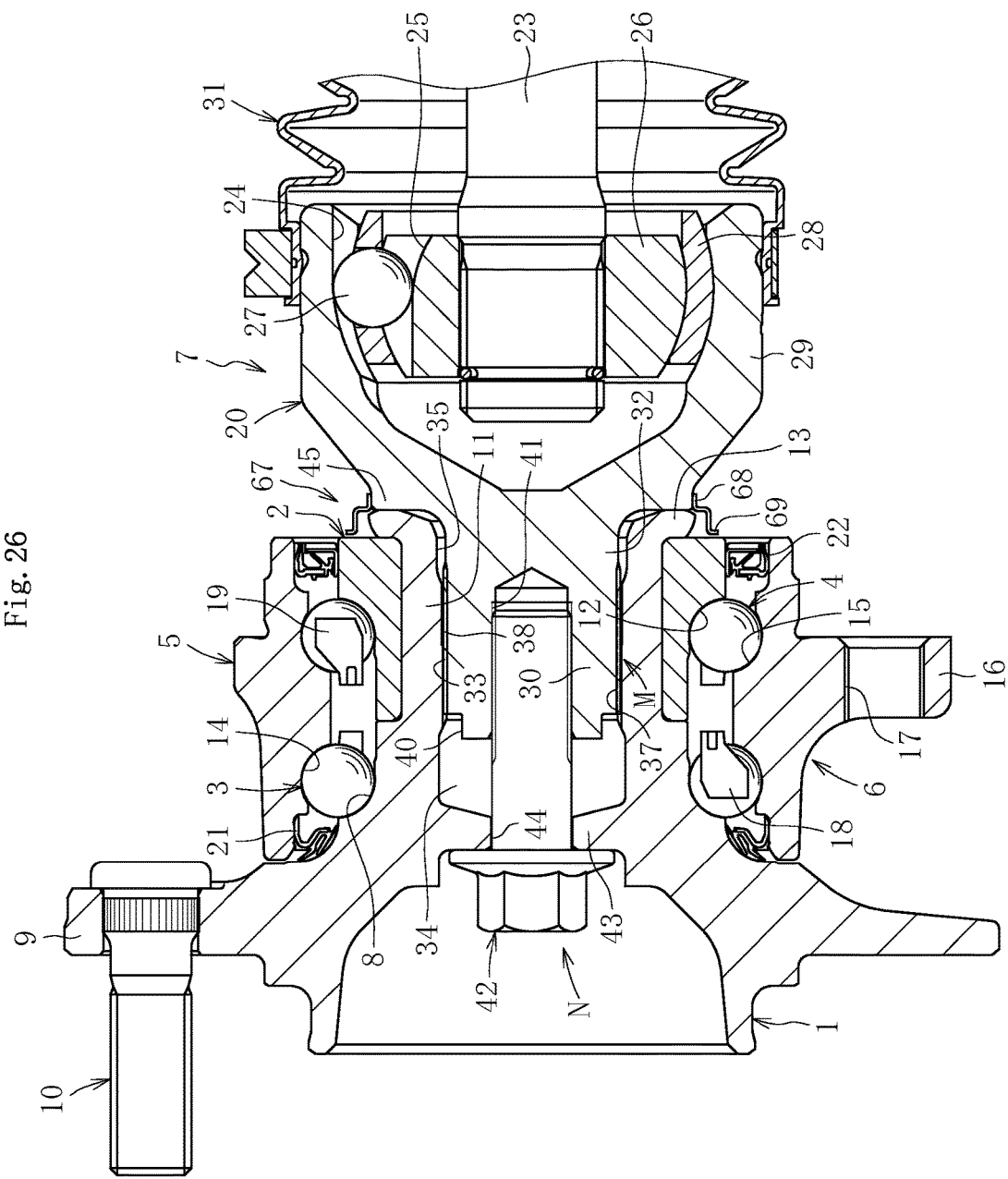
FIG. 26 is a sectional view for illustrating a mode in which the labyrinth seal is mounted onto the shoulder portion of the outer joint member according to a further embodiment of the present invention.
Figure 27:
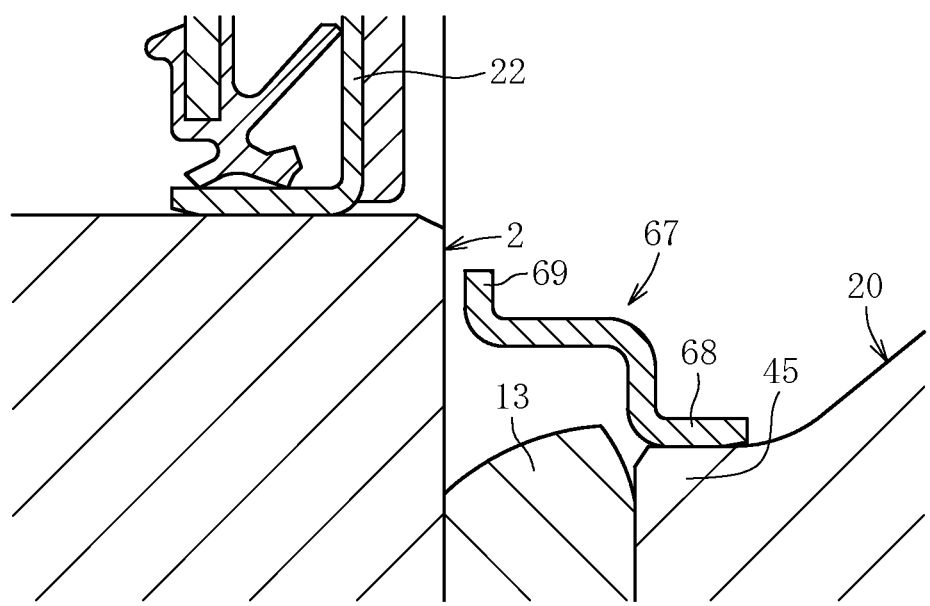
FIG. 27 is an enlarged principal part sectional view of FIG. 26.

In the embodiment illustrated in FIG. 26 and FIG. 27, there is provided a structure comprising a labyrinth seal 67 made of a metal interposed between the outer joint member 20 and the inner ring 2. The seal 67 is fixed by fitting a cylindrical base end portion 68 thereof over the shoulder portion 45 of the outer joint member 20 so that a bent distal end portion 69 thereof is located close to the end surface of the inner ring 2. In this manner, the muddy water or the like is inhibited from entering the projection and depression fitting structure M from the portion between the crimped portion 13 of the hub wheel 1 and the shoulder portion 45 of the outer joint member 20 by the labyrinth structure at the bent distal end portion 69 of the seal 67 interposed between the shoulder portion 45 of the outer joint member 20 and the inner ring 2.

In the embodiments described above, the screw fastening structure N, in which the bolt 42 is fastened in a state of being locked to the protruding wall portion 43 of the hub wheel 1 by threadedly engaging the bolt 42 with the female thread portion 41 of the stem section 30, has been exemplarily described. However, another screw fastening structure may also be configured to comprise a male thread portion formed at the axial end of the stem section 30 of the outer joint member 20 and a nut that is a female thread portion to be locked to the protruding wall portion 43 of the hub wheel 1 in a state of being threadedly engaged with the male thread portion.

Further, in the embodiments described above, the crimping structure, in which an end portion of the small-diameter step portion 11 of the hub wheel 1 is crimped outward by orbital forming to retain the inner ring 2 by the crimped portion 13 to be integrated with the hub wheel 1 so that the constant velocity universal joint 7 is separable from the wheel bearing 6, has been exemplarily described. However, anon-crimping structure, in which the inner ring 2 is press-fitted into the small-diameter step portion 11 of the hub wheel 1 so that the end portion of the inner ring 2 is brought into abutment against the shoulder portion 45 of the outer joint member 20, may also be used.

Further, in the embodiments described above, the application to the bearing device for a wheel of a type in which one of the double-row inner raceway surfaces 8 and 12 formed on the inner member comprising the hub wheel 1 and the inner ring 2, that is, the inner raceway surface 8 on the outboard side, is formed on the outer periphery of the hub wheel 1 (referred to as "third generation"), has been exemplarily described. However, the application is also possible to the bearing device for a wheel of a type in which a pair of inner rings is press-fitted over the outer periphery of the hub wheel 1 so that the raceway surface 8 on the outboard side is formed on the outer periphery of one of the inner rings and the raceway surface 12 on the inboard side is formed on the outer periphery of another of the inner rings (referred to as "first generation" or "second generation").

Incidentally, the configuration in which the hub wheel and the constant velocity universal joint are fastened by the bolt, as described in the above-mentioned embodiments, is capable of assembling and disassembling and therefore is excellent in maintainability. If the fastened bolt is loosened after the incorporation into the vehicle, however, there is a fear of inconvenience such as generation of a backlash to generate abnormal noise or acceleration of wear.

Therefore, a configuration of the bearing device for a wheel, which is capable of preventing the bolt from being loosened over a long period of time, is proposed below. Note that, in the drawings for illustrating each of embodiments described below, for constituent elements such as members or components having the same functions or shape, the repeated description thereof is omitted by providing the same reference symbols as long as distinction is possible.

Figure 28:
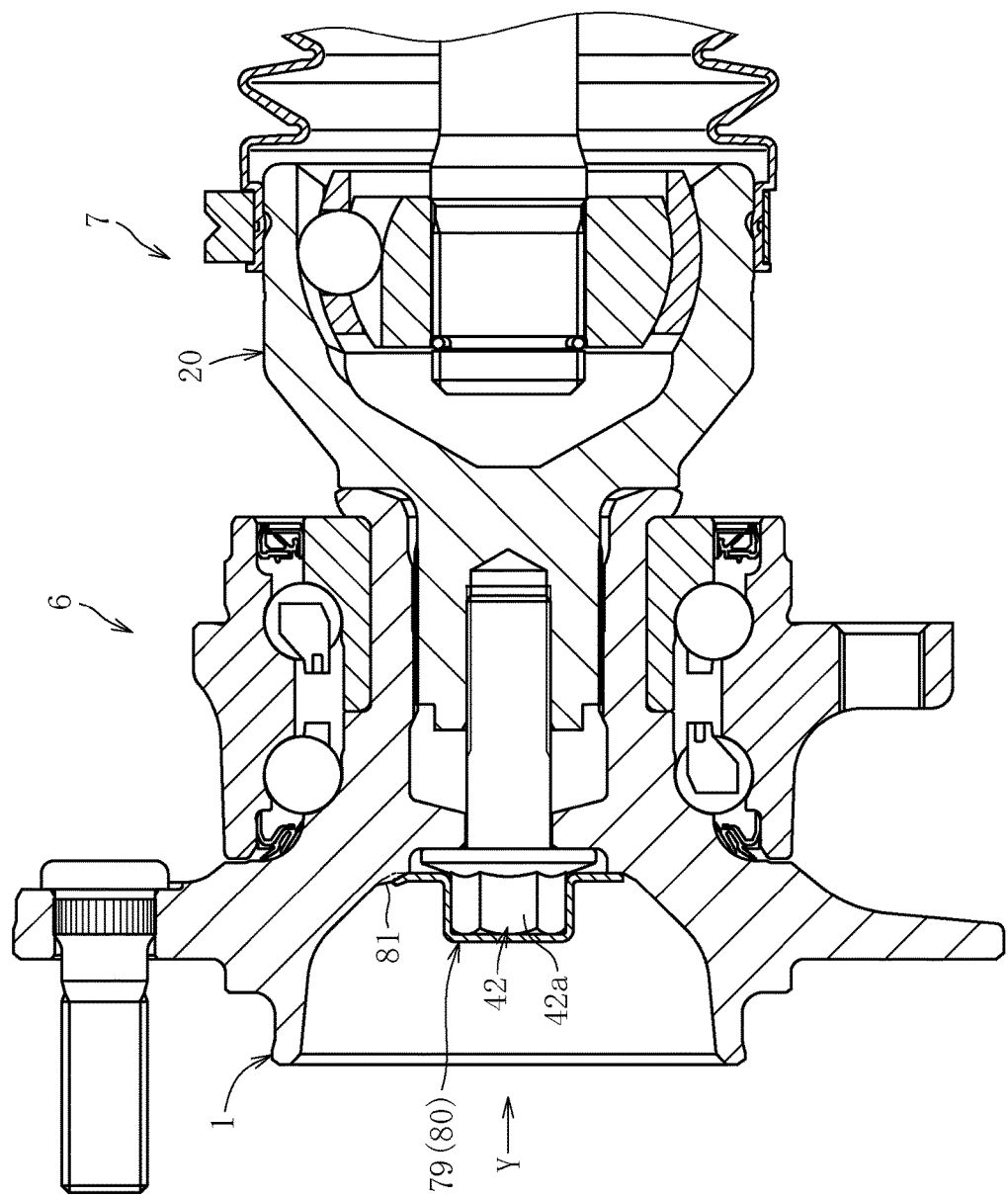
FIG. 28 is a longitudinal sectional view of a bearing device for a wheel, to which a first embodiment of a bolt loosening prevention structure is applied.
Figure 29:
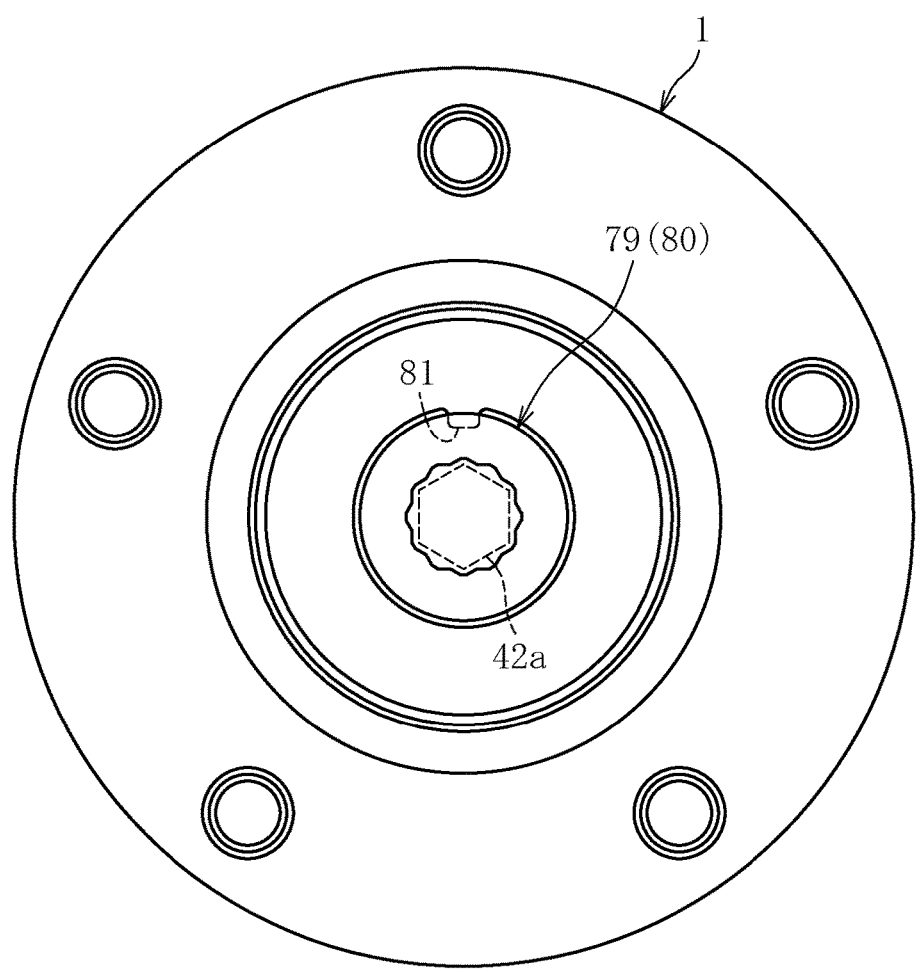
FIG. 29 is a front view of the bearing device for a wheel illustrated in FIG. 28 as viewed in a direction indicated by the arrow Y.
Figure 30:
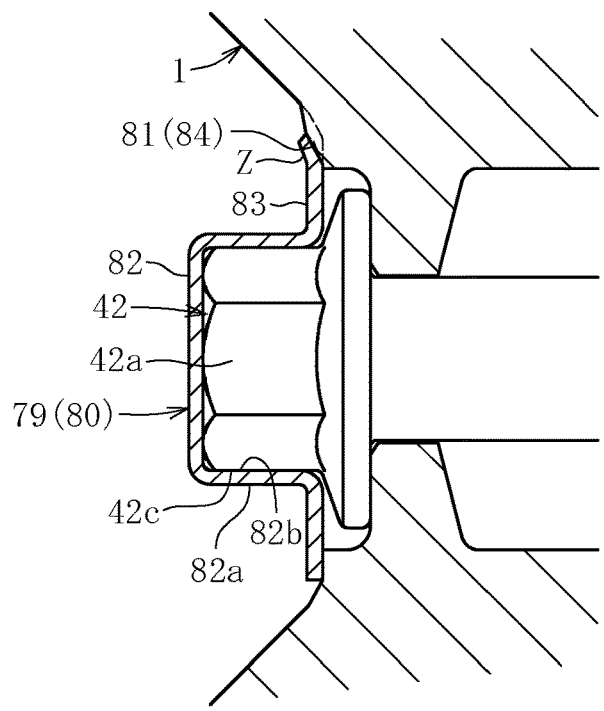
FIG. 30 is an enlarged principal part sectional view of FIG. 28.
Figure 31:
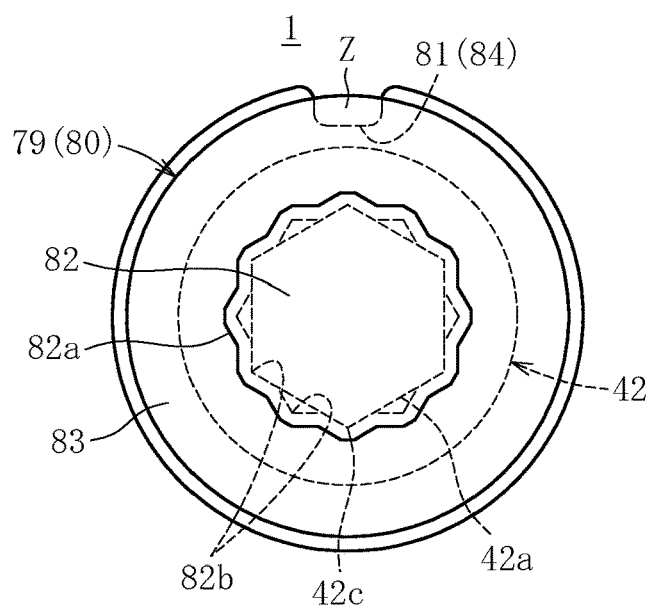
FIG. 31 is an enlarged principal part front view of FIG. 29.

FIG. 28 is a longitudinal sectional view of a bearing device for a wheel, to which a first embodiment of a bolt loosening prevention structure is applied, FIG. 29 is a front view of the bearing device for a wheel illustrated in FIG. 28 as viewed in a direction indicated by the arrow Y, FIG. 30 is a longitudinal sectional view for illustrating a principal part of FIG. 28 in an enlarged manner, and FIG. 31 is a front view for illustrating a principal part of FIG. 29 in an enlarged manner. A configuration of the bearing device for a wheel illustrated in FIG. 28 is basically the same as that of the bearing device for a wheel illustrated in FIG. 3, and therefore the overlapping description thereof is omitted.

As illustrated in FIG. 28 and FIG. 29, in the first embodiment, a cap member 80 as a loosening prevention member 79 is mounted onto a head portion 42a of the bolt 42 for fastening the hub wheel 1 and the constant velocity universal joint 7. Through an intermediation of the cap member 80, rotation of the bolt 42 in a loosening direction is regulated between the head portion 42a of the bolt 42 and the hub wheel 1.

Specifically, as illustrated in FIG. 30 and FIG. 31, the cap member 80 comprises a cap main body 82 having a cylindrical shape and a closed end, which is mounted to the head portion 42a of the bolt 42, and a flange portion 83 having a flat-plate annular shape provided to an opening edge portion of the cap main body 82. On an inner peripheral surface of a side wall portion 82a of the cap main body 82, a plurality of depressed portions 82b, each having a shape corresponding to each of angular portions 42c formed on a side surface of the head portion 42a, are formed so as to be arranged equiangularly (see FIG. 31). By fitting the cap member 80 over the head portion 42a so that the depressed portions 82b are aligned with the angular portions 42c, rotation of the cap member 80 in a peripheral direction with respect to the head portion 42a is regulated.

Here, the number of provided depressed portions 82b is twice (twelve in total) as many as the number (six in FIG. 31) of the angular portions 42c provided to the head portion 42a. In this manner, by providing the depressed portions 82b twice as many as the number of angular portions 42c, the number of portions at which the cap member 80 can be positionally aligned with the head portion 42a becomes twice as many as that compared to the case where the number of depressed portions 82b is the same as that of the angular portions 42c. Therefore, fitting work is facilitated. Note that, the number of depressed portions 82b may be three times as many as the number of angular portions 42c or larger, or the number of depressed portions 82b may be the same as the number of angular portions 42c.

Further, an inner diameter of the side wall portion 82a of the cap main body 82 is set slightly smaller than an outer diameter of a corresponding portion of the head portion 42a. Specifically, the cap member 80 is fitted by press-fitting over the head portion 42a. Therefore, the cap member 80 hardly comes off in the axial direction.

An engagement portion 81 that is engageable with the cap member 80 is provided to the hub wheel 1 on a side where the cap member 80 is provided. The engagement portion 81 is a protruding portion 84 partially projecting in the peripheral direction.

Figure 32A:
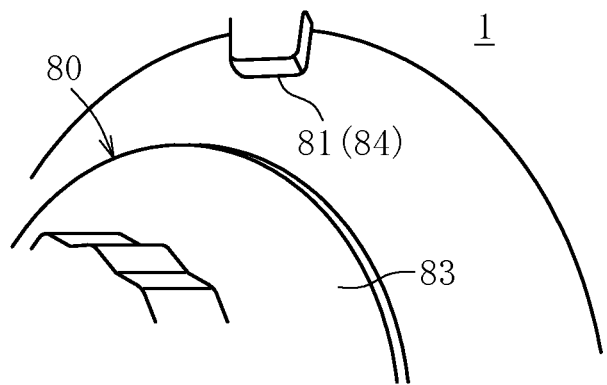
FIG. 32A is a perspective view for illustrating a state before a cap member is engaged with a protruding portion of the hub wheel.
Figure 32B:
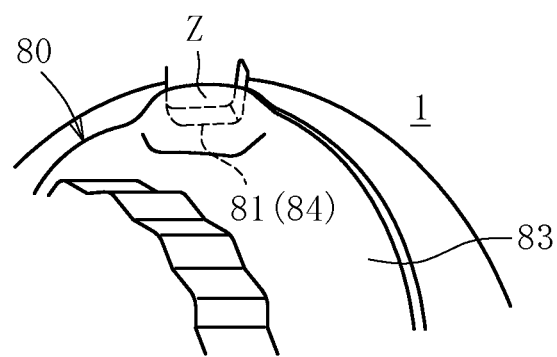
FIG. 32B is a perspective view for illustrating a state in which the cap member is engaged with the protruding portion of the hub wheel.

FIG. 32A is a perspective view for illustrating a state before the cap member 80 is engaged with the protruding portion 84 of the hub wheel 1, and FIG. 32B is a perspective view for illustrating a state in which the cap member 80 is engaged with the protruding portion 84 of the hub wheel 1.

As illustrated in FIG. 32A and FIG. 32B, for engaging the cap member 80 with the protruding portion 84 of the hub wheel 1, an outer edge portion of the flange portion 83 is arranged so as to cover the protruding portion 84. Then, the flange portion 83 is crimped in the vicinity of the protruding portion 84. By the crimping, the flange portion 83 is deformed in accordance with a shape of the protruding portion 84. The flange portion 83 is engaged with the protruding portion 84 in a deformed portion (crimped portion) Z, thereby holding the cap member 80 in the peripheral direction. As described above, in this embodiment, the bolt 42 is held with respect to the hub wheel 1 through an intermediation of the cap member 80, thereby regulating the rotation of the bolt 42 in the loosening direction so as to prevent loosening.

Note that, in this embodiment, only one protruding portion 84 is provided. However, a plurality of the protruding portions 84 may be provided in the peripheral direction so that the flange portion 83 is crimped to each of the protruding portions 84 or an arbitrarily selected one of the protruding portions 84.

Figure 33:
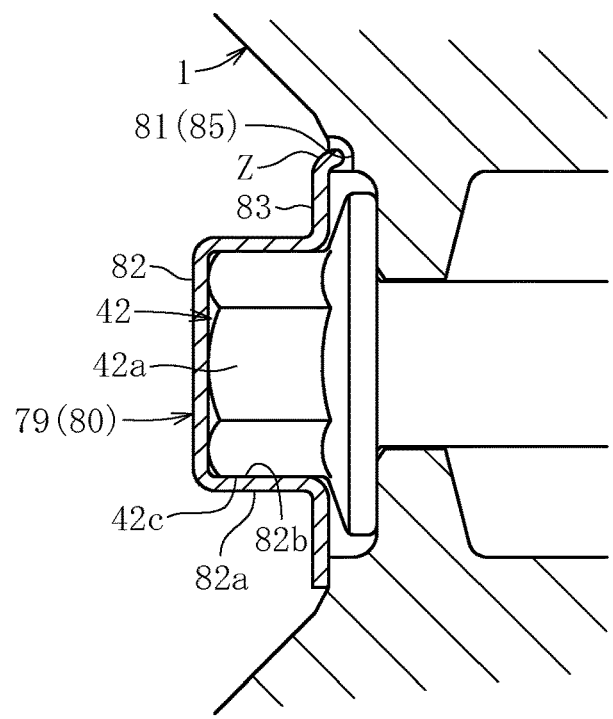
FIG. 33 is a longitudinal sectional view of a second embodiment of the bolt loosening prevention structure.
Figure 34:
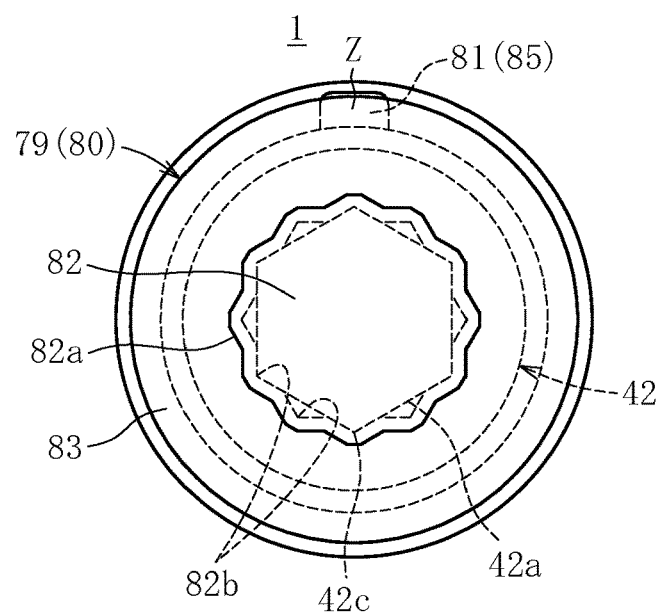
FIG. 34 is a front view of FIG. 33.

FIG. 33 is a longitudinal sectional view of a second embodiment of the bolt loosening prevention structure, and FIG. 34 is a front view thereof.

As illustrated in FIG. 33 and FIG. 34, in the second embodiment, a shape of the engagement portion 81 provided to the hub wheel 1 differs from that in the first embodiment described above. In the second embodiment, the engagement portion 81 is a recessed portion 85 that is partially recessed in the peripheral direction. The remaining configuration is the same as that in the first embodiment.

Figure 35A:
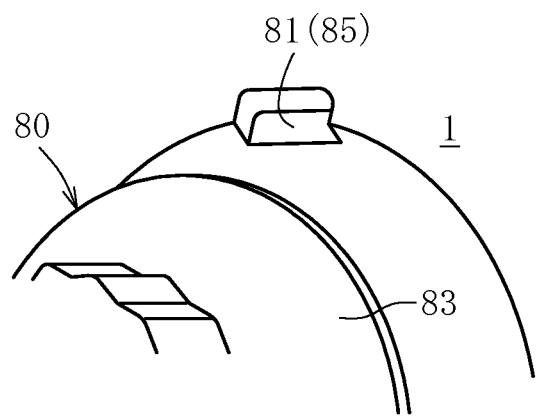
FIG. 35A is a perspective view for illustrating a state before the cap member is engaged with a recessed portion of the hub wheel.
Figure 35B:
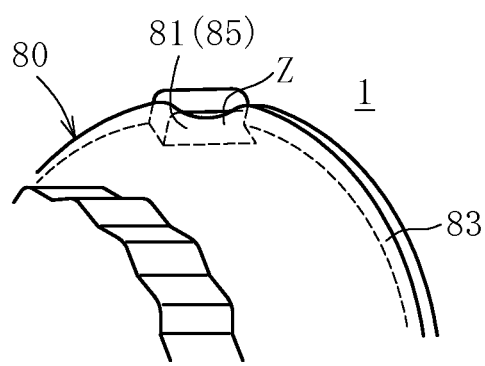
FIG. 35B is a perspective view for illustrating a state in which the cap member is engaged with the recessed portion of the hub wheel.

As illustrated in FIG. 35A and FIG. 35B, in order to engage the cap member 80 with the recessed portion 85 in the second embodiment, the outer edge portion of the flange portion 83 is arranged so as to cover the recessed portion 85. Then, the flange portion 83 is crimped at a position of the recessed portion 85. By the crimping, the flange portion 83 is deformed in accordance with a shape of the recessed portion 85. The flange portion 83 is engaged with the recessed portion 85 in the deformed portion (crimped portion) Z, thereby holding the cap member 80 in the peripheral direction. As a result, the rotation of the bolt 42 in the loosening direction is regulated to prevent loosening.

Note that, also in this embodiment, a plurality of the recessed portions 85 may be provided over the peripheral direction so that the flange portion 83 is crimped to each of the recessed portions 85 or an arbitrarily selected one of the recessed portions 85.

Figure 36:
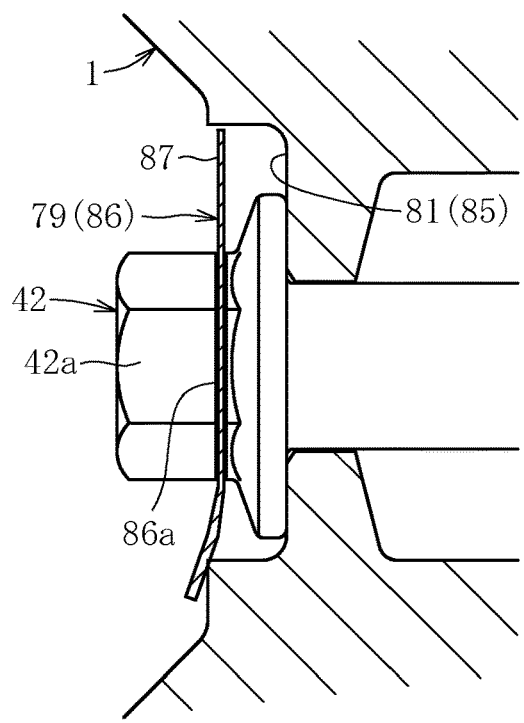
FIG. 36 is a longitudinal sectional view of a third embodiment of the bolt loosening prevention structure.
Figure 37:
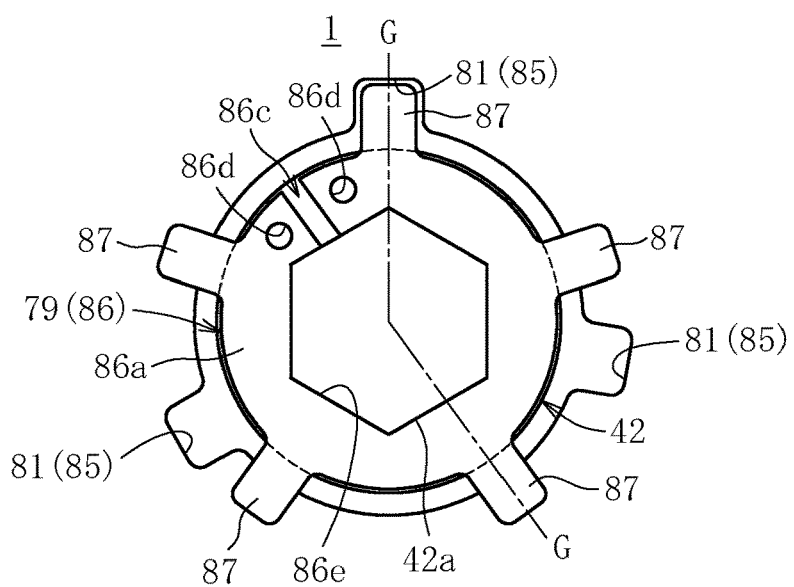
FIG. 37 is a front view of FIG. 36.

FIG. 36 is a longitudinal sectional view of a third embodiment of the bolt loosening prevention structure, and FIG. 37 is a front view thereof. Further, FIG. 36 is a sectional view taken along the line G-G in FIG. 37.

As illustrated in FIG. 36 and FIG. 37, in contrast to each of the embodiments described above, the loosening prevention member 79 is a clip member 86 in the third embodiment. The clip member 86 comprises a clip main body 86a having an opening portion 86c in a part in the peripheral direction, which is to be mounted to the head portion 42a of the bolt 42, and a plurality of projecting portions 87, each projecting in a radially outward direction over the peripheral direction of the clip main body 86a (see FIG. 37).

In a center of the clip main body 86a, an insertion hole 86e, into which the head portion 42a of the bolt 42 is inserted, is formed. In this case, the insertion hole 86e is formed to have a hexagonal shape that is the same as the shape of the head portion 42a of the bolt 42. By achieving a state in which the head portion 42a is inserted into the insertion hole 86e, rotation of the clip member 86 in the peripheral direction with respect to the head portion 42a is regulated. Further, an inner diameter of the insertion hole 86e is set slightly smaller than an outer diameter of a corresponding portion of the head portion 42a. In this manner, the clip member 86 mounted to the head portion 42a hardly comes off in the axial direction. Further, in both end portions of the clip main body 86a, which form the opening portion 86c, hole portions 86d to be gripped by a tool such as pliers when the clip member 86 is mounted onto the head portion 42a of the bolt 42 are formed.

On the other hand, on a side of the hub wheel 1, on which the clip member 86 is provided, the recessed portions 85 are provided as the engagement portion 81 to which the projecting portions 87 of the clip member 86 are engageable. A plurality of the recessed portions 85 are provided in the peripheral direction.

When the clip member 86 is mounted onto the head portion 42a of the bolt 42, both end portions of the clip main body 86a are gripped by the pliers or the like. Then, the clip main body 86a is elastically deformed so that the opening portion 86c is enlarged and the head portion 42a of the bolt 42 is inserted into the insertion hole 86e of the clip main body 86a in this state. Then, by an elastic restoring force of the clip member 86, the clip main body 86a is locked to the side surface of the head portion 42a.

Further, at this time, one of the plurality of projecting portions 87 of the clip member 86 is positionally aligned with an arbitrarily selected one of the recessed portions 85 and is then inserted into the corresponding recessed portion 85. In this manner, the projecting portion 87 is brought into a state of being engageable with the recessed portion 85 in the peripheral direction. Therefore, the bolt 42 can be held in the peripheral direction with respect to the hub wheel 1 through an intermediation of the clip member 86. As described above, in this embodiment, the rotation of the bolt 42 in the loosening direction is regulated.

Further, as illustrated in FIG. 37, in this embodiment, in a state in which one of the projecting portions 87 is positionally aligned with an arbitrarily selected one of the recessed portions 85, the arrangement of the other projecting portions 87 and the arrangement of the other recessed portions 85 are misaligned in the peripheral direction. With the configuration as described above, the number of portions at which the projecting portions 87 can be positionally aligned with the recessed portions 85 increases, and hence the fitting work is facilitated. Note that, a configuration may be such that each of the number of the provided projecting portions 87 and the number of the provided recessed portions 85 is one.

Figure 38:
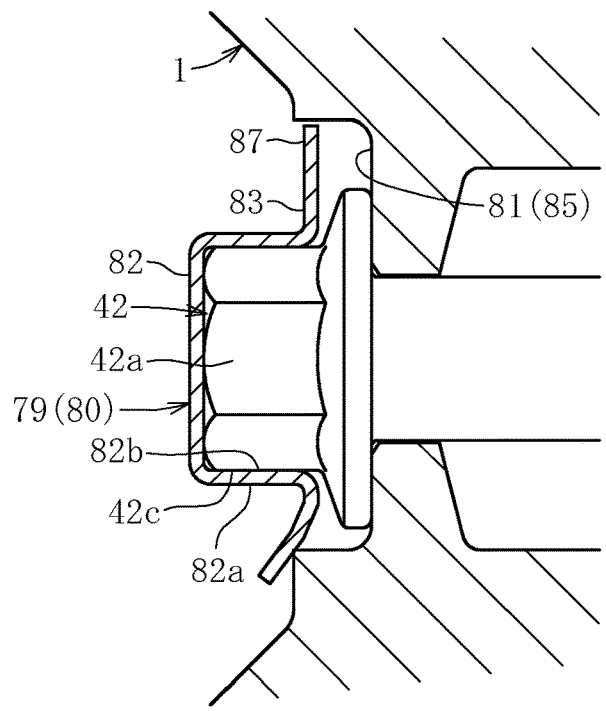
FIG. 38 is a longitudinal sectional view of a fourth embodiment of the bolt loosening prevention structure.
Figure 39:
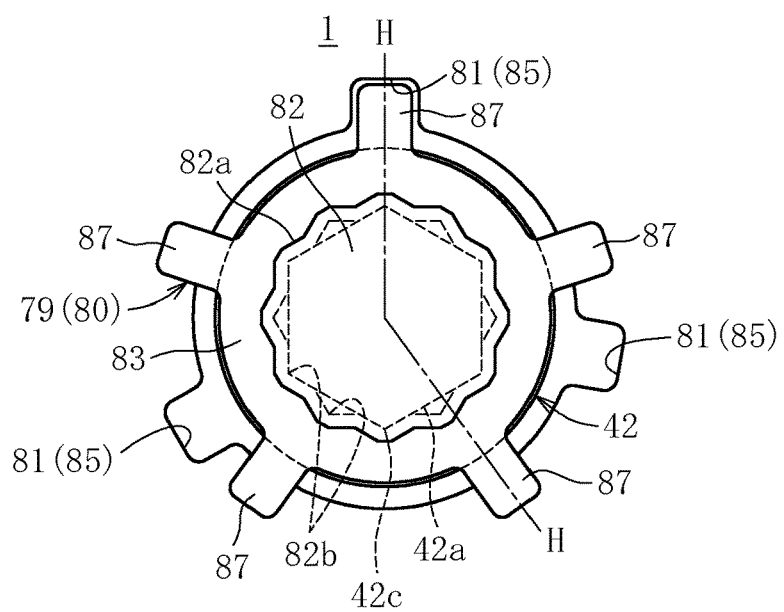
FIG. 39 is a front view of FIG. 38.

FIG. 38 is a longitudinal sectional view of a fourth embodiment of the bolt loosening prevention structure, and FIG. 39 is a front view thereof. Further, FIG. 38 is a sectional view taken along the line H-H in FIG. 39.

As illustrated in FIG. 38 and FIG. 39, in the fourth embodiment, a plurality of the projecting portions 87 similar to those provided to the clip member 86 are provided to the flange portion 83 of the cap member 80 as the loosening prevention member 79 over the peripheral direction. On the other hand, a plurality of the recessed portions 85 similar to those described above are provided to the hub wheel 1 over the peripheral direction.

In this case, when the cap member 80 is press-fitted over the head portion 42a of the bolt 42, one of the plurality of projecting portions 87 is positionally aligned with an arbitrarily selected one of the recessed portions 85 and is then inserted into the corresponding recessed portion 85 in the same manner as described above. As a result, the projecting portion 87 is brought into a state of being engageable with the recessed portion 85 in the peripheral direction, thereby holding the bolt 42 to the hub wheel 1 through an intermediation of the cap member 80 in the peripheral direction. In this manner, in this embodiment, the rotation of the bolt 42 in the loosening direction is regulated.

Figure 40:
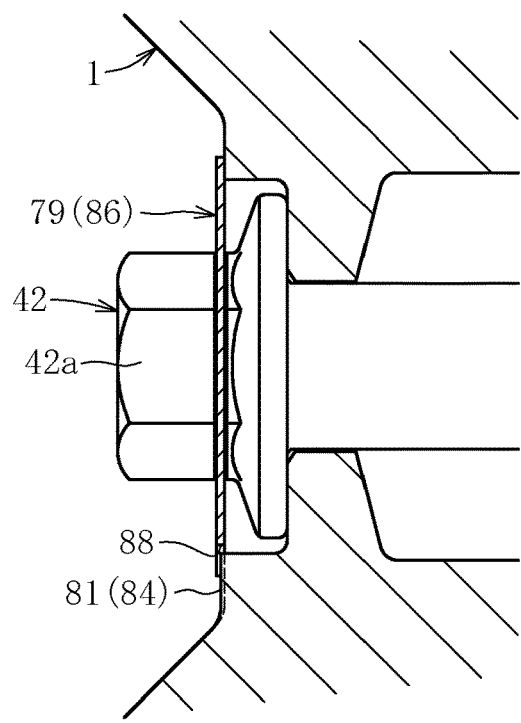
FIG. 40 is a longitudinal sectional view of a fifth embodiment of the bolt loosening prevention structure.
Figure 41:
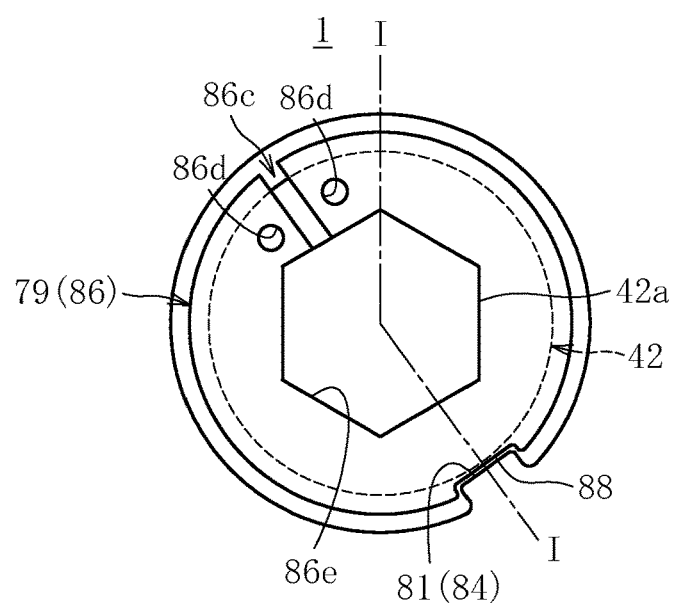
FIG. 41 is a front view of FIG. 40.

FIG. 40 is a longitudinal sectional view of a fifth embodiment of the bolt loosening prevention structure, and FIG. 41 is a front view thereof. Further, FIG. 40 is a sectional view taken along the line I-I in FIG. 41.

In the fifth embodiment illustrated in FIG. 40 and FIG. 41, the protruding portion 84 is provided as the engagement portion 81 on the hub wheel 1, whereas a depressed portion 88 that is engageable with the protruding portion 84 is provided to the clip member 86. Although only one protruding portion 84 and one depressed portion 88 are provided in this embodiment, a plurality of protruding portions 84 and a plurality of depressed portions 88 may be provided side by side over the peripheral direction.

In this case, the clip main body 86a is elastically deformed to mount the clip member 86 over the head portion 42a of the bolt 42 as in the case described above. At this time, the depressed portion 88 of the clip member 86 is positionally aligned with the protruding portion 84 of the hub wheel 1. As a result, the depressed portion 88 is brought into a state of being engageable with the protruding portion 84 in the peripheral direction. In this manner, the rotation of the bolt 42 in the loosening direction is regulated through an intermediation of the clip member 86.

Figure 42:
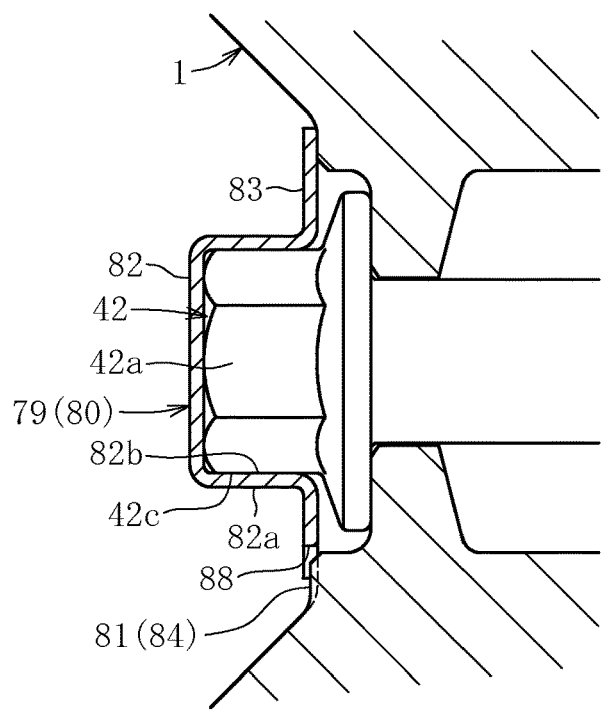
FIG. 42 is a longitudinal sectional view of a sixth embodiment of the bolt loosening prevention structure.
Figure 43:
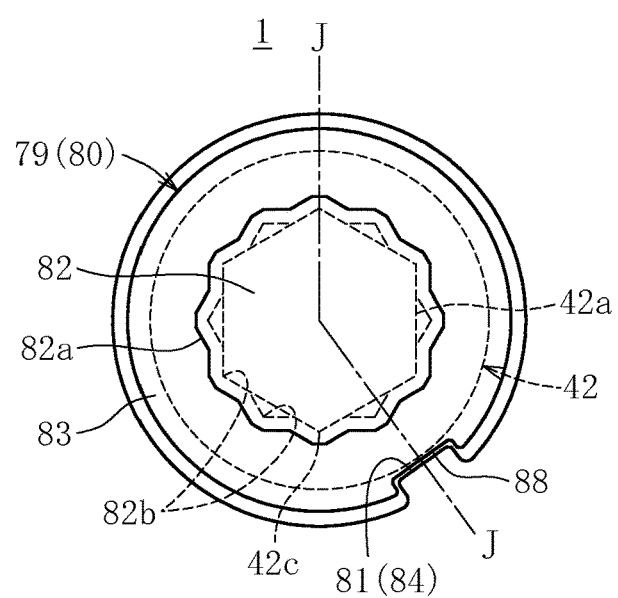
FIG. 43 is a front view of FIG. 42.

FIG. 42 is a longitudinal sectional view of a sixth embodiment of the bolt loosening prevention structure, and FIG. 43 is a front view thereof. Further, FIG. 42 is a sectional view taken along the line J-J in FIG. 43.

In the sixth embodiment illustrated in FIG. 42 and FIG. 43, the depressed portion 88 that is engageable with the protruding portion 84 of the hub wheel 1 is provided to the flange portion 83 of the cap member 80. Note that, a plurality of the protruding portions 84 and a plurality of the depressed portions 88 may be provided side by side over the peripheral direction.

In this case, when the cap member 80 is press-fitted over the head portion 42a of the bolt 42 to be fitted thereto, the depressed portion 88 of the cap member 80 is positionally aligned with the protruding portion 84 of the hub wheel 1. In this manner, the depressed portion 88 is brought into a state of being engageable with the protruding portion 84 in the peripheral direction. In this manner, the rotation of the bolt 42 in the loosening direction is regulated through an intermediation of the cap member 80.

Figure 44A:
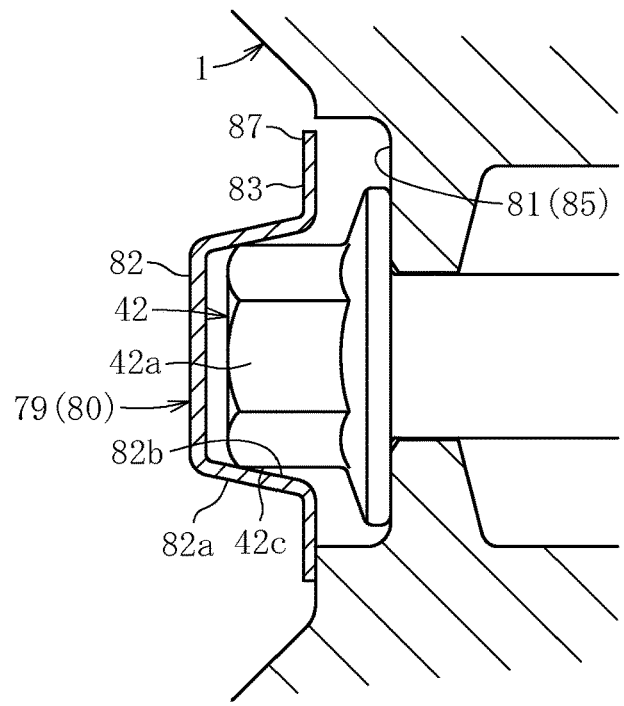
FIG. 44A is a longitudinal sectional view for illustrating a state before the cap member is completely press-fitted over a head portion of the bolt in a seventh embodiment of the bolt loosening prevention structure.
Figure 44B:
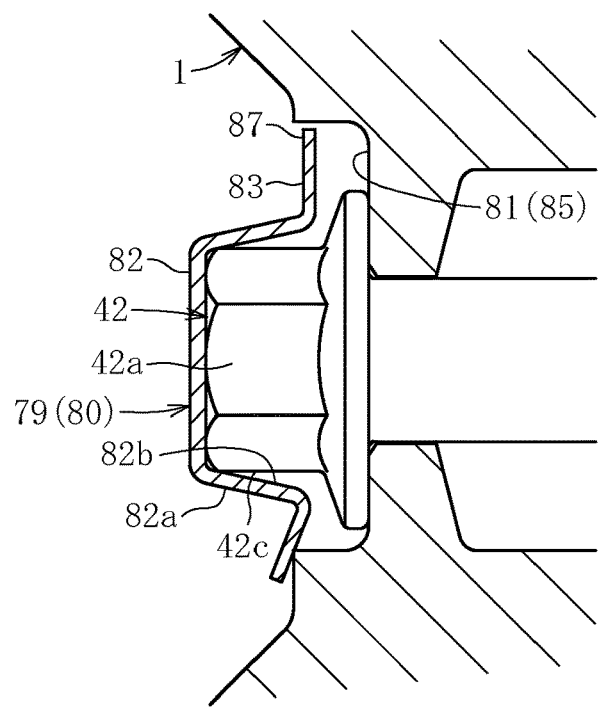
FIG. 44B is a longitudinal sectional view for illustrating a state in which the cap member is completely press-fitted over the head portion of the bolt in the seventh embodiment of the bolt loosening prevention structure.

FIG. 44A and FIG. 44B are longitudinal sectional views of a seventh embodiment of the bolt loosening prevention structure. Further, FIG. 44A is an illustration of a state before the cap member 80 is completely press-fitted over the head portion 42a of the bolt 42, and FIG. 44B is an illustration of a state in which the cap member 80 is completely press-fitted over the head portion 42a of the bolt 42.

In the seventh embodiment illustrated in FIG. 44A and FIG. 44B, the side wall portion 82a of the cap main body 82 is formed into a tapered shape so that an inner diameter becomes larger as approaching to its opening side. With the configuration described above, the cap member 80 becomes easy to be press-fitted over the head portion 42a of the bolt 42. Note that, although the cap member 80 including the projecting portion 87 is formed to have the tapered shape in this embodiment, the cap member 80 may be similarly formed to have the tapered shape also for the cap member 80 having another configuration.

Figure 45:
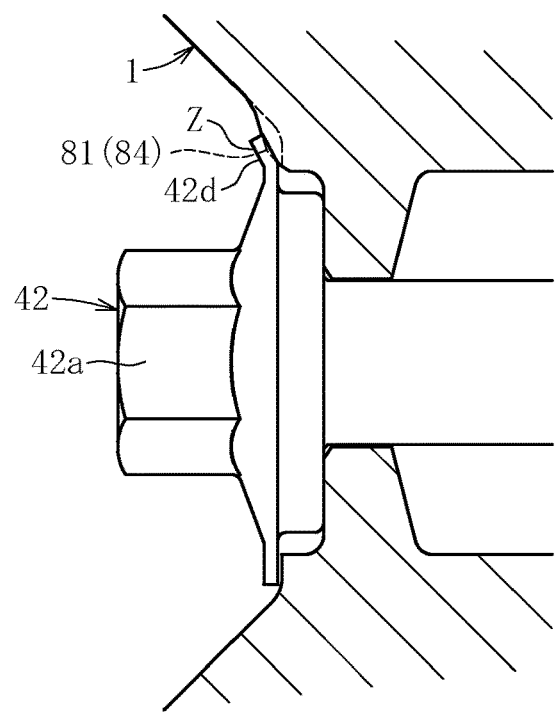
FIG. 45 is a longitudinal sectional view of an eighth embodiment of the bolt loosening prevention structure.
Figure 46:
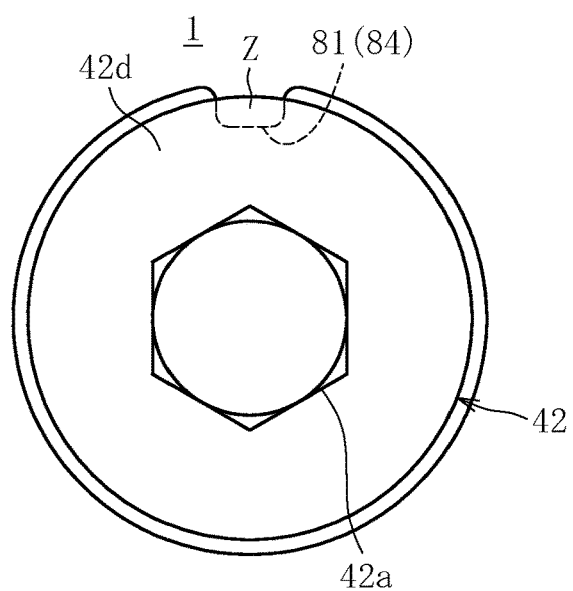
FIG. 46 is a front view of FIG. 45.

FIG. 45 is a longitudinal sectional view of an eighth embodiment of the bolt loosening prevention structure, and FIG. 46 is a front view thereof.

Although the bolt 42 is configured to be prevented from being loosened by using the loosening prevention member 79 (cap member 80 or clip member 86) in each of the embodiments described above, the loosening prevention member 79 as described above is not used in the eighth embodiment illustrated in FIG. 45. In this embodiment, a flange portion 42d having a small thickness is provided to the head portion 42a of the bolt 42. The flange portion 42d is directly engaged with the protruding portion 84 as the engagement portion 81 provided to the hub wheel 1.

First, the bolt 42 is screwed into the female thread portion 41 (see FIG. 1) of the constant velocity universal joint 7. After the constant velocity universal joint 7 is fastened to the hub wheel 1, the flange portion 42d of the bolt 42 is crimped in the vicinity of the protruding portion 84. As a result, similarly to the flange portion 83 illustrated in FIG. 32B, the flange portion 42d is deformed in accordance with the shape of the protruding portion 84. Then, the flange portion 42d is engaged with the protruding portion 84 in the deformed portion (crimped portion) Z. As a result, the bolt 42 is held to the hub wheel 1 in the peripheral direction. As described above, in this embodiment, the flange portion 42d of the bolt 42 is crimped. As a result, the rotation of the bolt 42 in the loosening direction can be regulated between the head portion 42a of the bolt 42 and the hub wheel 1.

Note that, the flange portion 42d is preferred not to be subjected to thermosetting treatment so as to facilitate the crimping. Further, a plurality of the protruding portions 84 may be provided in the peripheral direction so that the flange portion 42d is crimped to each of the protruding portions 84 or an arbitrarily selected one of the protruding portions 84.

Figure 47:
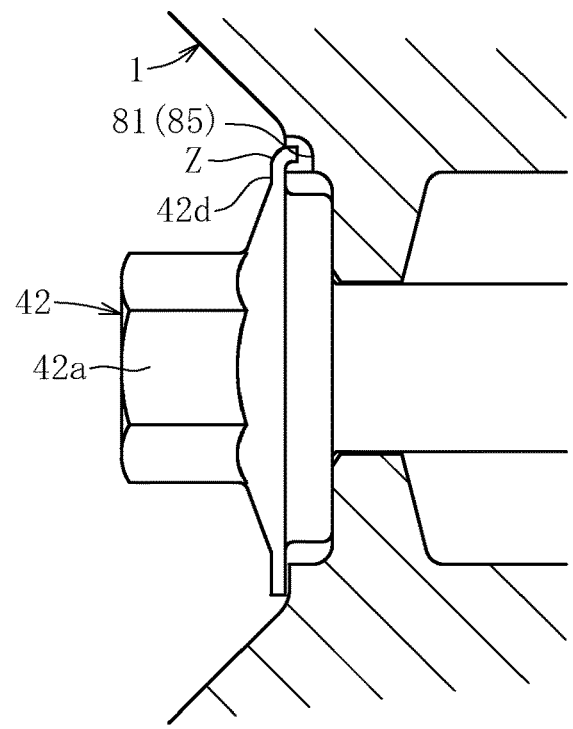
FIG. 47 is a longitudinal sectional view of a ninth embodiment of the bolt loosening prevention structure.
Figure 48:
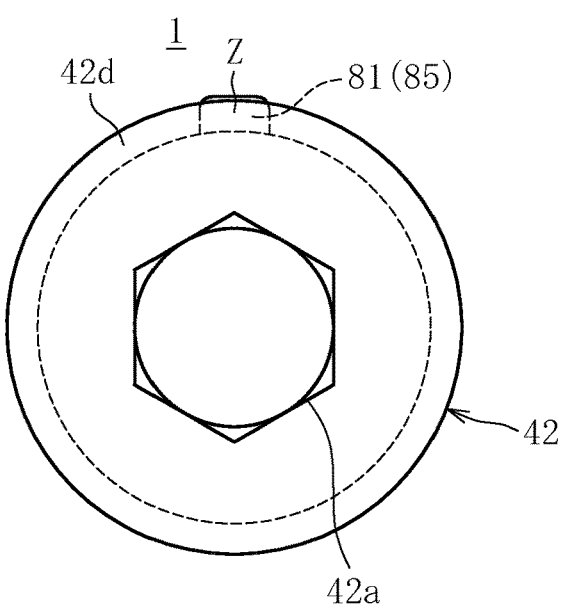
FIG. 48 is a front view of FIG. 47.

FIG. 47 is a longitudinal sectional view of a ninth embodiment of the bolt loosening prevention structure, and FIG. 48 is a front view thereof.

In the ninth embodiment illustrated in FIG. 47 and FIG. 48, the flange portion 42d having a small thickness in the same manner as described above is provided to the head portion 42a of the bolt 42. The flange portion 42d is directly engaged with the recessed portion 85 as the engagement portion 81 provided to the hub wheel 1.

Also in this case, the bolt 42 is screwed into the female thread portion 41 (see FIG. 1) of the constant velocity universal joint 7. After the constant velocity universal joint 7 is fastened to the hub wheel 1, the flange portion 42d of the bolt 42 is crimped at the position of the recessed portion 85. As a result, similarly to the flange portion 83 illustrated in FIG. 35B, the flange portion 42d is deformed in accordance with the shape of the recessed portion 85. Then, the flange portion 42d is engaged with the recessed portion 85 in the deformed portion (crimped portion) Z. As a result, the bolt 42 is held to the hub wheel 1 in the peripheral direction.

Note that, in the same manner as described above, the flange portion 42d is preferred not to be subjected to thermosetting treatment so as to facilitate the crimping. Further, a plurality of the recessed portions 85 may be provided over the peripheral direction so that the flange portion 42d is crimped to each of the recessed portions 85 or an arbitrarily selected one of the recessed portions 85.

Figure 49:
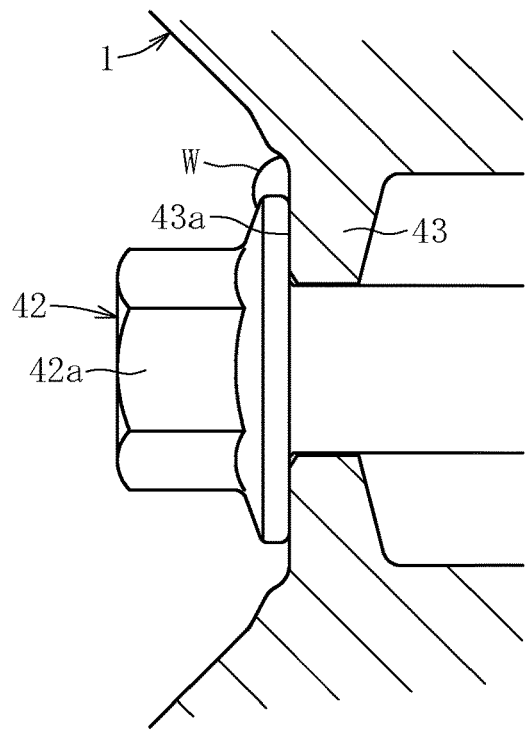
FIG. 49 is a longitudinal sectional view of a tenth embodiment of the bolt loosening prevention structure.
Figure 50:
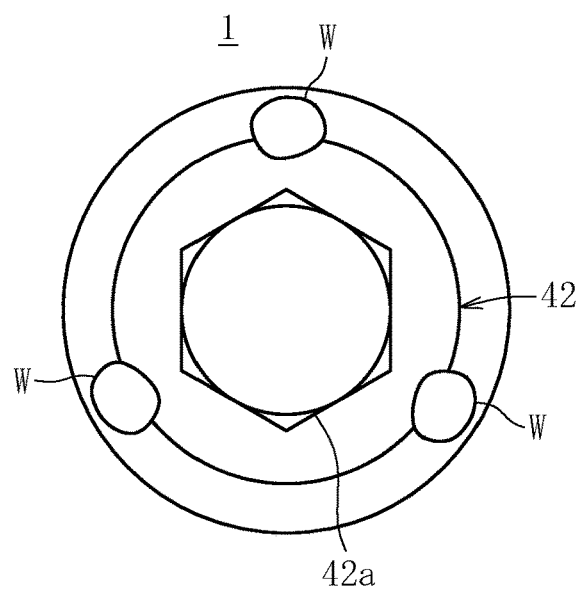
FIG. 50 is a front view of FIG. 49.

FIG. 49 is a longitudinal sectional view of a tenth embodiment of the bolt loosening prevention structure, and FIG. 50 is a front view thereof.

In the tenth embodiment illustrated in FIG. 49 and FIG. 50, the head portion 42a of the bolt 42 is welded to the hub wheel 1 to be fixed thereto (in welding portions W), thereby regulating the rotation of the bolt 42 in the loosening direction between the head portion 42a of the bolt 42 and the hub wheel 1. In this embodiment, the head portion 42a of the bolt 42 is spot-welded to a radial end surface 43a of the protruding wall portion 43 of the hub wheel 1, against which the head portion 42a abuts, at a plurality of positions over the peripheral direction. As welding means, known means such as laser welding or electron-beam welding can be used.

Figure 51A:
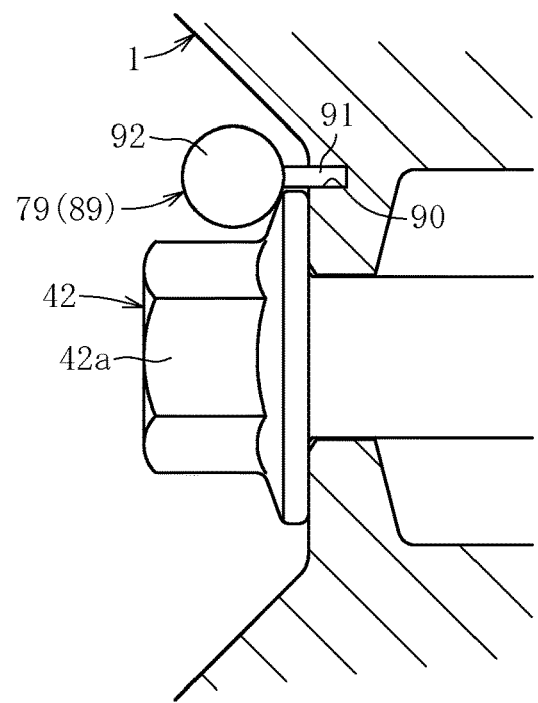
FIG. 51A is a longitudinal sectional view for illustrating a state before crimping of a loosening prevention member in an eleventh embodiment of the bolt loosening prevention structure.
Figure 51B:
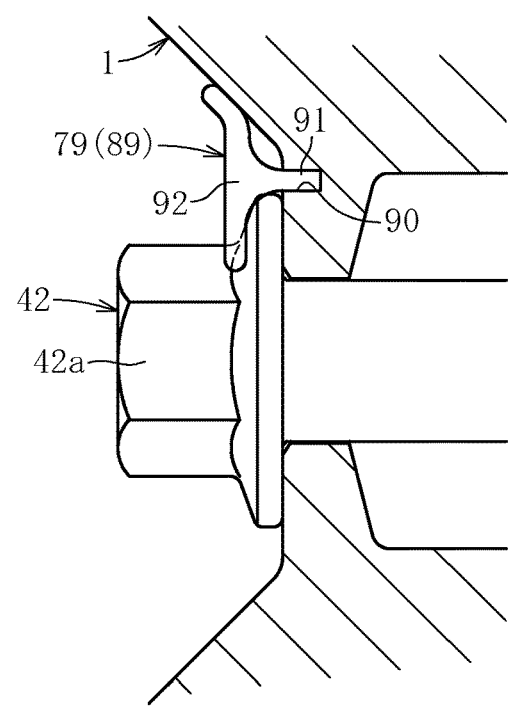
FIG. 51B is a longitudinal sectional view for illustrating a state after the crimping of the loosening prevention member in the eleventh embodiment of the bolt loosening prevention structure.

FIG. 51A and FIG. 51B are longitudinal sectional views of an eleventh embodiment of the bolt loosening prevention structure. FIG. 51A is a view for illustrating a state before the crimping of the loosening prevention member, and FIG. 51B is a view for illustrating a state after the crimping of the loosening prevention member. Further, FIG. 52A and FIG. 52B are front views of FIG. 51A and FIG. 51B, respectively.

In the eleventh embodiment, a pin-like member 89 is used as the loosening prevention member 79. The pin-like member 89 comprises a shaft-like insertion portion 91 that is insertable into an insertion hole 90 provided in the hub wheel 1, and a deformable portion 92 formed integrally therewith. Further, the insertion hole 90 is formed on a radial surface of the hub wheel 1, against which the head portion 42a of the bolt 42 abuts.

Figure 52A:
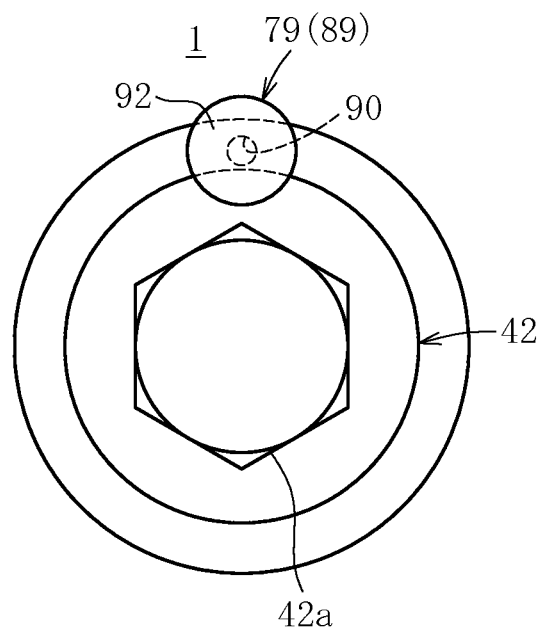
FIG. 52A is a front view of FIG. 51A.

As illustrated in FIG. 51A and FIG. 52A, in the state before the crimping, the deformable portion 92 has a ball-like shape. For the loosening prevention work for the bolt 42, a distal end of the insertion portion 91 of the pin-like member 89 is first inserted into the insertion hole 90 in a state in which the bolt 42 is fastened to the hub wheel 1. Then, as illustrated in FIG. 51B and FIG. 52B, the deformable portion 92 having the ball-like shape, which is exposed from the insertion hole 90, is crimped by hitting or the like to be deformed into a flat shape. In this manner, the thus deformed deformable portion 92 is brought into close contact with the head portion 42a of the bolt 42 to be engaged with each other. As a result, the rotation of the bolt 42 in the loosening direction is regulated between the head portion 42a of the bolt 42 and the hub wheel 1.

Figure 52B:
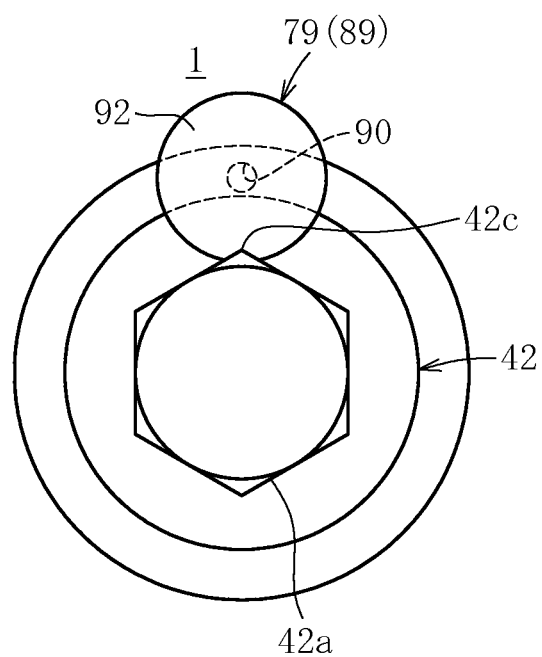
FIG. 52B is a front view of FIG. 51B.
Figure 53:
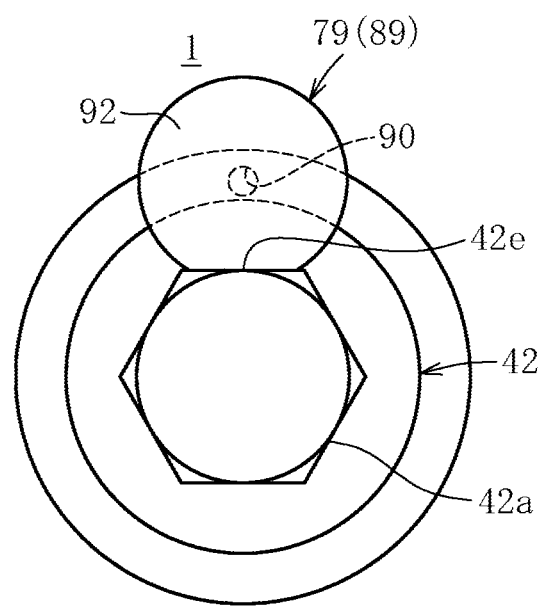
FIG. 53 is a front view for illustrating an example where the loosening prevention member is brought into close contact with a different portion of the head portion of the bolt.

Although the crimped deformable portion 92 is brought into close contact with the angular portion 42c of the head portion 42a of the bolt 42 in FIG. 52B, the deformable portion 92 may be brought into close contact with a plane portion 42e of the head portion 42a as illustrated in FIG. 53. Note that, the pin-like member 89 is preferred not to be subjected to thermosetting treatment (to be left as mild steel) so as to facilitate the crimping.

In examples illustrated in FIG. 54A, FIG. 54B, FIG. 55A, FIG. 55B, and FIG. 56, the pin-like member 89 is formed to have a straight bar-like shape.

Figure 54A:
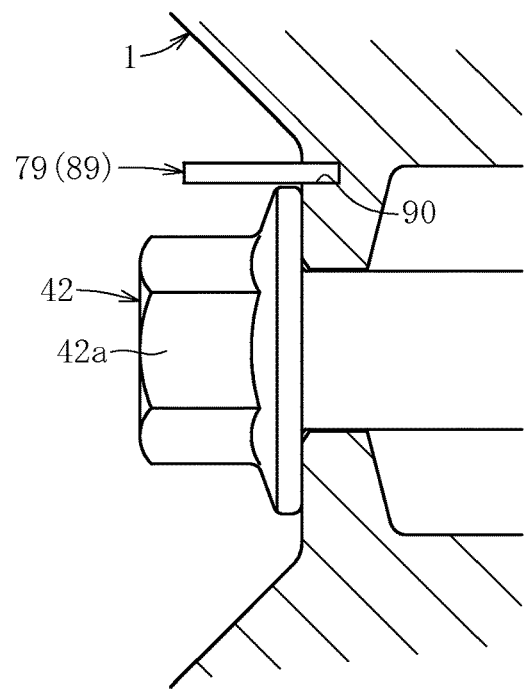
FIG. 54A is a longitudinal sectional view for illustrating a state before the crimping of the loosening prevention member in an example where a pin-like member is formed to have a straight bar-like shape.
Figure 54B:
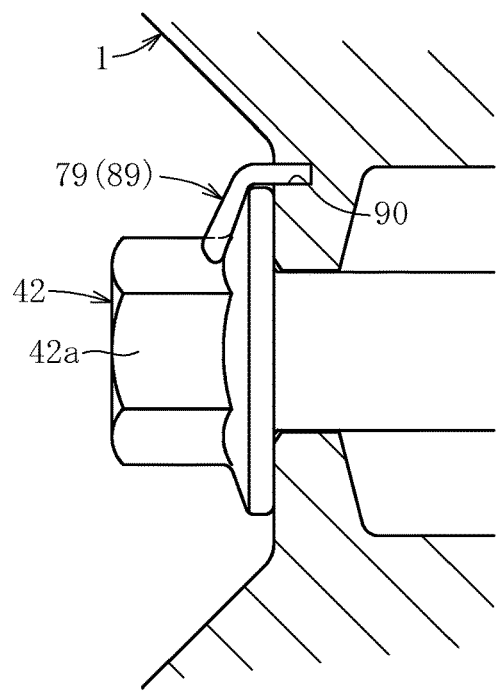
FIG. 54B is a longitudinal sectional view for illustrating a state after the crimping of the loosening prevention member in the example where the pin-like member is formed to have the straight bar-like shape.
Figure 55A:
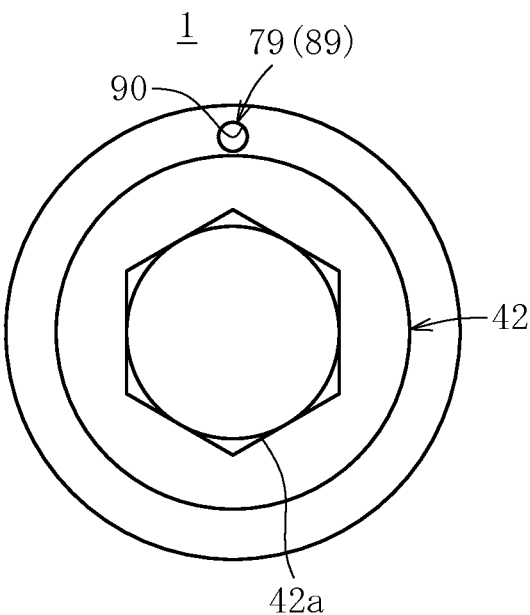
FIG. 55A is a front view of FIG. 54A.
Figure 55B:
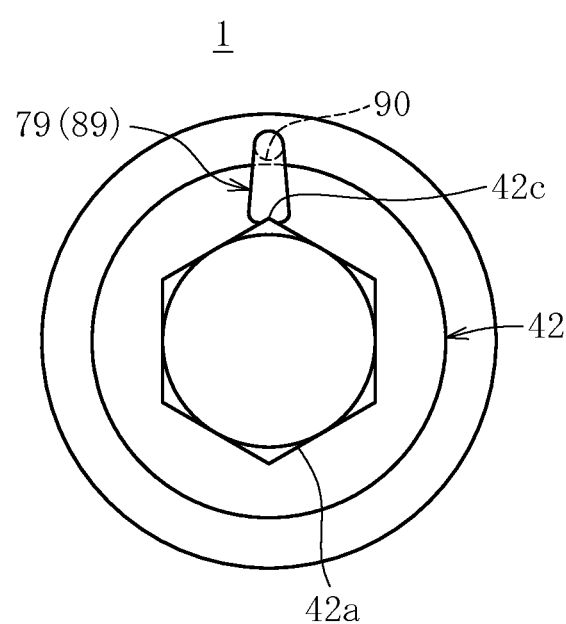
FIG. 55B is a front view of FIG. 54B.

In this case, after a distal end of the pin-like member 89 is inserted into the insertion hole 90 as illustrated in FIG. 54A and FIG. 55A, a portion of the pin-like member 89, which is exposed from the insertion hole 90, is crimped in a bent manner to be deformed as illustrated in FIG. 54B and FIG. 55B. As a result, an end portion of the pin-like member 89 is brought into close contact with the head portion 42a of the bolt 42 to be engaged with each other. As a result, the rotation of the bolt 42 in the loosening direction is regulated between the head portion 42a of the bolt 42 and the hub wheel 1.

Figure 56:
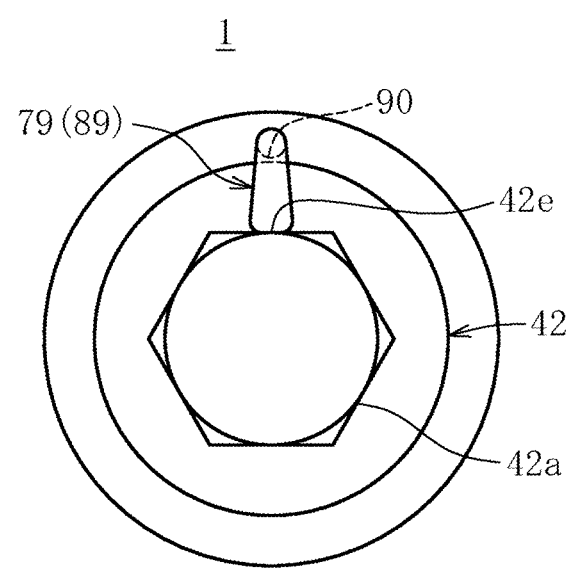
FIG. 56 is a front view for illustrating an example where the loosening prevention member is brought into close contact with a different portion of the head portion of the bolt.

Further, also in this case, a portion, with which the pin-like member 89 is brought into close contact, may be the angular portion 42c formed on the side surface of the head portion 42a as illustrated in FIG. 55B, or may be the plane portion 42e formed on the side surface of the head portion 42a as illustrated in FIG. 56.

Figure 57A:
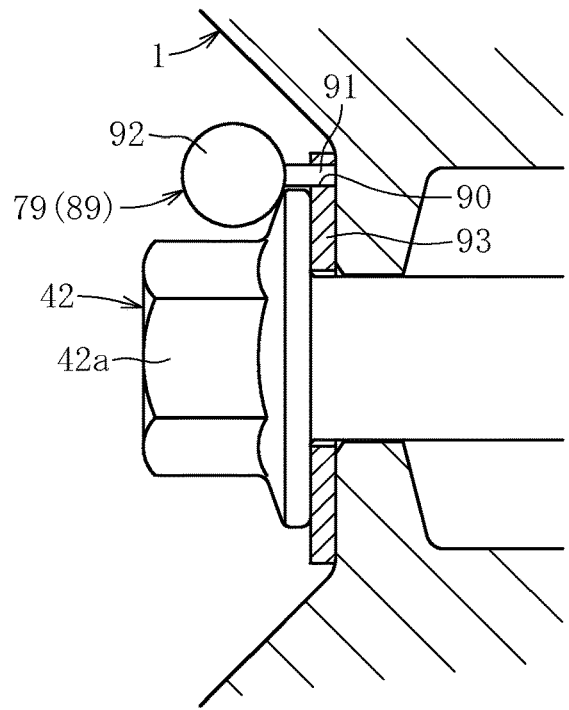
FIG. 57A is a longitudinal sectional view for illustrating a state before the crimping of the loosening prevention member in a twelfth embodiment of the bolt loosening prevention structure.
Figure 57B:
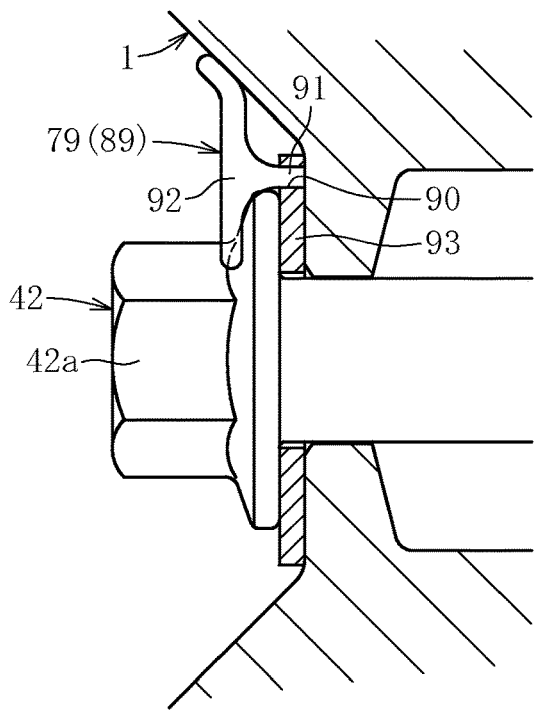
FIG. 57B is a longitudinal sectional view for illustrating a state after the crimping of the loosening prevention member in the twelfth embodiment of the bolt loosening prevention structure.
Figure 58A:
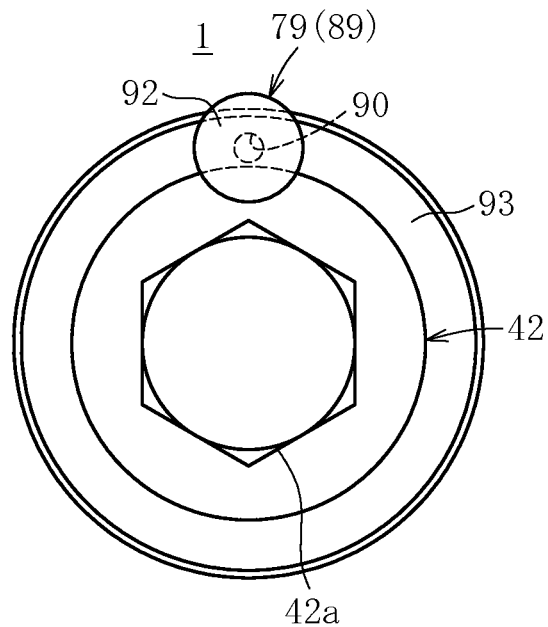
FIG. 58A is a front view of FIG. 57A.
Figure 58B:
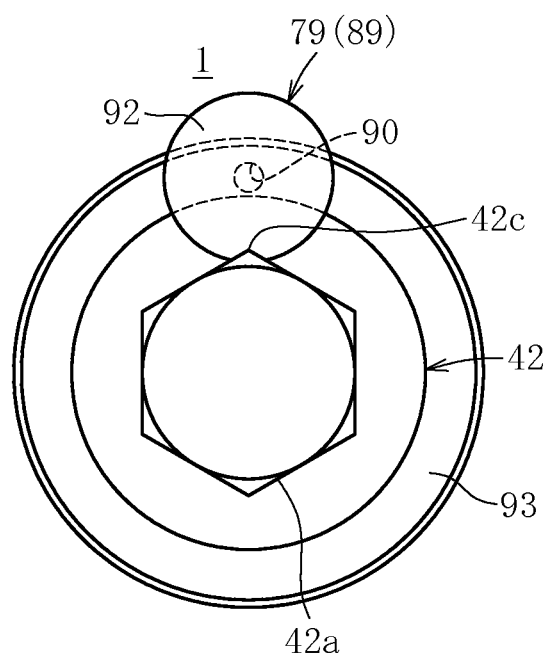
FIG. 58B is a front view of FIG. 57B.

FIG. 57A and FIG. 57B are longitudinal sectional views of a twelfth embodiment of the bolt loosening prevention structure. FIG. 57A is a view for illustrating a state before the crimping of the loosening prevention member, and FIG. 57B is a view for illustrating a state after the crimping of the loosening prevention member. FIG. 58A and FIG. 58B are front views of FIG. 57A and FIG. 57B, respectively.

In the twelfth embodiment, a washer 93 is interposed between the hub wheel 1 and the head portion 42a of the bolt 42. The above-mentioned insertion hole 90 is formed through the washer 93. Otherwise, the twelfth embodiment is basically the same as the embodiments illustrated in FIG. 51A, FIG. 51B, FIG. 52A, FIG. 52B, and FIG. 53.

In this case, after the bolt 42 and the hub wheel 1 are fastened through the washer 93 interposed therebetween, the distal end of the insertion portion 91 of the pin-like member 89 is inserted into the insertion hole 90 (see FIG. 57A). Then, in the same manner as described above, the deformable portion 92 having the ball-like shape is crimped by hitting or the like to be deformed into the flat shape (see FIG. 57B). In this manner, the thus deformed deformable portion 92 is brought into close contact with the head portion 42a of the bolt 42 to be engaged with each other. As a result, the rotation of the bolt 42 in the loosening direction is regulated.

Figure 59:
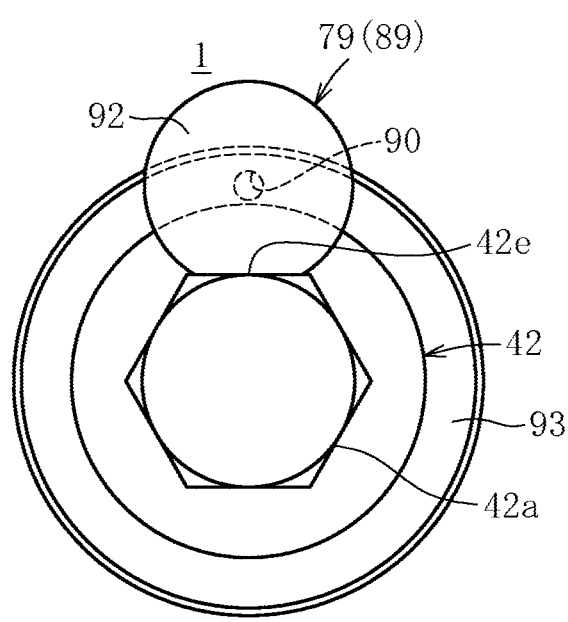
FIG. 59 is a front view for illustrating an example where the loosening prevention member is brought into close contact with a different portion of the head portion of the bolt.
Figure 60A:
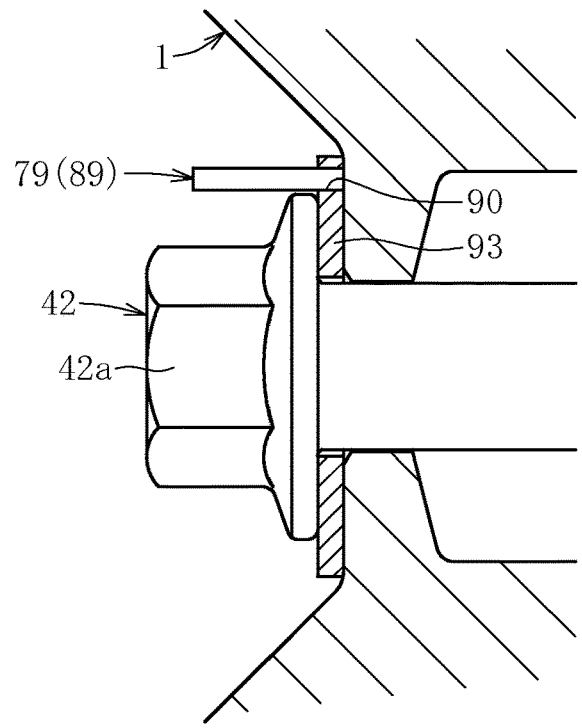
FIG. 60A is a longitudinal sectional view for illustrating a state before the crimping of the loosening prevention member in the example where the pin-like member is formed to have the straight bar-like shape.
Figure 60B:
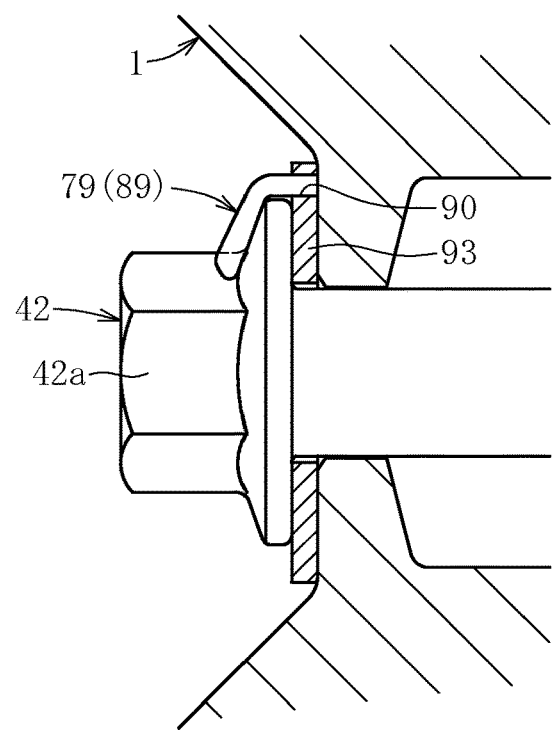
FIG. 60B is a longitudinal sectional view for illustrating a state after the crimping of the loosening prevention member in the example where the pin-like member is formed to have the straight bar-like shape.
Figure 61A:
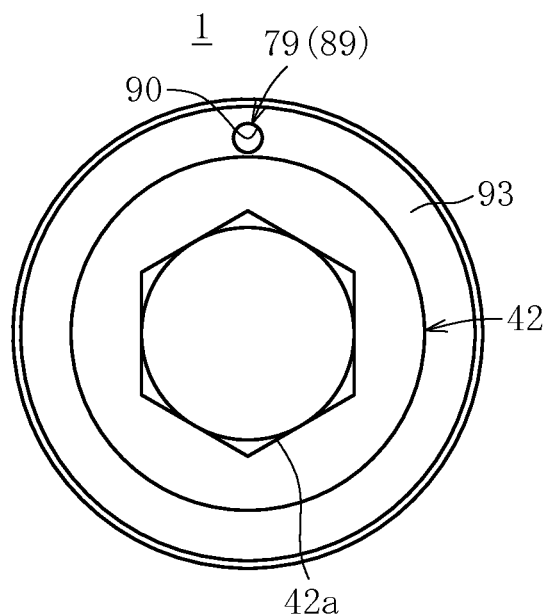
FIG. 61A is a front view of FIG. 60A.
Figure 61B:
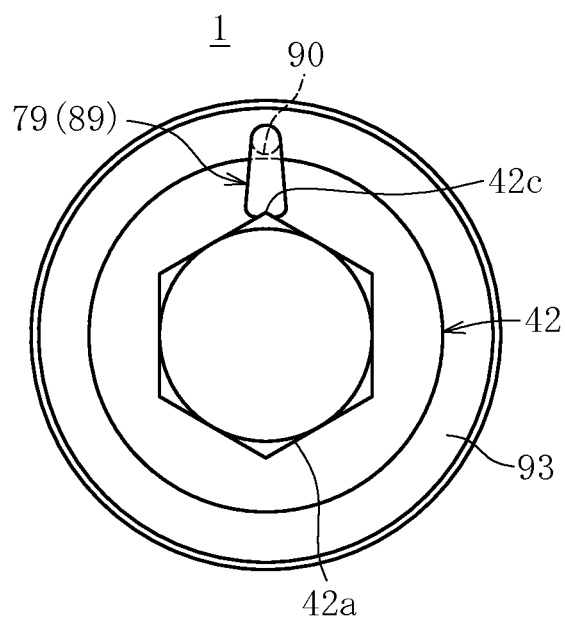
FIG. 61B is a front view of FIG. 60B.

Further, also in this case, a portion of the bolt 42, with which the pin-like member 89 is brought into close contact, may be the angular portion 42c formed on the side surface of the head portion 42a (see FIG. 58B), or may be the plane portion 42e formed on the side surface of the head portion 42a (see FIG. 59). Further, it is desirable to use a washer having both surfaces that are subjected to knurling or a spring washer as the washer 93 so that the rotation in the peripheral direction hardly occurs.

Further, as in examples illustrated in FIG. 60A, FIG. 60B, FIG. 61A, FIG. 61B, and FIG. 62, the pin-like member 89 formed to have the straight bar-like shape may be inserted into the insertion hole 90 formed through the washer 93. In this case, as in the embodiments illustrated in FIG. 54A, FIG. 54B, FIG. 55A, FIG. 55B, and FIG. 56, the portion exposed from the insertion hole 90 is crimped in a bent manner to be deformed in a state in which the pin-like member 89 is inserted into the insertion hole 90. In this manner, an end portion of the pin-like member 89 is brought into close contact with the head portion 42a of the bolt 42 to be engaged with each other. As a result, the rotation of the bolt 42 in the loosening direction can be regulated.

Figure 62:
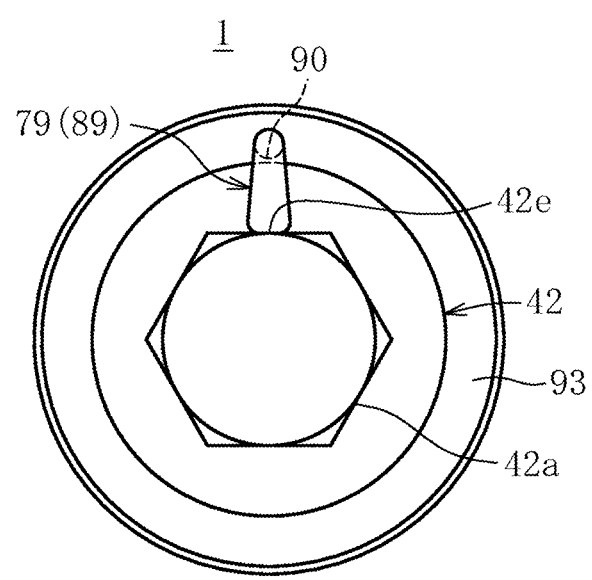
FIG. 62 is a front view for illustrating an example where the loosening prevention member is brought into close contact with a different portion of the head portion of the bolt.

Further, also in this case, a portion of the bolt 42, with which the pin-like member 89 is brought into close contact, may be the angular portion 42c formed on the side surface of the head portion 42a (see FIG. 61B), or may be the plane portion 42e formed on the side surface of the head portion 42a (see FIG. 62).

Each of the embodiments of the bolt loosening prevention structure has been described above. According to the bolt loosening prevention structure of each of the embodiments, the rotation of the bolt in the loosening direction with respect to the hub wheel can be regulated between the head portion of the bolt and the hub wheel. In this manner, the fastened state of the hub wheel and the constant velocity universal joint can be maintained over a long period of time. As a result, inconvenience such as the generation of abnormal noise or the acceleration of wear due to the loosening of the fastened bolt can be suppressed.

Further, the bolt loosening is prevented by the head portion of the bolt, which is exposed from the hub wheel. Therefore, whether or not the loosening is prevented after the bolt is fastened can be easily confirmed visually from the outside.

Further, the application of the bolt loosening prevention structure according to each of the embodiments described above is not limited to the above-mentioned bearing device for a wheel. For example, the above-mentioned bolt loosening prevention structure is also applicable to bearing devices for a wheel illustrated in FIG. 63, FIG. 64, and FIG. 65.

Figure 63:
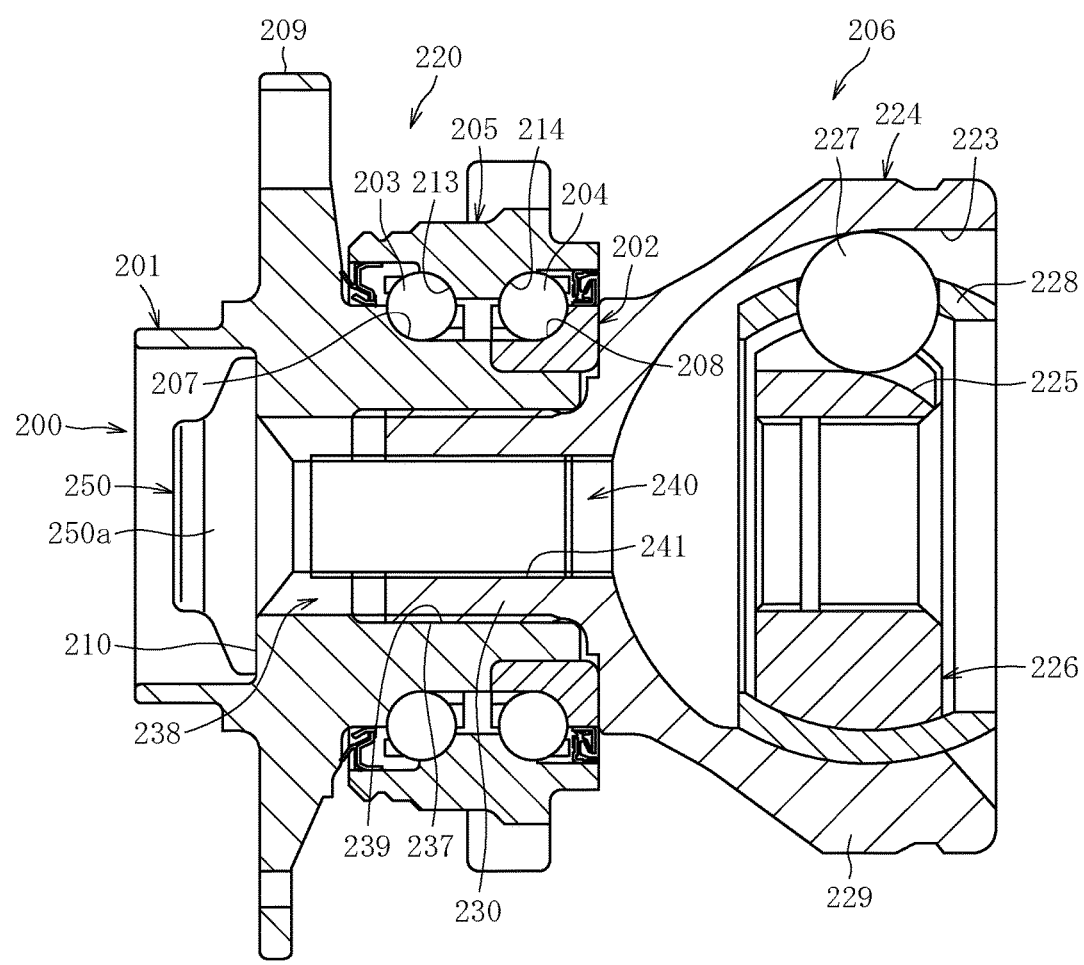
FIG. 63 is a longitudinal sectional view of another bearing device for a wheel.

Specifically, the bearing device for a wheel illustrated in FIG. 63 comprises a wheel bearing 220 comprising an inner member 200, an outer member 205, and double-row balls 203 and 204 interposed therebetween, and a fixed type constant velocity universal joint 206 fastened thereto by a bolt 250, as main components thereof.

The inner member 200 comprises a hub wheel 201 having a wheel mounting flange 209 for allowing a wheel (not shown) to be mounted thereto and an inner ring 202 mounted on an outer peripheral surface of the hub wheel 201. On outer peripheral surfaces of the hub wheel 201 and the inner ring 202, inner raceway surfaces 207 and 208 are respectively formed. On the other hand, the outer member 205 has an inner peripheral surface on which double-row outer raceway surfaces 213 and 214 respectively opposed to the inner raceway surfaces 207 and 208 of the hub wheel 201 and the inner ring 202 are formed. The double-row balls 203 and 204 are interposed between the outer raceway surfaces 213 and 214 and the inner raceway surfaces 207 and 208, which are opposed to each other.

The constant velocity universal joint 206 comprises an outer joint member 224 having track grooves 223 formed in an inner peripheral surface thereof, an inner joint member 226 having track grooves 225 formed in an outer peripheral surface thereof so as to be opposed to the track grooves 223 of the outer joint member 224, balls 227 built into spaces between the track grooves 223 and 225, a cage 228 interposed between the inner peripheral surface of the outer joint member 224 and the outer peripheral surface of the inner joint member 226 to retain the balls 227, and the like.

The outer joint member 224 comprises a mouth section 229 that accommodates internal components such as the inner joint member 226, the balls 227, and the cage 228, and a stem section 230 that integrally extends from the mouth section 229 in an axial direction. Further, a male spline 237 including a plurality of projecting portions extending in the axial direction is formed on an outer peripheral surface of the stem section 230.

Correspondingly, on an inner peripheral surface of a hole portion 238 of the hub wheel 201, a female spline 239 to be fitted to the male spine 237 of the stem section 230 is formed. By the engagement of both the splines in a state in which the stem section 230 is inserted into the hole portion 238, the hub wheel 201 and the outer joint member 224 are coupled to each other to allow torque transmission therebetween.

Further, a screw hole 240 is formed in the stem section 230. A bolt 250 is inserted into the screw hole 240 so that the bolt 250 is threadedly engaged with a female thread portion 241 formed on the screw hole 240, and a head portion 250a of the bolt 250 is brought into abutment against a radial end surface 210 of the hub wheel 201, thereby fastening the constant velocity universal joint 206 to the hub wheel 201.

Figure 64:
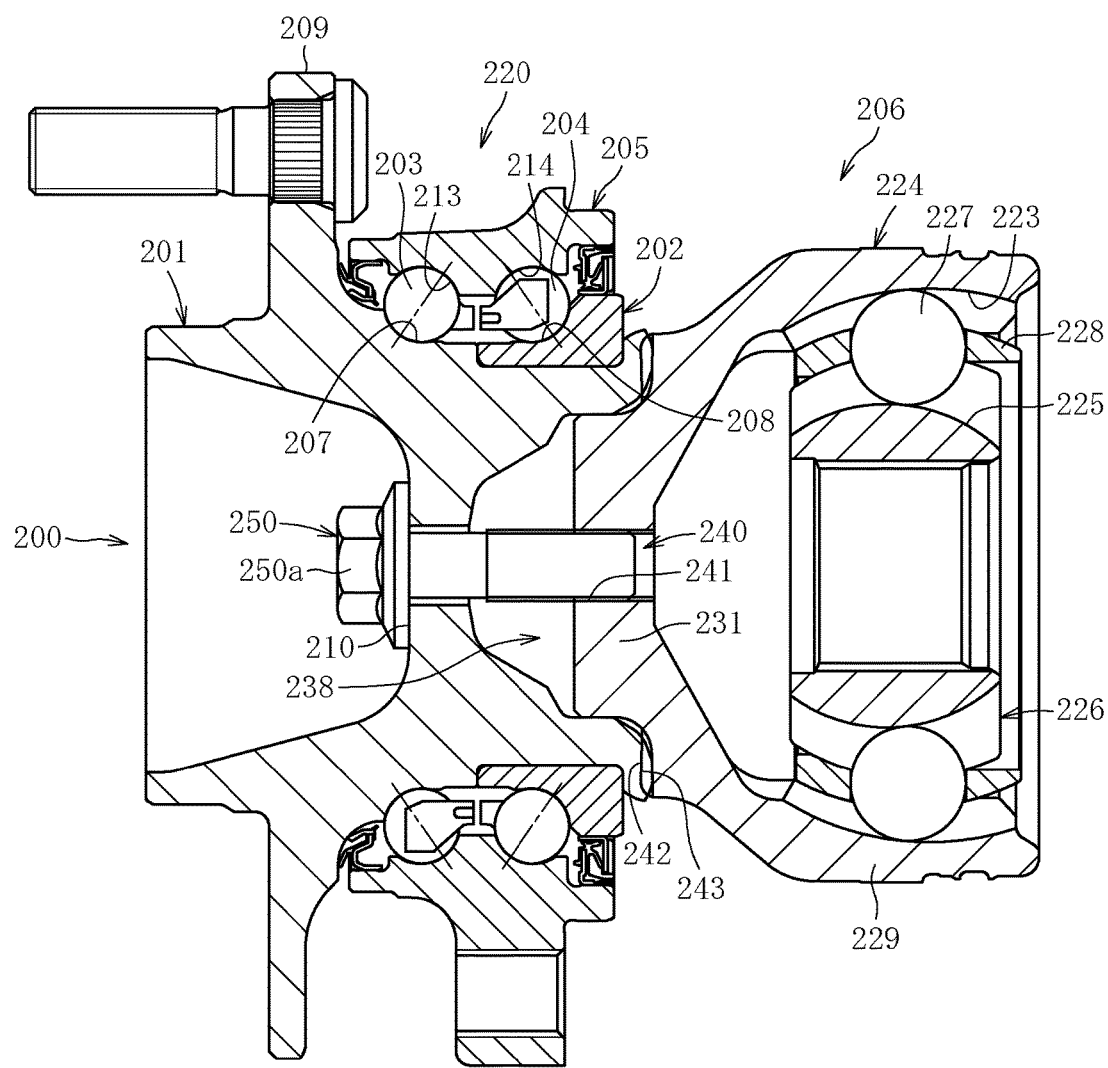
FIG. 64 is a longitudinal sectional view of a further bearing device for a wheel.

Further, similarly to the bearing device for a wheel illustrated in FIG. 63, a bearing device for a wheel illustrated in FIG. 64 comprises the wheel bearing 220 comprising the inner member 200, the outer member 205, and the double-row balls 203 and 204 interposed between the inner member 200 and the outer member 205, and the fixed type constant velocity universal joint 206 fastened thereto by the bolt 250, as main components thereof.

In this embodiment, an axial-alignment protruding portion 231 having a disc-like shape is provided integrally with the mouth section 229 of the constant velocity universal joint 206. By fitting the axial-alignment protruding portion 231 into the hole portion 238 of the hub wheel 201, the hub wheel 201 and the constant velocity universal joint 206 are coupled to each other while being axially aligned. Further, in the bearing device for a wheel, face splines 242 and 243 are formed on surfaces of the mouth section 229 of the outer joint member 224 and the hub wheel 201, which are opposed to each other, and are engaged with each other. Each of the face splines 242 and 243 comprises a plurality of projecting portions and depressed portions extending in the radial direction, which are formed alternately along the peripheral direction. By the engagement of the face splines 242 and 243, misalignment between the hub wheel 201 and the fixed type constant velocity universal joint 206 in the peripheral direction is eliminated.

Further, similarly to the bearing device for a wheel illustrated in FIG. 63, also in the bearing device for a wheel, the screw hole 240, into which the bolt 250 is to be inserted, is formed in the outer joint member 224 of the constant velocity universal joint 206. The bolt 250 is threadedly engaged with the female thread portion 241 formed on the screw hole 240, and the head portion 250a of the bolt 250 is brought into abutment against the radial end surface 210 of the hub wheel 201, thereby fastening the constant velocity universal joint 206 to the hub wheel 201.

Figure 65:
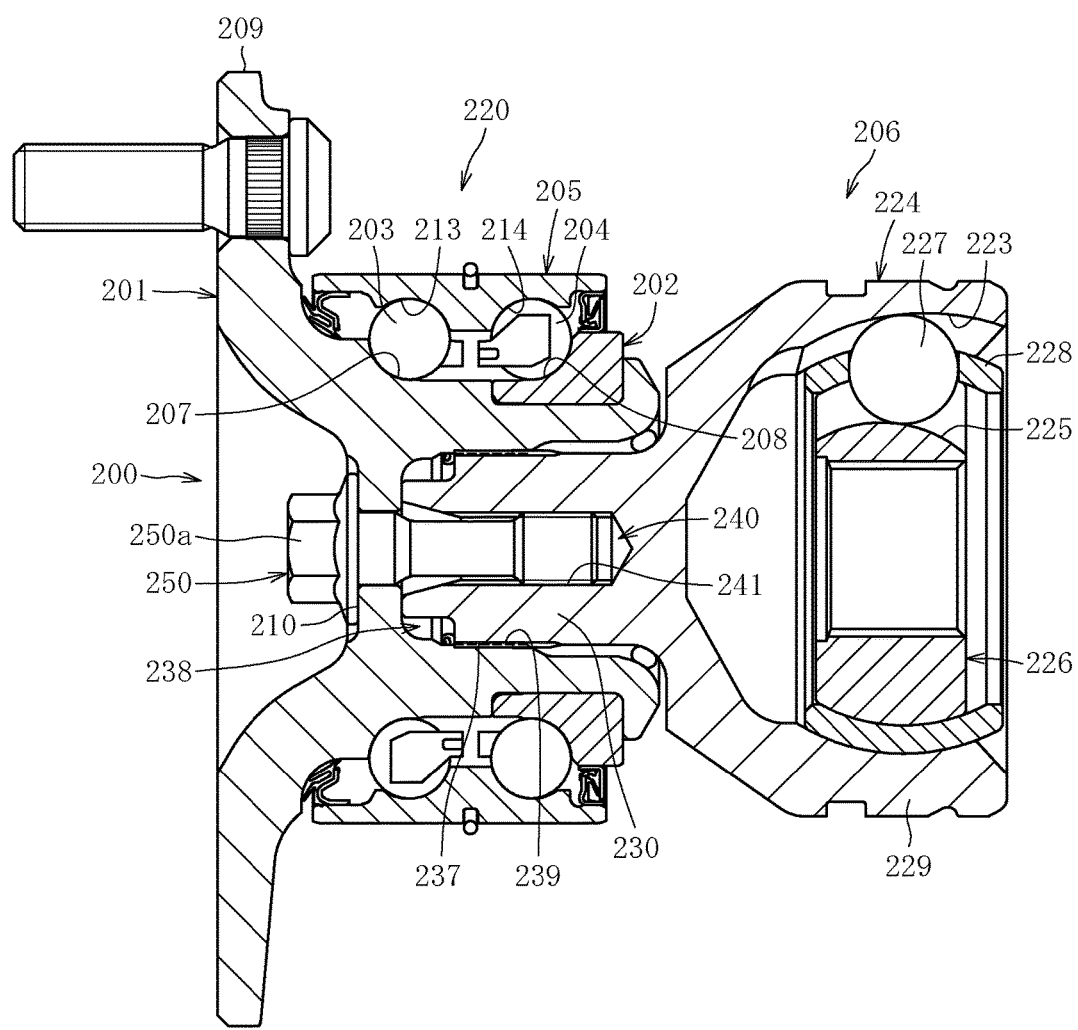
FIG. 65 is a longitudinal sectional view of a further bearing device for a wheel.

In contrast to the bearing device for a wheel illustrated in FIG. 63, the suppression of a backlash between the engaged splines in the peripheral direction and the improvement of workability in coupling the hub wheel and the constant velocity universal joint are achieved in a bearing device for a wheel illustrated in FIG. 65. Specifically, in a configuration described in FIG. 65, a projecting portion (male spline 237 or female spline 239) is formed only on one of portions of an outer peripheral surface of the stem section 230 of the outer joint member 224 and the hole portion 238 of the hub wheel 201. The one portion is press-fitted into another portion in the axial direction to form a depressed portion to be fitted over the projecting portion and to be brought into close contact therewith on the another portion. The remaining configuration is basically the same as that of the bearing device for a wheel illustrated in FIG. 63. Also in this case, the bolt 250 is inserted into the screw hole 240 of the stem section 230 to be fastened thereto, thereby fastening the constant velocity universal joint 206 to the hub wheel 201.

As described above, also in the bearing devices for a wheel illustrated in FIG. 63, FIG. 64, FIG. 65, and the like, in which the hub wheel and the constant velocity universal joint are fastened by the bolt, the fastened state of the hub wheel and the constant velocity universal joint can be maintained over a long period of time with the application of the bolt loosening prevention structure according to each of the embodiments described above. Thus, inconvenience such as the generation of abnormal noise and the acceleration of wear due to the loosening of the fastened bolt can be suppressed.

Note that, the present invention is not limited to the embodiments described above, and as a matter of course, may be carried out in various other embodiments without departing from the gist of the present invention. The scope of the present invention is defined in the scope of claims, and encompasses meaning of equivalents described in the scope of claims and all modifications in the scope of claims.

REFERENCE SIGNS LIST 1 inner member (hub wheel)
2 inner member (inner ring)
3, 4 ball
5 outer member (outer ring)
6 wheel bearing
7 constant velocity universal joint
8, 12 inner raceway surface
14, 15 outer raceway surface
20 outer joint member
30 stem section
33 projecting portion (male spline)
36, 37 depressed portion
41 female thread portion
42 male thread portion (bolt)
42a head portion
42d flange portion
45 shoulder portion
79 loosening prevention member
80 cap member
81 engagement portion
84 protruding portion
85 recessed portion
89 clip member
86c opening portion
87 projecting portion
88 depressed portion
n interference
M projection and depression fitting structure
N screw fastening structure
W welding portion
X entire fitting contact portion
Z crimped portion

The invention claimed is:
1. A bearing device for a wheel, comprising a wheel bearing,
the wheel bearing comprising:
an outer member having double-row outer raceway surfaces formed on an inner periphery thereof;

an inner member comprising a hub wheel and an inner ring and having double-row inner raceway surfaces formed on an outer periphery thereof, which are opposed to the double-row outer raceway surfaces; and double-row balls interposed between the double-row outer raceway surfaces of the outer member and the double-row inner raceway surfaces of the inner member, the wheel bearing having a constant velocity universal joint coupled thereto through a screw fastening structure by fitting a stem section of an outer joint member of the constant velocity universal joint into an inner diameter of the hub wheel so that a shoulder portion of the outer joint member is brought into abutment against an end portion of the inner member, wherein:

a plurality of projecting portions formed on one of the hub wheel and the stem section of the outer joint member to extend in an axial direction are press-fitted into a plurality of depressed portions formed on another of the hub wheel and the stem section of the outer joint member, the plurality of depressed portions being formed in advance before initially press-fitting the one of the hub wheel and the stem section to the other of the hub wheel and the stem section to have an interference with respect to the plurality of projecting portions, by using an axial force by the screw fastening structure to cut the interference with the plurality of projecting portions, and a shape of the plurality of projecting portions is transferred to the other of the hub wheel and the stem section of the outer joint member, to thereby provide a projection and depression fitting structure in which the plurality of projecting portions and the plurality of depressed portions are brought into contact with each other at an entire fitting contact portion formed therebetween by the cutting of the interference with the projecting portions;

a flash portion is formed by the press-fitting of the projecting portions into the depressed portions by the axial force of the screw fastening structure;

an axial force generated on contact surfaces of the end portion of the inner member and the shoulder portion of the outer joint member is set to 32 kN or smaller;

a value obtained by dividing an axial length from the shoulder portion of the outer joint member, against which the end portion of the inner member abuts, to the plurality of projecting portions by a maximum outer diameter of the stem section is set to 0.3 or smaller; and a value obtained by dividing an axial length of the stem section by the maximum outer diameter of the stem section is set to 1.3 or smaller.

2. The bearing device for a wheel according to claim 1, wherein the screw fastening structure comprises:

a female thread portion formed at an axial end of the stem section of the outer joint member; and a male thread portion to be locked at the hub wheel in a state of being threadedly engaged with the female thread portion.

3. The bearing device for a wheel according to claim 1, wherein:

the plurality of projecting portions are provided on the stem section of the outer joint member; and the plurality of depressed portions are provided on the hub wheel.

4. The bearing device for a wheel according to claim 1, wherein:

the hub wheel and the outer joint member of the constant velocity universal joint are fastened through an intermediation of a bolt; and rotation of the bolt in a loosening direction is regulated between a head portion of the bolt and the hub wheel.

5. The bearing device for a wheel according to claim 4, wherein:

the hub wheel comprises an engagement portion; and the head portion of the bolt has a loosening prevention member engageable with the engagement portion mounted thereon.

6. The bearing device for a wheel according to claim 5, wherein:

the engagement portion comprises a protruding portion or a recessed portion; and the loosening prevention member is configured to be engageable with the engagement portion by being crimped at a position of the engagement portion or in a vicinity thereof.

7. The bearing device for a wheel according to claim 5, wherein:

the engagement portion comprises a protruding portion or a recessed portion; and the loosening prevention member comprises a projecting portion or a depressed portion engageable with the engagement portion.

8. The bearing device for a wheel according to claim 5, wherein the loosening prevention member comprises a cap member mountable onto the head portion of the bolt through press fitting.

9. The bearing device for a wheel according to claim 5, wherein the loosening prevention member comprises a clip member having an opening portion in a part in a peripheral direction, the clip member being mountable onto the head portion of the bolt through elastic deformation of the opening portion in an enlarged manner.

10. The bearing device for a wheel according to claim 4, wherein:

the hub wheel comprises an engagement portion; and the head portion of the bolt comprises a flange portion engageable with the engagement portion.

11. The bearing device for a wheel according to claim 10, wherein:

the engagement portion comprises a protruding portion or a recessed portion; and the flange portion is configured to be engageable with the engagement portion by being crimped at a position of the engagement portion or in a vicinity thereof.

12. The bearing device for a wheel according to claim 4, wherein the head portion of the bolt is fixed to the hub wheel by welding.

13. A method for manufacturing a bearing device for a wheel, which comprises a wheel bearing, the wheel bearing comprising:

an outer member having double-row outer raceway surfaces formed on an inner periphery thereof;

an inner member comprising a hub wheel and an inner ring and having double-row inner raceway surfaces formed on an outer periphery thereof, which are opposed to the double-row outer raceway surfaces; and double-row balls interposed between the double-row outer raceway surfaces of the outer member and the double-row inner raceway surfaces of the inner member, the wheel bearing having a constant velocity universal joint coupled thereto through a screw fastening structure by fitting a stem section of an outer joint member of the constant velocity universal joint into an inner diameter of the hub wheel so that a shoulder portion of the outer joint member is brought into abutment against an end portion of the inner member, the method comprising:

forming a plurality of projecting portions on one of the hub wheel and the stem section of the outer joint member to extend in an axial direction, and forming a plurality of depressed portions formed to have an interference with respect to the plurality of projecting portions on another of the hub wheel and the stem section of the outer joint member, the plurality of depressed portions being formed in advance before initially press-fitting the one of the hub wheel and the stem section to the other of the hub wheel and the stem section;

press-fitting the projecting portions into the depressed portions by an axial force of the screw fastening structure to cut the interference with the press-fit projecting portions;

configuring a projection and depression fitting structure in which the projecting portions and the depressed portions are brought into contact with each other at an entire fitting contact portion formed therebetween by the cutting of the interference with the projecting portions and transferring a shape of the projecting portions to the other of the hub wheel and the stem section of the outer joint member;

forming a flash portion by the press-fitting of the projecting portions into the depressed portions by the axial force of the screw fastening structure; and setting an axial force generated on contact surfaces of the end portion of the inner member and the shoulder portion of the outer joint member to 32 kN or smaller, wherein:

a value obtained by dividing an axial length from the shoulder portion of the outer joint member, against which the end portion of the inner member abuts, to the plurality of projecting portions by a maximum outer diameter of the stem section is set to 0.3 or smaller; and a value obtained by dividing an axial length of the stem section by the maximum outer diameter of the stem section is set to 1.3 or smaller.

* * * * *